United States Patent
Tabata et al.

[11] Patent Number: 6,158,541
[45] Date of Patent: Dec. 12, 2000

[54] ELECTRIC MOTOR VEHICLE HAVING MEANS FOR FULLY DISCHARGING PART OF ENERGY STORAGE DEVICE WHEN ENERGY AMOUNT IN THE OTHER PART IS LARGER THAN A THRESHOLD

[75] Inventors: Atsushi Tabata, Okazaki; Yutaka Taga, Aichi-ken; Ryuji Ibaraki; Tsuyoshi Mikami, both of Toyota, all of Japan

[73] Assignee: Toyota Jidosha Kabushiki Kaisha, Toyota, Japan

[21] Appl. No.: 09/013,098

[22] Filed: Jan. 26, 1998

[30] Foreign Application Priority Data

Feb. 14, 1997 [JP] Japan .................................. 9-030650
Aug. 5, 1997 [JP] Japan .................................. 9-210977

[51] Int. Cl.[7] ...................................................... B60K 6/00
[52] U.S. Cl. ............................................................ 180/165
[58] Field of Search ................................... 180/65.3, 165, 180/65.4, 65.5, 65.6, 306, 65.2, 65.8; 701/22; 320/166

[56] References Cited

U.S. PATENT DOCUMENTS

| | | | |
|---|---|---|---|
| 5,121,044 | 6/1992 | Goldman | 320/2 |
| 5,184,058 | 2/1993 | Hesse et al. | 320/4 |
| 5,680,908 | 10/1997 | Reed | 180/65.3 |
| 5,769,177 | 6/1998 | Wickman | 180/65.3 |
| 5,905,371 | 5/1999 | Limpaecher | 323/288 |

FOREIGN PATENT DOCUMENTS 5-137269 6/1993 Japan .
5-328526 12/1993 Japan .

*Primary Examiner*—Kevin Hurley
*Assistant Examiner*—Kevin McKinley
*Attorney, Agent, or Firm*—Oliff & Berridge, PLC

[57] ABSTRACT

An electrically driven automotive vehicle including an electric motor for driving the vehicle, an electric energy storage device for storing an electric energy for operating the electric motor, the storage device having a plurality of storage portions which can be charged and discharged independently of each other, and a fully discharging device for fully discharging at least one of the storage portions, when an amount of electric energy stored in at least one of the other of the storage portions is larger than a predetermined threshold.

26 Claims, 28 Drawing Sheets

FIG. 3

| SHIFT LEVER | TRANSMISSION | CLUTCHES | | | BRAKES | | | | | ONE-WAY CLUTCHES | | | SPEED RATIO |
|---|---|---|---|---|---|---|---|---|---|---|---|---|---|
| | | $C_0$ | $C_1$ | $C_2$ | $B_0$ | $B_1$ | $B_2$ | $B_3$ | $B_4$ | $F_0$ | $F_1$ | $F_2$ | |
| NEUTRAL | N | ○ | | | | | | | | | | | — |
| REVERSE | Rev | ○ | | ○ | | | | | ○ | | | | −4.550 |
| DRIVE | 1st | ○ | ○ | | | | | | ● | ○ | | ○ | 3.357 |
| DRIVE | 2nd | ● | ○ | | | | | ○ | | ○ | | | 2.180 |
| DRIVE | 3rd | ○ | ○ | | | ● | ○ | | | ○ | ○ | | 1.424 |
| DRIVE | 4th | ○ | ○ | ○ | | | ○ | | | ○ | | | 1.000 |
| DRIVE | 5th | | ○ | ○ | ○ | | ○ | | | | | | 0.753 |

FIG. 7

| MODE | CLUTCHES | | ENGINE 12 | STORAGE DEVICE 58 | MODE NOMENCLATURE |
|---|---|---|---|---|---|
| | CE1 | CE2 | | | |
| 1 | OFF | ON | OFF | DISCHARGED | MOTOR DRIVE |
| 2 | ON | ON | ON | NO ENG. CSMD | ENGINE DRIVE |
| 3 | ON | ON | ON | CHARGED | ENGINE DRIVE + CHARGING |
| 4 | ON | ON | ON | DISCHARGED | ENGINE · MOTOR DRIVE |
| 5 | ON | OFF | ON | CHARGED | VEHICLE START BY ENGINE |
| 6 | OFF | ON | OFF | CHARGED | REGENERATIVE BRAKING |
| 7 | ON | OFF | ON | NO ENG. CSMD | ELECTRIC NEUTRALITY |
| 8 | ON | ON | OFF | NO ENG. CSMD | ENGINE BRAKING |
| 9 | ON | ON | START | DISCHARGED | ENGINE STARTING |

FIG. 29

| SHIFT LEVER | TRANSMISSION | CLUTCHES | | BRAKES | | | | ONE-WAY CLUTCHES | | SPEED RATIO |
|---|---|---|---|---|---|---|---|---|---|---|
| | | $C_1$ | $C_2$ | $B_1$ | $B_2$ | $B_3$ | $B_4$ | $F_1$ | $F_2$ | |
| NEUTRAL | N | | | | | | | | | — |
| REVERSE | Rev | | ○ | | | | ○ | | | −4.550 |
| DRIVE | 1st | ○ | | | | | ● | | ○ | 3.357 |
| | 2nd | ○ | | | | ○ | | | | 2.180 |
| | 3rd | ○ | | ● | ○ | | | ○ | | 1.424 |
| | 4th | ○ | ○ | | ○ | | | | | 1.000 |

ELECTRIC MOTOR VEHICLE HAVING MEANS FOR FULLY DISCHARGING PART OF ENERGY STORAGE DEVICE WHEN ENERGY AMOUNT IN THE OTHER PART IS LARGER THAN A THRESHOLD

This application is based on Japanese Patent Application No. 9-210977 filed Aug. 5, 1997 and claiming the priority of Japanese Patent Application No. 9-30650 filed Feb. 14, 1997, the contents of these two applications being incorporated hereinto by reference.

CROSS REFERENCE TO RELATED APPLICATIONS

Not applicable

BACKGROUND OF THE INVENTION

1. Field of the Invention

The present invention relates in general to an electrically driven automotive vehicle, and more particularly to techniques for prolonging service life of an electrical energy storage device used on the vehicle.

2. Discussion of the Related Art

There is known an electrically driven or powered automotive vehicle of hybrid type including an internal combustion engine, an electric generator driven by the internal combustion engine to generate an electric energy, an electric energy storage device for storing the electric energy generated by the electric generator, and an electric motor operated by the electric energy supplied from the electric energy storage device. An example of the hybrid type electric vehicle is disclosed in JP-A-5-328526. In this hybrid type electric vehicle, the internal combustion engine is operated as needed, to drive the electric generator for generating an electric energy, so that a continuously running distance of the electric motor vehicle can be made sufficiently large, without having to use the electric energy storage device having a considerably large storage capacity. Further, the amount of fuel consumption by the engine and the amount of exhaust gas emissions from the engine during generation of the electric energy by the electric generator can be reduced by operating the engine at a speed at which the fuel economy is the highest, and by holding the engine off when the generation of the electric energy is not necessary. Owing to these practical advantages, the electric motor vehicle of the hybrid type has been drawing an attention of the industry.

The electric generator is usually operated by the engine to charge the electric energy storage device, for avoiding insufficiency of the electric energy stored in the storage device during running of the vehicle. For instance, the electric energy stored in the storage device is maintained within a range of 30–80% of its full storage capacity (nominal storage capacity), so that a given amount of electric energy is always left in the storage device.

However, some reports indicate that repeated charging of the electric energy storage device before it is fully discharged may cause a phenomenon of a gradual decrease in the storage capacity (maximum energy amount that can be stored in the storage device) before expiration of the expected service life of the storage device. To prevent this problem, it is known to completely or fully discharge the storage device before each charging of the storage device.

SUMMARY OF THE INVENTION

It is therefore an object of the present invention to provide an electrically driven automotive vehicle having an electric motor operated by an electric energy supplied from an electric energy storage device, wherein the storage device is free from the conventionally experienced phenomenon of gradual decrease in the storage capacity due to repeated charging thereof.

The above object may be achieved according to a first aspect of this invention, which provides an electrically driven automotive vehicle comprising: an electric energy storage device for storing an electric energy, the electric energy storage device including a plurality of storage portions which can be charged and discharged independently of each other; an electric motor operated by the electric energy supplied from the electric energy storage device, for running the vehicle; and fully discharging means for fully discharging a first part of the electric energy storage device which consists of at least one of the plurality of storage portions, when an amount of electric energy stored in a second part of the electric energy storage device which consists of at least one of the other of the plurality of storage portions is larger than a predetermined threshold.

In the electrically driven automotive vehicle constructed according to the first aspect of this invention, the first part of the electric energy storage device is fully discharged when the amount of electric energy stored in the second part of the storage device is larger than a predetermined threshold. This arrangement prevents a decrease in the storage capacity of the electric energy storage device due to repeated charging, while avoiding insufficiency of the electric energy amount for running the vehicle.

The first part of the storage device consists of at least one of the plurality of storage portions, while the second part consists of at least one of the other of the plurality of storage portions. Therefore, the plurality of storage portions of the storage device may include at least one storage portion which does not belong to the first and second parts and which is not at all discharged or is partially discharged to a predetermined extent.

The above-indicated object may also be achieved according to a second aspect of this invention, which provides an electrically driven automotive vehicle comprising: electricity generating means for generating an electric energy; an electric energy storage device for storing the electric energy generated by the electricity generating means, the electric energy storage device including a plurality of storage portions which can be charged and discharged independently of each other; an electric motor operated by the electric energy supplied from the electric energy storage device, for running the vehicle; and fully discharging means for fully discharging a first part of the electric energy storage device which consists of at least one of the plurality of storage portions, when an amount of electric energy stored in a second part of the electric energy storage device which consists of at least one of the other of the plurality of storage portions is larger than a predetermined threshold.

In the electrically driven automotive vehicle according to the second aspect of the invention, too, at least one of the storage portions as the first part of the storage device is fully discharged when the amount of electric energy stored in at least one of the other of the storage portions as the second part of the storage device is larger than a predetermined threshold. Accordingly, the second aspect of the invention provides the same advantages as the first aspect of the invention described above.

The fully discharging means is preferably arranged to operate the electric motor for running the vehicle, with the electric energy stored in the first part of the electric energy storage device, so that the first part of the storage device is fully discharged. In this case, the electric energy generated by the electricity generating means is preferably stored in the second part of the storage device. However, the full discharging of the first part may be effected by connecting the first part of the storage device to suitable energy consuming means such as an electric heater or resistor, so that the electric energy in the first part is consumed by the energy consuming means. In this case, the first part can be positively fully discharged in a comparatively short time. Where an engine which cooperates with the electric motor to function as the drive power source of the vehicle is utilized as part of the electricity generating means, the full discharging of the first part may be accomplished relatively rapidly, by restricting the use of the engine as the drive power source for running the vehicle and comparatively frequently using the electric motor as the drive power source, so that the electric energy in the first part of the storage device can be rapidly consumed by the electric motor.

The vehicle according to the second aspect of the invention may further comprise fully charging means for fully charging at least one of the plurality of storage portions of the electric energy storage device when the amount of electric energy stored in at least one of the other of the storage portions is smaller than a predetermined lower limit. Preferably, the fully charging means is adapted such that the electric energy generated by the electricity generating means is stored primarily in the above-indicated at least one of the plurality of storage portions of the storage device, while the electric motor is operated primarily by the electric energy stored in the above-indicated at least one of the other of the plurality of storage portions of the storage device. However, it is possible to operate the electricity generating means for the purpose of fully charging the above-indicated at least one of the storage portions, unless the operation of the electricity generating means for this purpose is not desirable for some other reason.

The vehicle according to the second aspect of the invention which comprises the fully discharging means and may optionally comprise the fully charging means may have various arrangements as described below.

(a) The plurality of storage portions of the storage device are sequentially fully discharged in a predetermined order. Where the storage device consists of two storage portions, these two storage portions are alternately fully discharged, for instance, at a predetermined time interval. The storage portions may be sequentially fully charged in a predetermined order.

(b) The plurality of storage portions of the storage device are sequentially fully discharged at a predetermined interval, depending upon the cumulative time of use of the storage device, or the cumulative running time or distance of the electric vehicle (hybrid vehicle). For instance, the storage portions are selectively fully discharged each time the cumulative running distance has reached a predetermined value. Similarly, the storage portions may be sequentially or selectively fully charged at a predetermined interval. The fully discharging interval may be determined by experiments so that the storage capacity of each storage portion of the storage device can be recovered by the full discharging, before the storage capacity is excessively reduced due to repeated charging of the storage device.

(c) The electricity generating means is inhibited from operating to fully charge the storage portion or portions of the storage device, while the vehicle is at rest with the drive power source held in its idling state with the accelerator pedal being placed at its non-operated position. The operation of the electricity generating means such as an engine may cause vibrations and noises, which would give a discomfort to the passengers when the vehicle is at rest in the idling state.

(d) The fully discharging means is inhibited from operating when an amount of a fuel used for the electricity generating means is smaller than a predetermined lower limit. Where an engine is used as part of the electricity generating means, a gasoline is used as the fuel. Where a fuel cell is used as the electricity generating means, hydrogen or oxygen is used as the fuel.

(e) The fully discharging means is operated only where all of the plurality of storage portions of the storage device are normally functioning. This condition also applies to the fully charging means if provided.

(f) The fully discharging means is operated when the total electric energy amount of the storage device is larger than a predetermined lower limit (e.g., about 30% of the nominal or full storage capacity of the storage device).

(g) The fully discharging means is operated when the total electric energy amount of the storage device is smaller than a predetermined upper limit (e.g., about 80% of the nominal or full storage capacity).

The operation of the fully discharging means according to the first and second aspect of this invention is effective particularly when the electric energy storage device is adapted to be normally used within a predetermined range of its total electric energy amount (e.g., between 30% and 80% of the nominal storage capacity of the storage device), in which the charging and discharging efficiency is sufficiently high. The storage device may be selected from various secondary batteries or cells, such as nickel-cadmium cells and nickel-hydrogen cells.

The fully discharging means need not be adapted to discharge the appropriate storage portion or portions of the storage device until the electric energy amount in the storage portion or portions is completely zeroed. Rather, the fully discharging means may be adapted to reduce the electric energy amount of each appropriate storage portion to a value below the lower limit above which the storage portion is normally used. Similarly, the fully charging means need not be adapted to charge each appropriate storage portion until the electric energy amount is increased to the full 100% value of the nominal storage capacity, but may be adapted to increase the electric energy amount to a value above the upper limit below which the storage portion is normally used.

According to one preferred form of the second aspect of the invention, the electrically driven automotive vehicle further comprises charging control means for operating the electricity generating means to charge the second part of the electric energy storage device when the amount of electric energy stored in said first part of the storage device has been reduced to a predetermined threshold by the fully discharging means.

The above form of the invention is effective to prevent insufficiency of the total electric energy amount of the electric storage device due to the full charging of the selected storage portion or portions, and therefore permits running of the vehicle by the electric motor even when the fully charging means is operated.

The charging control means need not be adapted to charge all of the storage portions of the second part of the storage device, but may be adapted to charge a selected one of the storage portions of the second part.

The charging control means may be adapted to interrupt the operation of the fully discharging means when the electric energy amount stored in the first part of the storage device has been reduced to the predetermined threshold by the fully discharging means, and charge the second part of the storage device until the electric energy amount stored in the second part is increased to a predetermined value.

The object indicated above may also be achieved according to a third aspect of this invention, which provides an electrically driven automotive vehicle comprising: an electric energy storage device for storing an electric energy, the electric energy storage device including a plurality of storage portions which can be charged and discharged independently of each other; an electric motor operated by the electric energy supplied from the electric energy storage device, for running the vehicle; and fully discharging means for transferring the electric energy from a first part of the electric energy storage device which consists of at least one of the plurality of storage portions, to a second part of the electric energy storage device which consists of at least one of the other of the plurality of storage portions, to thereby fully discharge the first part, when a total amount of electric energy stored in the electric energy storage device is larger than a predetermined threshold.

In the electrically driven automotive vehicle constructed according to the third aspect of this invention, the first part of the electric energy storage device is fully discharged when the total electric energy amount of the storage device is smaller than a predetermined threshold. The first part is fully discharged such that the electric energy is transferred from the first part to the second part. This arrangement prevents a decrease in the storage capacity of the electric energy storage device due to repeated charging, while avoiding insufficiency of the electric energy amount for running the vehicle.

The fully discharging means according to the third aspect of the invention is preferably adapted to be operated when at least one of various conditions other than the condition that the total electric energy amount of the storage device is larger than the predetermined threshold. Those other conditions include: a condition that the temperature of the storage device is higher than a predetermined lower limit; a condition that the running time of the vehicle has exceeded a predetermined value; a condition that the running distance of the vehicle has exceeded a predetermined value; a condition that the charging and discharging efficiency of the storage device has been lowered below a predetermined value; and a condition that the cumulative time of use of the storage device has exceeded a predetermined value. The first and second parts of the storage device may be alternately fully discharged.

According to a first preferred form of the third aspect of this invention, the electrically driven automotive vehicle further comprises: electricity generating means for generating the electric energy; and charging control means for operating the electricity generating means to generate the electric energy for charging the electric energy storage device until the total amount of electric energy stored in the electric energy storage device is increased to the predetermined threshold, before the fully discharging means is operated to fully discharge the first part of the electric energy storage device.

In the above preferred form of the invention, the electric energy storage device is charged until the total electric energy amount is increased to the predetermined threshold before the fully discharging means is operated to fully discharge the first part of the storage device. This form of the invention permits full discharging of the first part of the storage device while avoiding insufficiency of the electric energy amount for running the vehicle.

In one advantageous arrangement of this form of the third aspect of the invention invention, the charging control means is operated to charge the second part of the electric energy storage device. This arrangement assures a reduced amount of energy loss upon transfer of the electric energy from the first part to the second part. In this arrangement, the amount of the electric energy to which the second part is charged is preferably selected to be sufficient for operating the electric motor to run the vehicle, but to be smaller than an upper limit above which the second part is excessively charged when the electric energy is transferred from the first part to the second part by the fully discharging means.

According to a second preferred form of the third aspect of the invention, the fully discharging means is adapted to transfer the electric energy from the first part of the electric energy storage device to the second part to fully discharge the first part, when the amount of electric energy stored in the second part of the electric energy storage device is held within a predetermined range. This form of the invention prevents a decrease in the storage capacity of the storage device while avoiding insufficiency of the electric energy amount for running the vehicle and excessive charging of the second part of the storage device. Further, the fully charging of the first part of the storage device can be completed in a short time since the excessive charging of the second part is avoided.

According to a third preferred form of the third aspect of the invention, the fully discharging means transfers the electric energy from the first part of the electric energy storage device to the second part to fully discharge the first part, when a sum of amounts of electric energy stored in the first and second parts (64, 66) of the electric energy storage device is held within a predetermined range. This third preferred form of the invention has the same advantage as the second preferred form of the invention described above.

The fully discharging means according to the above second and third preferred forms of the third aspect of the invention is preferably operated when at least one of the various conditions indicated above is satisfied in addition to the condition relating to the electric energy amount of the second part or the sum of the electric energy amounts of the first and second parts.

The object indicated above may also be achieved according to a fourth aspect of the present invention, which provides an electrically driven automotive vehicle comprising: electricity generating means for generating an electric energy; an electric energy storage device for storing the electric energy generated by the electricity generating means, the electric energy storage device including a plurality of storage portions which can be charged and discharged independently of each other; an electric motor operated by the electric energy supplied from the electric energy storage device, for running the vehicle; fully discharging means for transferring the electric energy from a first part of the electric energy storage device which consists of at least one of the plurality of storage portions, to a second part of the electric energy storage device which consists of at least one of the other of the plurality of storage portions, to thereby fully discharge the first part; electric amount control means for controlling the amount of electric energy stored in the electric energy storage device such that a sum of amounts of electric energy stored in the first and second parts does not exceed a predetermined upper limit; upper limit changing means for reducing the upper limit before the fully discharging means is operated to fully discharge the first part; and full discharge permitting means for permitting the fully discharging means to be operated after the sum of the amounts of electric energy stored in the first and second parts has been reduced to the upper limit reduced by the upper limit changing means.

In the electrically driven automotive vehicle constructed according to the fourth aspect of this invention, the upper limit of the sum of amounts of electric energy of the first and second parts of the electric energy storage device is reduced before the fully discharging means is operated for fully discharging the first part. This arrangement permits efficient full discharging of the first part of the storage device in a short time, so as to prevent a decrease in the storage capacity of the storage device due to repeated charting thereof, while avoiding excessive charting of the second part of the storage device.

The upper limit changing means may be adapted to reduce the original upper limit to a half of the original upper limit, provided that the first and second parts of the storage device have the same storage capacity.

The object indicated above may also be achieved according to a fifth aspect of this invention, which provides an electrically driven automotive vehicle comprising: an electric energy storage device for storing an electric energy, the electric energy storage device including a plurality of storage portions which can be charged and discharged independently of each other; an electric motor operated by the electric energy supplied from the electric energy storage device, for running the vehicle; and fully discharging means for fully discharging all of the plurality of storage portions of the electric energy storage device, according to a predetermined condition, such that a first part of the electric energy storage device which consists of at least one of the plurality of storage portions is fully discharged while a second part of the electric energy storage device which consists of the other of the plurality of storage portions is not fully charged, and such that the first part and the second part are changed according to a predetermined rule.

In the electrically driven automotive vehicle constructed according to the fifth aspect of the invention, all of the plurality of storage portions of the electric energy storage device may be sequentially fully discharged in a predetermined order. That is, all of the storage portions are sequentially selected as the first part in the predetermined order. Alternatively, all of the plurality of storage portions are fully discharged such that the storage portions whose charging and discharging efficiency is comparatively low are discharged more frequently than the other storage portions, so that the storage portions whose charging and discharging efficiency is comparatively low are eventually fully discharged. Thus, the storage portions that are required to be fully discharged are fully discharged. This arrangement prevents a decrease in the storage capacity of the storage device due to repeated charting thereof, while avoiding deterioration of the storage device due to unnecessarily frequent full discharging and charging of the storage device.

For instance, each of the storage portions of the storage device is selected alternately as the first part and the second part. Where the storage device consists of two storage portions, for example, these two storage portions are alternately fully discharged at a predetermined interval. Alternatively, one of the storage portions whose charging and discharging efficiency is lower than the other storage portion is discharged more frequently than the other storage portion. For example, the above-indicated one storage portion is discharged two consecutive times each for a predetermined time, and then the other storage portion is discharged for the predetermined time. These discharging operations are repeated so that the storage portion whose charging and discharging efficiency is lower is more frequently fully discharged than the other storage portion.

The object indicated above may also be achieved according to a sixth aspect of this invention, which provides an electrically driven automotive vehicle comprising: an electric energy storage device for storing an electric energy, the electric energy storage device including a plurality of storage portions which can be charged and discharged independently of each other; an electric motor operated by the electric energy supplied from the electric energy storage device, for running the vehicle; fully discharging means for changing at least one of the plurality of storage portions of the electric energy storage device; operation control means for controlling the vehicle, on the basis of a total amount of electric energy stored in the electric energy storage device, as compared with at least one threshold value; and threshold changing means for changing the at least one threshold value used by the operation control means, when at least one of the plurality of storage portions cannot be used.

In the electrically driven automotive vehicle constructed according to the sixth aspect of the invention, the fully discharging means prevents a decrease in the storage capacity of the electric energy storage device due to repeated charting thereof. Further, when at least one of the plurality of storage portions of the storage device cannot be used, the at least one threshold value used by the operation control means for controlling the operation of the vehicle is changed. For instance, the operation control means determines whether the storage device can be charged with the electric energy generated by suitable electricity generating means. This determination is effected on the basis of the total electric energy amount stored in the storage device, as compared with the threshold value or values. If, for example, one of the plurality of storage portions of the storage device cannot be used since this one storage portion is in the process of being fully discharged by the fully discharging means, the other storage portions are used for operating the electric motor or storing the generated electric energy. In this case, the threshold changing means changes the threshold value or values (e.g., reduces the upper limit), and the operation control means controls the vehicle, for example, determines the continued use of the above-indicated other storage portions, on the basis of the electric energy amounts stored in those other storage portions as compared with the changed threshold value or values. Accordingly, the operation of the vehicle can be suitably controlled by the operation control means even while one or more storage portions of the storage device is/are in the process of being fully discharged.

One or more of the plurality of storage portions of the storage device cannot be used due to full discharging or defect or malfunction thereof. In this case, the electric motor is operated by the electric energy supplied from the other storage portion or portions, and the electric energy generated by electricity generating means is stored in the above-indicated other storage portion or portions. While all of the plurality of storage portions can be used without full discharging or defect, the determination as to whether the storage device can be used to store the generated electric energy, for example, can be effected on the basis of the total electric energy stored in the storage device as compared with the original threshold value or values. If, for example, one of the two storage portions having the same storage capacity of the storage device cannot be used, the threshold changing means reduces each threshold value to a half of the original threshold value, for example, so that the determination is effected on the basis of the electric energy amount stored in the other storage device as compared with the thus reduced threshold value or values. Where the storage device consists of a plurality of storage portions having different storage capacities, for example, the threshold changing means may be adapted to change each threshold value, depending upon the storage capacities of the storage portions which can be used.

The operation control means may be operation mode selecting means for selecting one of a plurality of operation modes of a hybrid electric vehicle equipped with an engine and a motor/generator which cooperate to function as a drive power source. In this instance, the operation modes may include: an engine drive mode in which only the engine is operated as the drive power source for running the vehicle; a motor drive mode in which only the motor/generator is operated as an electric motor and as the drive power source for running the vehicle; and an engine drive and charging mode in which the engine is operated as the drive power source to run the vehicle, while driving an electric generator (which may be the motor/generator) to generate the electric energy for charging the electric energy storage device. In this case, the operation mode selecting means normally selects an appropriate one of the operation modes, on the basis of the total electric energy amount stored in the storage device as compared with the original threshold value or values. If the original threshold value or values were used when at least one of the storage portions cannot be used, the operation mode selecting means would erroneously determine that the electric energy amount stored in the storage portion or portions that can be used is insufficient although the storage portion or portions that can be used is/are fully charged in fact. In this event, the storage portion or portions that can be used may be be excessively charged, or the selection of the operation mode may not be adequately achieved by the operation mode selecting means.

According to one preferred form of the sixth aspect of the invention, the operation control means includes: first operation control means for controlling the vehicle on the basis of the total amount of electric energy of the electric energy storage device as compared with the at least one threshold value which has not been changed by the threshold changing means; and second operation control means for controlling the vehicle on the basis of an amount of electric energy stored in each of the plurality of storage portions of the electric energy storage device as compared with the at least one threshold value which has been changed y the threshold changing means.

In the above form of the invention, the vehicle is controlled by the first operation control means when all storage portions of the storage device are normally functioning, and by the second operation control means when at least one of the storage portions cannot be used due to full discharging or abnormal functioning or defect thereof. Therefore, the vehicle can be adequately controlled by the operation control means including the first and second operation control means, even while at least one of the storage portions is in the process of being fully discharged.

The first operation control means and the second operation control means may be first and second operation mode selecting means, respectively. In this case, the operation mode of the vehicle is selected by the first operation mode selecting means when all of the storage portions of the storage device can be used, and by the second operation mode selecting means when at least one of the storage portions cannot be used.

In the vehicle according to the sixth aspect of the invention, all of the plurality of storage portions of the storage device preferably have the same nominal storage capacity. In this case, the operation control means preferably comprises means for controlling the operation of the vehicle such that the electric energy amounts stored in the storage portions are equalized.

The object indicated above may also be achieved according to a seventh aspect of the present invention, which provides an electrically driven automotive vehicle comprising: electricity generating means for generating an electric energy; an electric energy storage device for storing the electric energy generated by the electricity generating means; an electric motor operated by the electric energy supplied from the electric energy storage device, for running the vehicle; fully discharging means for fully discharging the electric energy storage device; and motor operating means for operating the electricity generating means to generate an electric energy to for operating the electric motor while the electric energy storage device is being fully discharged by the fully discharging means.

In the electrically driven automotive vehicle constructed according to the seventh aspect of this invention, the electricity generating means is operated to generate the electric energy for operating the electric motor for running the vehicle while the electric energy storage device is in the process of being fully discharged and cannot be used to operate the electric motor. This arrangement prevents a decrease in the storage capacity of the electric energy storage device while preventing insufficiency of the electric energy for running the vehicle.

In the vehicle according to the seventh aspect of the invention, the electric energy storage device need not have a plurality of storage portions which can be charged and discharged independently of each other.

The object indicated above may also be achieved according to an eighth aspect of this invention, which provides an electrically driven automotive vehicle comprising: an electric energy storage device for storing an electric energy, the electric energy storage device including a plurality of storage portions which can be charged and discharged independently of each other; an electric motor operated by the electric energy supplied from the electric energy storage device; and fully discharging means for fully discharging at least one of the plurality of storage portions of the electric energy storage device, each time at least one predetermined condition is satisfied.

In the electrically driven automotive vehicle constructed according to the eighth aspect of this invention, the fully discharging means is operated to fully discharge one or more of the storage portions of the electric energy storage device each time predetermined condition or conditions is/are satisfied. This arrangement prevents a decrease of the storage capacity of the electric energy storage device due to repeated charting thereof while avoiding deterioration of the storage device due to unnecessarily frequency fully discharging and charging thereof.

The predetermined condition or conditions used according to the eighth aspect of the invention may include at least one of: (a) a condition that the cumulative time of use of the storage device has reached a predetermined threshold; (b) a condition that the cumulative running distance of the vehicle has reached a predetermined threshold; (c) a condition that the cumulative running time of the vehicle has reached a predetermined threshold; (d) a condition that the charging and discharging efficiency of the storage device has been lowered below a predetermined lower limit; (e) a condition that the amount of a fuel such as a gasoline is larger than a predetermined threshold; (f) a condition that the temperature of the storage device is lower than a predetermined lower limit; and (g) a condition that all of the storage portions of the storage device are defective or not normally functioning. The thresholds of the above-indicated time of use, running distance and time may be reduced with an increase in the cumulative time of use of the vehicle.

According to one preferred form of the above eighth aspect of the invention, the automotive vehicle further comprises full discharge restricting means for restriction an operation of the fully discharging means when the at least one predetermined condition is not satisfied. For example, the operation of the fully discharging means is restricted or inhibited if the temperature of the storage device is lower than the predetermined lower limit or if the storage portions of the storage device are all defective. This arrangement prevents full discharging of the storage device under undesirable conditions which may cause deterioration of the storage device. It is desirable to provide temperature raising means for raising the temperature of the storage device if the temperature is lower than the lower limit, before the fully discharging means is operated.

According to another preferred form of the eighth aspect of the invention, the automotive vehicle further comprises service life determining means for determining that a nominal service life of the electric energy storage device has been reached, if a charging and discharging efficiency of the electric energy storage device is lower than a predetermined lower limit immediately after the at least one of the plurality of storage portions is fully discharged by the fully discharging means. This arrangement makes it possible to inform the vehicle operator that the nominal-life of the storage device has been reached. It is desirable that the service life determining means is operated when the storage device is in a stable state with its temperature higher than a predetermined lower limit. Further, the determination may be effected for each other plurality of storage portions of the storage device. In this case, the ratio of recovery of the charging and discharging efficiency by the full discharging of each storage portion is compared with that of the other storage portion or portions, and the determination is made on the basis of a difference of these ratios. Namely, if the difference is larger than a predetermined threshold, the service life determining means determines that the nominal service life of the appropriate storage portion has been reached. It is preferred to provide means for indicating that the nominal service life has been reached.

The object indicated above may also be achieved according to a ninth aspect of this invention, which provides an electrically driven automotive vehicle comprising: an electric energy storage device for storing an electric energy, the electric energy storage device including a plurality of storage portions which can be charged and discharged independently of each other; an electric motor operated by the electric energy supplied from the electric energy storage device; and fully discharging means for fully discharging at least one of the plurality of storage portions of the electric energy storage device, while the automotive vehicle is stationary with a start switch being off.

In the electrically driven automotive vehicle constructed according to the ninth aspect of the invention, the full charging of the storage device by the fully charging means prevents a decrease of the storage capacity of the storage device due to repeated charging thereof. Since this full charging is effected while the vehicle is not running with the start switch being off, the control to effect the full charging can be made simpler than in the case where the full charging is effected while the vehicle is running with the storage device being used. It is desirable to provide means for detecting the vehicle operator or any passenger within the vehicle, so that the fully discharging means is operated when the vehicle operator or any passenger is detected within the vehicle.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which:

FIG. 3 is a view indicating operating states of various coupling elements for establishing different operating positions of an automatic transmission in the hybrid drive system of FIG. 1;

FIG. 7 is a view indicating nine operating modes which are selectively established in the sub-routine of FIG. 6;

FIG. 29 is a view indicating operating states of coupling elements for establishing operating positions of the automatic transmission in the hybrid drive system of FIG. 28.

DETAILED DESCRIPTION OF THE PREFERRED EMBODIMENTS

Figure 1:
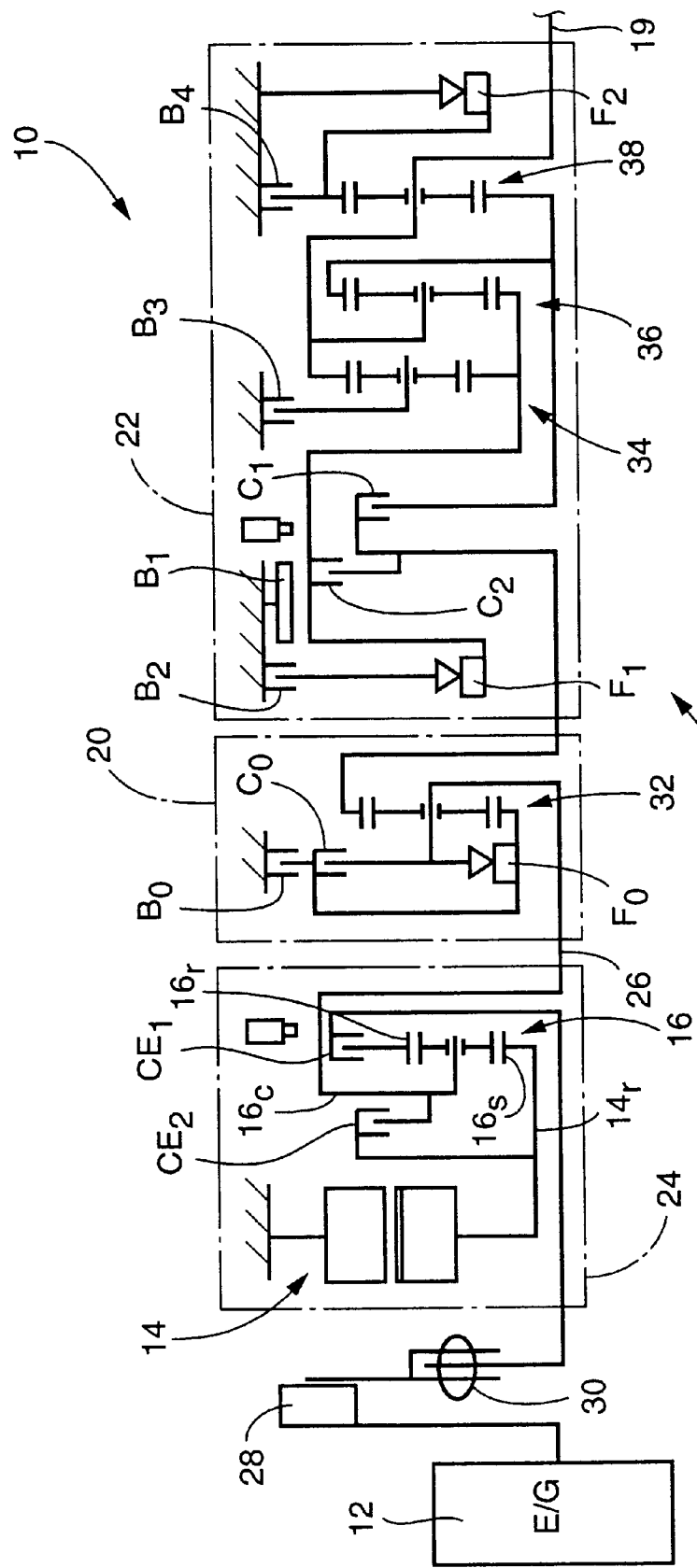
FIG. 1 is a schematic view illustrating a general arrangement of a hybrid drive system constructed according to one embodiment of the present invention.

Referring first to the schematic view of FIG. 1, there is shown a hybrid drive system 10 adapted for use on a front-engine rear-drive vehicle (FR vehicle). The hybrid drive system 10 includes: an engine 12 such as an internal combustion engine, which is operated by combustion of a fuel; a motor/generator 14 which functions as an electric motor and an electric generator; a planetary gear device 16 of single pinion type; and a power transmission device in the form of an automatic transmission 18. These engine 12, motor/generator 14, planetary gear device 16 and automatic transmission 18 are arranged in the longitudinal direction of the vehicle. The automatic transmission 18 has an output shaft 19 which is operatively connected to rear right and left drive wheels of the vehicle through a propeller shaft and a differential gear device (which are not shown), to transmit a drive force to the drive wheels. It will be understood that the engine 12 and the motor/generator 14 cooperate to provide electricity generating means for generating an electric energy.

The planetary gear device 16 functions as a synthesizing/distributing mechanism for mechanically synthesizing and distributing a force, and cooperates with the motor/generator 14 to constitute an electrically controlled torque converter 24 as indicated in one-dot chain line in FIG. 1. The planetary gear device 16 includes: a first rotary element in the form of a ring gear 16r connected to the engine 12 through a first clutch CE1; a second rotary element in the form of a sun gear 16s connected to a rotor shaft 14r of the motor/generator 14; and a third rotary element in the form of carrier 16c connected to an output shaft, which is an input shaft 26 of the automatic transmission 18. The sun gear 16s and carrier 16c are connected to each other through a second clutch CE2.

The engine 12 is connected to the first clutch CE1 through a flywheel 28 and a damper 30. The flywheel 28 and the damper 30 function to absorb speed and torque variations of the engine 12. The damper 30 includes an elastic member such as a spring or a rubber member. The first and second clutches CE1, CE2 are friction type multiple-disk clutches which are engaged and released by respective hydraulic actuators.

The automatic transmission 18 is a combination of a front auxiliary transmission 20 and a rear primary transmission 22. The auxiliary transmission 20 consists of an overdrive planetary gear set 32 of single pinion type, while the primary transmission 22 consists of three planetary gear sets 34, 36, 38 connected to each other. The primary transmission 22 has five forward-drive positions and one rear-drive position. The auxiliary transmission 20 includes frictionally coupling clutch C0 and brake B0 operated by respective hydraulic actuators, and a one-way clutch F0.

The primary transmission 22 frictionally coupling clutches C1, C2 and brakes B1, B2, B3, B4 which are operated by respective hydraulic actuators, and one-way clutches F1, F2.

Figure 2:
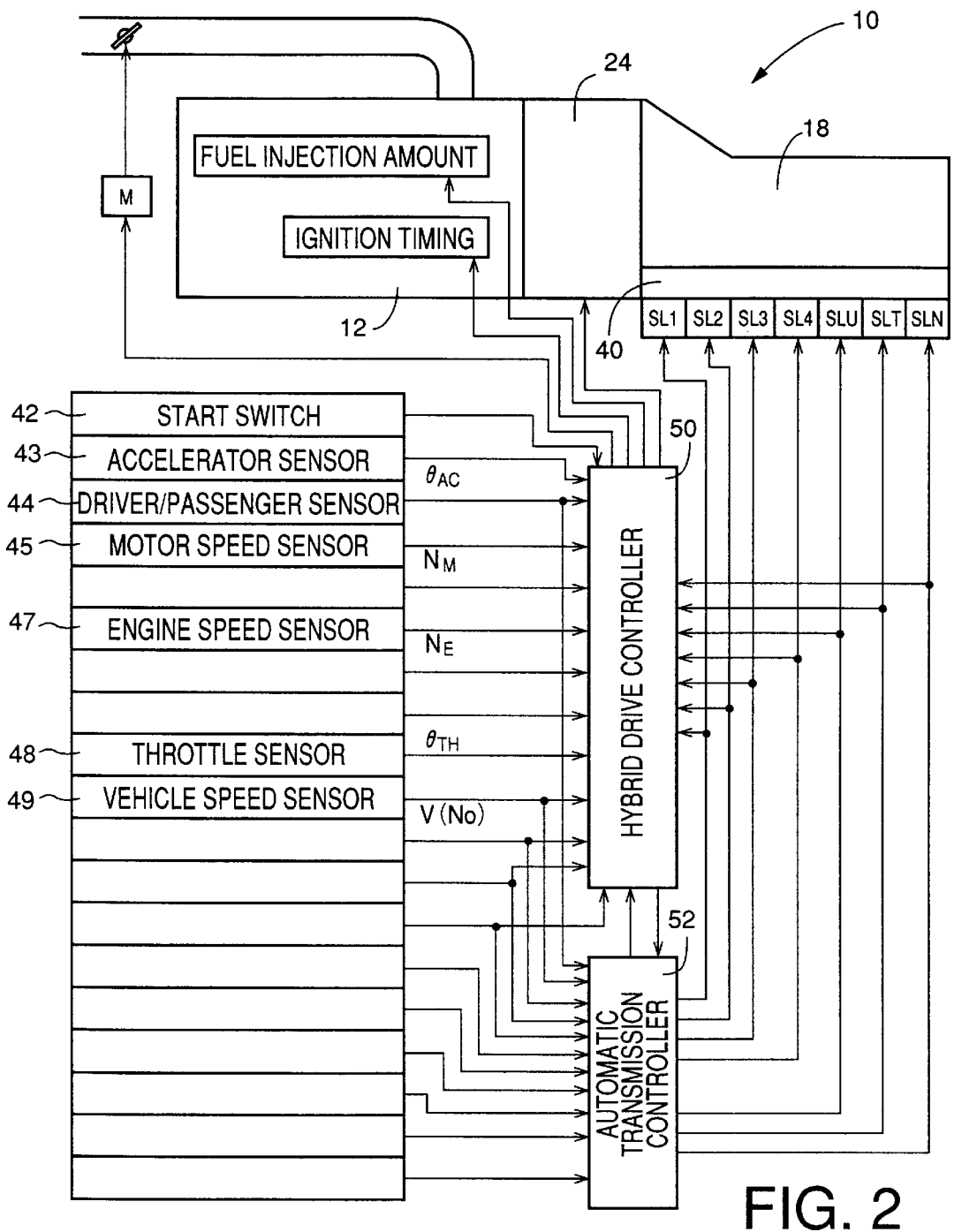
FIG. 2 is a view illustrating a control system used in the hybrid drive system of FIG. 1.

The automatic transmission 18 includes a hydraulic control device 44 incorporating solenoid-operated valves SL1–SL4 shown in FIG. 2. The solenoids of these solenoid-operated valves SL1–SL4 are selectively energized and deenergized to selectively engage and release the clutches C0, C1, C2 and brakes B0, B1, B2, B3, B4 for selectively establishing one of operating positions of the automatic transmission 18, as indicated in FIG. 3. The operating positions of the automatic transmission 18 consist of a neutral position "N", a rear-drive position "Rev", and five forward-drive positions, that is, first-speed position "1st", second-speed position "2nd", third-speed position "3rd", fourth-speed position "4th" and fifth-speed position "5th", as indicated in FIG. 3. The hydraulic control device 44 includes a manual shift valve which is mechanically connected to and operated by a shift lever. The clutches C0–C2 and brakes B0–B4 are controlled by the solenoid-operated valves SL1–SL4 and the manual shift valve. The shift lever has a parking position "P", a neutral position "N", a reverse position "R", a drive position "D", and engine braking positions such as a third-speed position "3", a second speed position "2" and a low-speed position "L".

Since the automatic transmission 18 and the electrically controlled torque converter 24 are symmetrical with respect to their centerline, only the upper halves of the transmission 28 and torque converter 24 are shown in FIG. 1.

In the table of FIG. 3, white circles indicate the engaged states of the clutches C, brakes B and one-way clutches F, while black circles indicate the engaged states of the clutch C0 and brakes B1, B4 when the shift lever is shifted to any one of the above-indicated engine braking positions. The absence of the white or black circles indicates the released states of the clutches C, brakes B and one-way clutches F.

The neutral and rear-drive positions "N", "Rev" of the automatic transmission 18 are established by the manual shift valve mechanically connected to the shift lever. When the shift lever is placed in any one of the engine braking positions, the transmission 18 is automatically shifted by the manual shift valve. When the shift lever 240 is placed in the drive position "D", the automatic transmission 18 is automatically placed in an appropriate one of the five forward-drive positions "1st" through "5th", with the solenoids of the solenoid-operated valves SL1–SL4 being selectively energized depending upon the running condition of the vehicle. The speed ratios of the five forward-drive positions of the automatic transmission 18 decrease in steps from the speed ratio of the first-speed position "1st" to the speed ratio of the fifth-speed position "5th", as indicated in FIG. 3, by way of example only. The fourth-speed position "4th" has a speed ratio $i_4$ which is equal to 1.

As is apparent from the table of FIG. 3, the shifting actions of the automatic transmission 18 between the second-speed and third-speed positions "2nd" and "3rd" are effected by simultaneous engaging and releasing actions of the second and third brakes B2, B3. Described more specifically, the shift-up action from the second-speed position "2nd" to the third-speed position "3rd" is achieved by engaging the second brake B2 while releasing the third brake B3, and the shift-down action from the third-speed position "3rd" to the second-speed position "2nd" is achieved by engaging the third brake B3 while releasing the second brake B2. These shifting actions are referred to as "clutch-to-clutch" shifting actions, where appropriate. To achieve the clutch-to-clutch shifting actions in a smooth fashion, the hydraulic control device 40 is constructed as described below by reference to FIG. 4.

Figure 4:
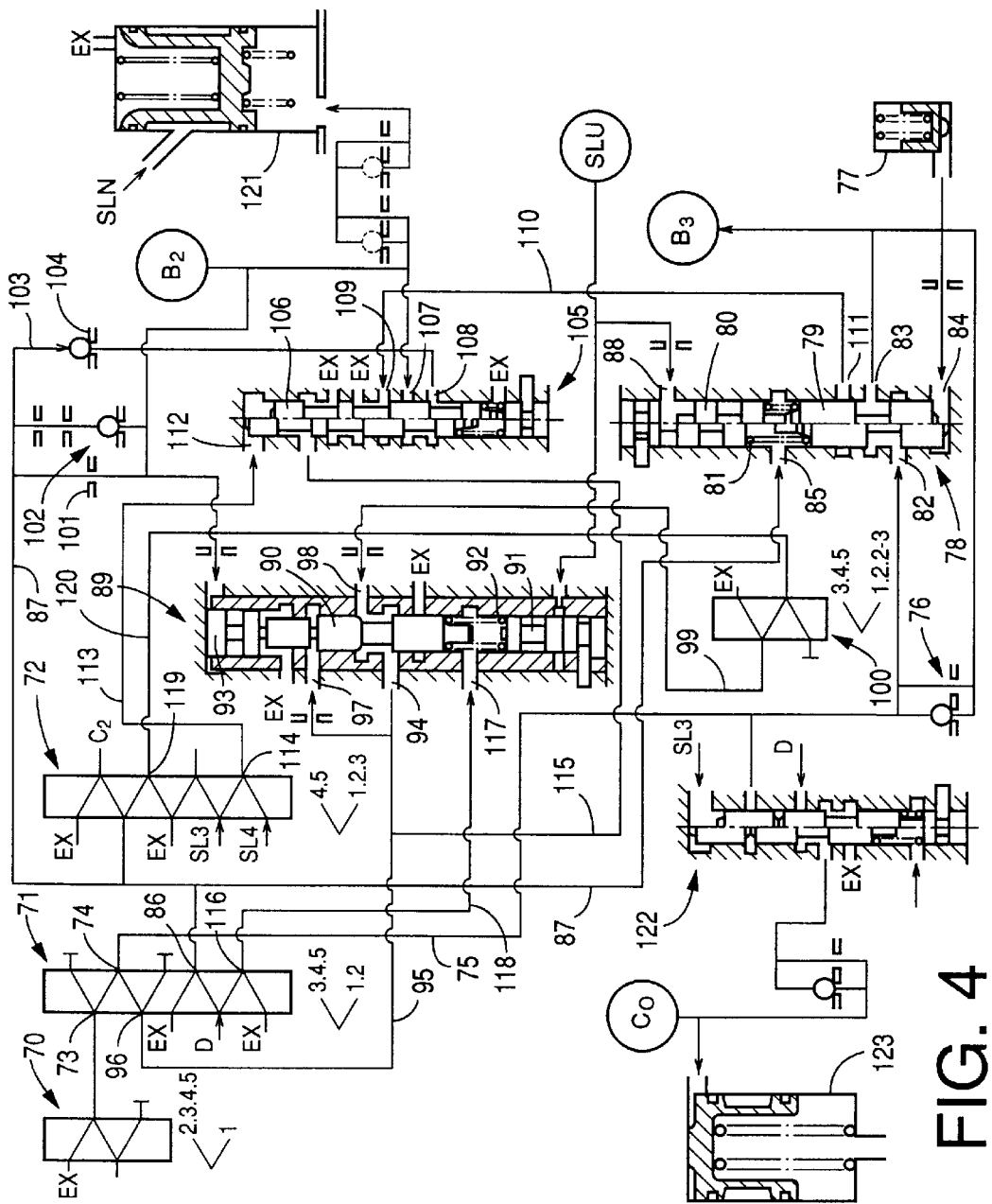
FIG. 4 is a view showing a part of a hydraulic system of the automatic transmission in the hybrid drive system of FIG. 1.

In FIG. 4, reference numerals 70, 71 and 72 denote a 1-2 shift valve, a 2-3 shift valve and a 3-4 shift valve, respectively. Working fluid communications of ports of these shift valves 70, 71, 72 are indicated below the shift valves as shown in FIG. 4 in which the five forward-drive positions "1st", "2nd", "3rd", "4th" and "5th" are represented as "1", "2", "3", "4" and "5", respectively.

The 2-3 shift valve 71 has an input port 73 and a brake port 74 which communicate with each other when the automatic transmission 18 is placed in the first-speed position "1st" or the second-speed position "2nd". The above-indicated third brake B3 is connected to the brake port 74 through an oil passage 75. The oil passage 75 has an orifice 76, and a damper valve 77 is connected between the orifice 76 and the third brake B3. The damper valve 77 functions to absorb a small amount of the working oil to thereby achieve a damping action upon an abrupt rise of a line pressure PL applied to the third brake B3.

Reference numeral 78 in FIG. 4 denotes a B-3 control valve which is provided to directly regulate the engaging pressure of the third brake B3. The B-3 control valve 78 includes a spool 79, a plunger 80, and a spring 81 disposed between the spool 79 and the plunger 80. The B-3 control valve 78 has an input port 82 which is opened and closed by the spool 79 and to which the oil passage 75 is connected, and an output port 83 which is selectively communicable with the input port 82 and to which the third brake B3 is connected. The output port 82 is connected to a feedback port 84 which is partially defined by one end of the spool 79.

The B-3 control valve 78 further has a port 85 communicating with a chamber in which the spring 79 is disposed. The 2-3 shift valve 71 has a port 86 which produces a hydraulic pressure output (line pressure PL) when the automatic transmission 18 is placed in one of the forward-drive positions "3rd", "4th" and "5". The port 86 is connected to the port 85 of the B-3 control valve 78 through an oil passage 87. The B-3 control valve 78 further has a control port 88 adjacent to one end of the plunger 80, and a linear solenoid valve SLU (FIG. 2) is connected to the control port 88, so that a pilot pressure $P_{SLU}$ generated by the linear solenoid valve SLU is applied to the control port 88. In this arrangement, the hydraulic pressure is regulated by the B-3 control valve 78, on the basis of the elastic force of the spring 81 and the hydraulic pressure applied to the port 85. The elastic force of the spring 81 increases with an increase in the pilot pressure $P_{SLU}$ applied to the control port 88.

Reference numeral 89 in FIG. 4 denotes a 2-3 timing valve which includes a spool 90, a first plunger 91, a spring 92 disposed between the spool 90 and the first plunger 91, and a second plunger 93 disposed on the side of the spool 90 remote from the first plunger 91. The spool 90 has a small-diameter land and two large-diameter lands having a larger diameter than the small-diameter land. The 2-3 timing valve 89 has a port 94 formed at an intermediate portion thereof. An oil passage 95 is connected to the port 94, and to a port 96 of the 2-3 shift valve 71, which port 96 is communicated with the brake port 74 when the automatic transmission 18 is placed in one of the forward-drive positions "3rd", "4th" and "5th".

The oil passage 95 has a branch connected through an orifice to a port 97 of the 2-3 timing valve 89, which port 97 is open between the above-indicated small-diameter land one of the two large-diameter lands of the spool 90.

The 2-3 timing valve 89 further has a port 98 which is selectively communicable with the above-indicated port 94 and which is connected through an oil passage 99 to a solenoid relay valve 100.

The 2-3 timing valve 89 further has a port which is adjacent to one end of the first plunger 91 and which is connected to the linear solenoid valve SLU, and another port which is adjacent to one end of the second plunger 93 and which is connected through an orifice to the second brake B2.

The above-indicated oil passage 87 is provided to supply the working oil to the second brake B2 and to discharge the oil from this second brake B2. The oil passage 87 is provided with an orifice 401 having a small diameter, and an orifice 102 with a check ball. The oil passage 87 has a branch 103 which is provided with an orifice 104 having a large diameter. The orifice 104 is provided with a check ball which is moved to an open position when the oil is discharged from the second brake B2. The branch 103 is connected to an orifice control valve 105 described below.

The orifice control valve 105 is provided to control the rate of discharge flow of the oil from the second brake B2. This orifice control valve 105 includes a spool 106, and has a port 107 at an intermediate position. The port 107 is opened and closed by the spool 106 and connected to the second brake B2. The orifice control valve 105 further has a port 108 formed at a position below the port 107 as seen in FIG. 4. The above-indicated branch 103 of the oil passage 87 is connected to the port 108. The orifice control valve 105 further has a port 08 formed at a position above the port 107 as seen in FIG. 4.

The port 108 is selectively communicable with a drain port and is connected through an oil passage 110 to a port 111 of the B-3 control valve 78. The port 111 is selectively communicable with the output port 83 to which the third brake B3 is connected.

The orifice control valve 105 further has a control port 112 formed adjacent to one end of the spool 106 remote from the spring which acts on the spool 106. This control port 112 is connected through an oil passage 113 to a port 114 of the 3-4 shift valve 72. This port 114 produces an output pressure of the third solenoid-operated valve SL3 when the automatic transmission 18 is placed in any one of the forward-drive positions "3rd", "2nd" and "1st", and produces an output pressure of the fourth solenoid-operated valve SL4 when the automatic transmission 18 is placed in the fourth-speed position "4th" or fifth-speed position "5th".

The oil passage 95 has a branch 115 which is connected to the orifice control valve 105. The branch 115 is selectively communicable with the drain port of the orifice control valve 105.

The 2-3 shift valve 71 has a port 116 which produces the hydraulic pressure output (line pressure PL) when the automatic transmission 18 is placed in the first-speed position "1st" or second-speed position "2nd". This port 116 is connected through an oil passage 118 to a port 317 of the 2-3 timing valve 89 which is open to a chamber in which the spring 92 is disposed. The 3-4 shift valve 72 has a port 119 which is communicated with the above-indicated oil passage 87 when the automatic transmission 18 is placed in any one of the positions "3rd", "2nd" and "1st". The port 119 is connected through an oil passage 120 to a solenoid relay valve 100.

Reference numeral 121 in FIG. 4 denotes an accumulator for the second brake B2. The accumulator 121 has a back-pressure chamber to which is applied an accumulator control pressure which is regulated on the basis of an output pressure of a linear solenoid valve SLN (FIG. 2) such that the accumulator control pressure increases with a decrease in the output pressure of the linear solenoid valve SLN. Accordingly, the hydraulic pressures for engaging and releasing the second brake B2 increase as a pilot pressure applied to the linear solenoid valve SLN decreases.

Reference numeral 122 in FIG. 4 denotes a C-0 exhaust valve, and reference numeral 123 denotes an accumulator for the clutch C0. The C-0 exhaust valve 122 is operated to place the clutch C0 in the engaged state for applying an engine brake to the vehicle when the automatic transmission 18 is shifted to the second-speed position "2nd" while the shift lever is placed in the position "2".

In the hydraulic control device 40 constructed as described above, the engaging pressure PB3 of the third brake B3 can be regulated directly by the B-3 control valve 78 when the port 111 of the B-3 control valve 78 is drained. The B-3 control valve 78 is controlled by the linear solenoid valve SLU to regulate the engaging pressure of the third brake B3.

When the spool 106 of the orifice control valve 105 is placed in its left position as indicated in FIG. 4, the working fluid can be discharged from the second brake B2 through the orifice control valve 105, and the releasing speed of the second brake B2 can be controlled by the controlled rate of flow of the fluid through the orifice control valve 105.

The clutch-to-clutch shift-up action of the automatic transmission 18 from the second-speed position "2nd" to the third-speed position "3rd" is effected by slowly releasing the third brake B3 while at the same time slowly engaging the second brake B2. To effectively reduce a shifting shock upon this clutch-to-clutch shift-up action, the hydraulic pressure of the third brake B3 during its releasing action is controlled by the linear solenoid valve SLU on the basis of an input torque of the input shaft 26 of the automatic transmission 18, which input torque has been estimated prior to the clutch-to-clutch shift-up action.

As shown in FIG. 2, the hybrid drive system 10 includes a hybrid drive controller 50 as well as the automatic transmission controller 52 indicated above. Each of these controllers 50, 52 is constituted principally by a microcomputer incorporating a central processing unit (CPU), a random-access memory (RAM), and a read-only memory (ROM). The controllers 50, 52 receive output signals of various detectors or sensors which include: a START switch 42; an accelerator sensor 43 for detecting an operation amount $\theta_{AC}$ of an accelerator pedal; a DRIVER/PASSENGER sensor 44 for detecting the presence of the vehicle operator or driver and/or any passenger within the driver's and/or passengers' compartments of the vehicle; a motor speed sensor 45 for detecting speed $N_M$ of the motor/generator 14; an engine speed sensor 47 for detecting speed $N_E$ of the engine 12; a throttle sensor 48 for detecting the opening angle $\theta_{TH}$ of a throttle valve, which indicates torque $T_E$ of the engine 12; and a vehicle speed sensor 49 for detecting speed $N_O$ of the output shaft 19 of the automatic transmission 18, which indicates running speed V of the vehicle. The START switch 42 is equivalent to an ignition switch provided for an internal combustion engine. When this START switch 42 is ON, the engine 12 and the motor/generator 14 can be operated. The START switch 42 may be a rotary switch, a pushbutton switch or any other type of switch. The PASSENGER switch 44 may be a radar, an infrared radiation sensor, or a pressure-sensitive sensor embedded in passengers' seat.

The controllers 50, 52 also receive signals representing other information such as: rotating speed $N_I$ of the input shaft 26 of the automatic transmission 18; electric energy amount SOC stored in an electric energy storage device 58 (FIG. 5); an operation of a braking system of the vehicle; a currently selected position of a shift lever for the automatic transmission 18; an amount of fuel injection from a fuel injector into the engine 12; and an electric current flowing through the motor/generator 14. The engine torque $T_E$ may be obtained from the fuel injection amount, as well as the opening angle of the throttle valve. A torque $T_M$ of the electric motor 14 may be obtained from the motor current.

The hybrid drive controller 50 is adapted to control the opening angle $\theta_{TH}$ of the throttle valve, and the fuel injection amount and ignition timing of the engine 12, so that the output of the engine 12 is controlled depending upon the specific running condition of the vehicle.

Figure 5:
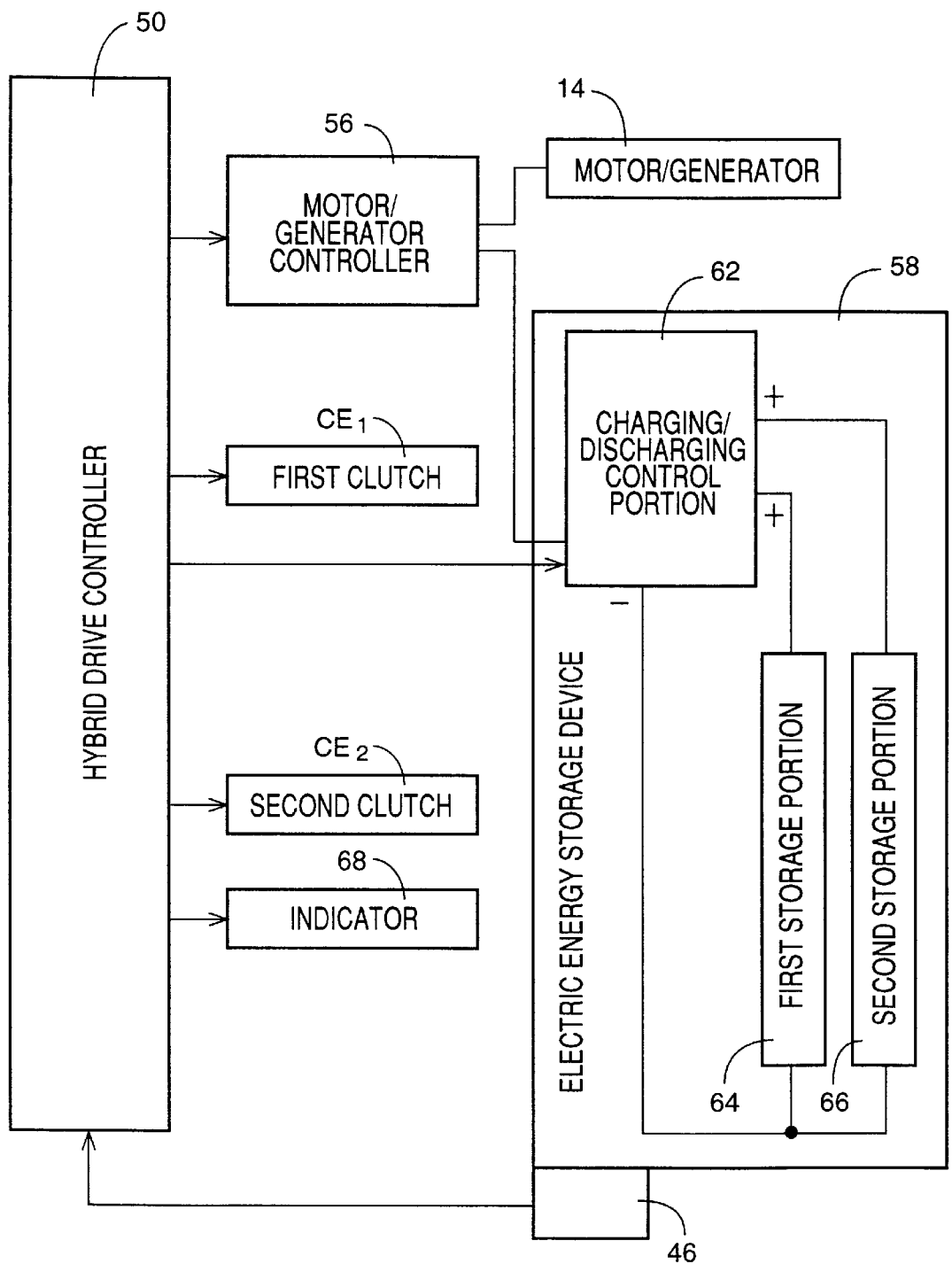
FIG. 5 is a block diagram showing connection between a hybrid drive controller and an electrically operated torque converter shown in FIG. 1.

The motor/generator 14 is connected to the electric energy storage device 58 through a motor/generator controller 56, as indicated in FIG. 5. The motor/generator controller 56 is connected to the motor/generator 14 and the storage device 58, more specifically, to a charging/discharging control portion of the storage device 58. The storage device 58 further includes a first storage portion 64 and a second storage portion 66 for storing an electric energy. The hybrid drive controller 50 is adapted to control the charging/discharging control portion 62 through the motor/generator controller 56, for placing the motor/generator 14 selectively in one of a DRIVE state, a CHARGING state and a NON-LOAD or FREE state. In the DRIVE state, the motor/generator 14 is operated as an electric motor to provide a predetermined torque, with an electric energy being supplied thereto from the first or second storage portion 64, 66. In the CHARGING state, the motor/generator 14 is operated as an electric generator or dynamo, by regenerative braking (i.e., electric braking torque of the motor/generator per se), so as to charge the electric energy storage device 58 with the electric energy. In the NON-LOAD or FREE state, the motor/generator 14 is placed in a non-load condition permitting free rotation of the rotor shaft 14r.

The electric energy storage device 58 is provided with a BATTERY TEMP sensor for detecting the temperature of the storage device 58, by measuring the ambient atmosphere in the vicinity of the storage device 58, or the temperature of the housing of the storage device 58.

The first and second clutches CE1, CE2 are controlled by the hybrid drive controllers 50 through solenoid-operated valves of the hydraulic circuit.

Figure 8:
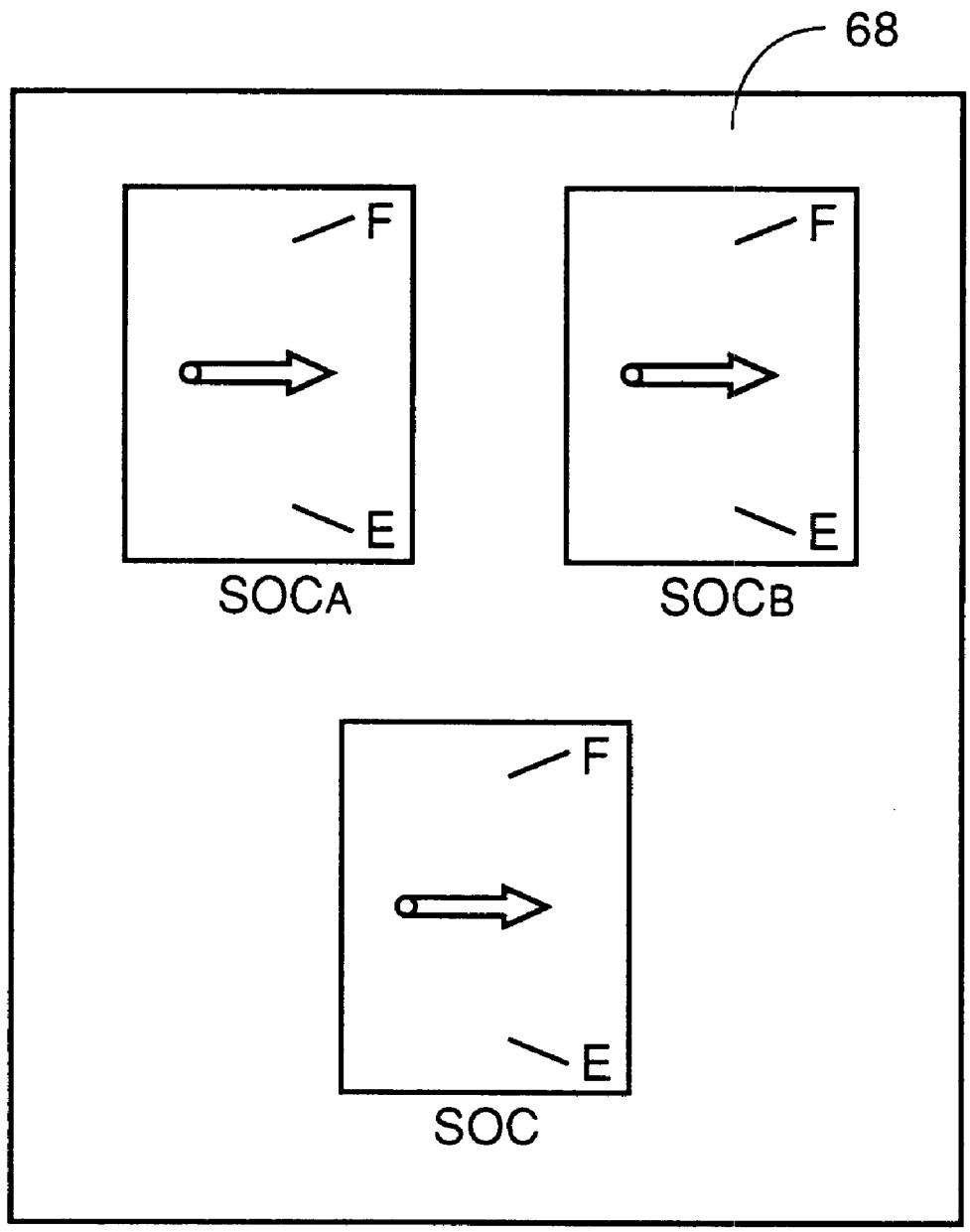
FIG. 8 is a view showing an arrangement of an energy indicator shown in FIG. 5.

An energy indicator 68 is connected to the hybrid drive controller 50, as also indicated in FIG. 5. As shown in FIG. 8, the energy indicator 68 is adapted to indicate the total energy amount SOC stored in the storage device 58, an energy amount SOC A stored in the first storage portion 64, and an energy amount $SOC_B$ stored in the second storage portion 66, under the control of the hybrid drive controller 50. The first and second storage portions 64, 66 can be charged and discharged through the charging/discharging control portion 62, independently of each other. In the present embodiment, the first and second storage portions 64, 66 consist of a pair of nickel-hydrogen batteries which have the same energy storage capacity. The stored energy amounts $SOC_A$ and $SOC_B$ may be obtained by measuring the cumulative amounts of charging and discharging of the storage portions 64, 66, or on the basis of current-voltage characteristics of the storage portions 64, 66. The total energy amount SOC stored in the storage device 58 is the sum of the stored energy amounts $SOC_A$ and $SOC_B$.

The automatic transmission 18 is controlled by the automatic transmission controller 52 through the above-indicated solenoid-operated valves SL1–SL4 and linear solenoid valves SLU, SLT and SLN of the hydraulic control device 44, so that the automatic transmission 18 is shifted to the optimum position depending upon the running condition of the vehicle.

Figure 6:
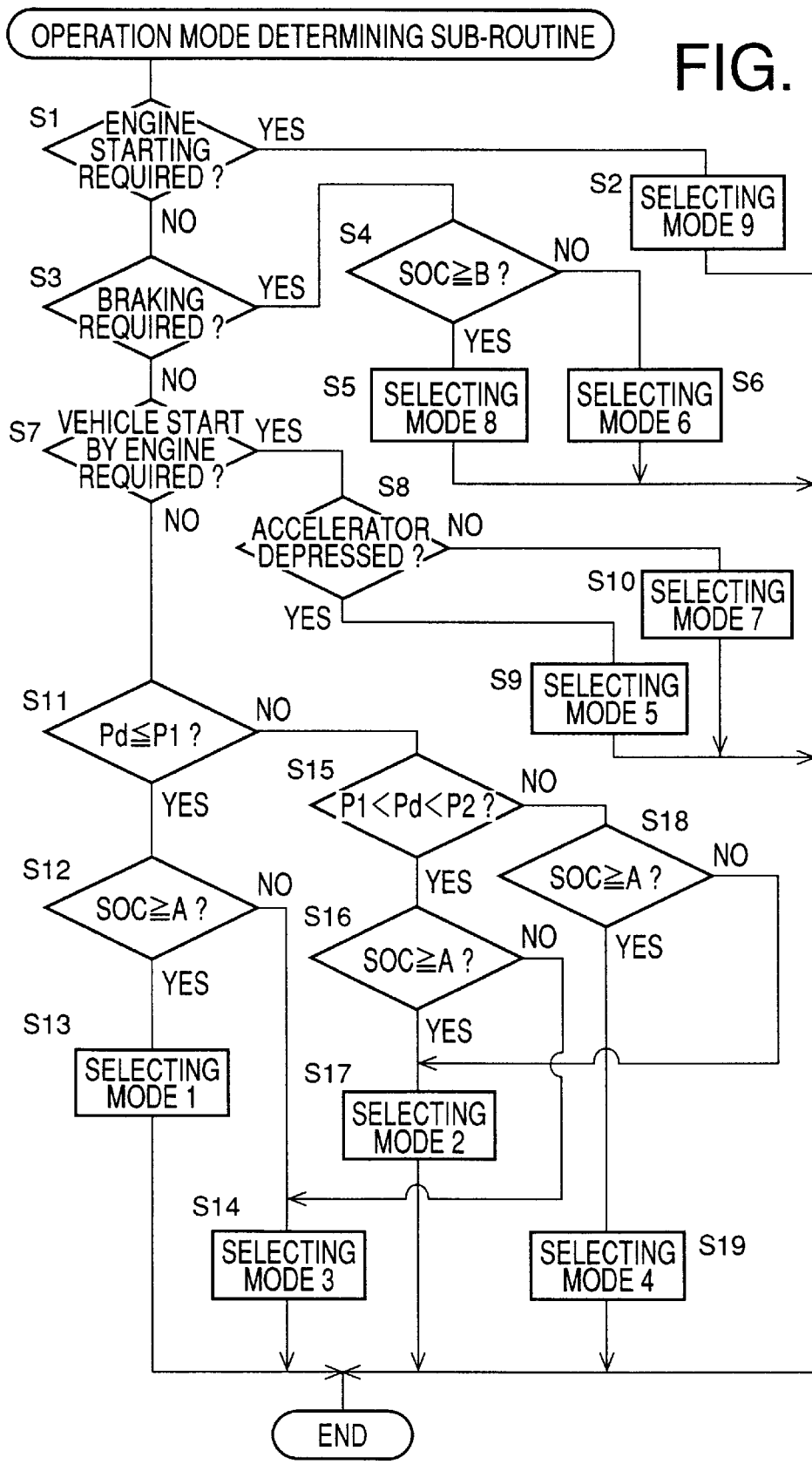
FIG. 6 is a flow chart illustrating an operation mode selecting sub-routine executed by a hybrid drive controller of the hybrid drive system of FIG. 1.

The hybrid drive controller 50 is adapted to execute an operation mode selecting sub-routine illustrated in the flow chart of FIG. 6, for selecting one of nine operation modes of the hybrid drive system 10 indicated in FIG. 7, and for operating the engine 12 and the electrically controlled torque converter 24 in the selected mode, as disclosed in U.S. patent application Ser. No. 08/746,483 filed Nov. 12, 1996.

The operation mode selecting sub-routine of FIG. 6 is initiated with step S1 to determine whether there exists a command requiring the engine 12 to be started, for driving the vehicle with the engine 12 used as the drive power source or for operating the motor/generator 14 for charging the electric energy storage device 58.

If an affirmative decision (YES) is obtained in step S1, the control flow goes to step S2 to select an operation mode 9. In this operation mode 9, the first and second clutches CE1, CE2 are both engaged (turned ON) as indicated in the table of FIG. 7, and the motor/generator 14 is operated to start the engine 12 through the planetary gear device 16, with the fuel injection amount and other conditions of the engine 10 being suitably controlled.

When this operation mode 9 is selected while the vehicle is stationary, the starting of the engine 12 is effected with the automatic transmission 18 placed in the neutral position "N". When the operation mode 9 is selected during running of the vehicle with the motor/generator 14 as the drive power source as in an operation mode 1 in which the first clutch CE1 is in the released state, the first clutch CE1 is engaged, and the motor/generator 14 is operated so as to provide an output which is larger than the output necessary to drive the vehicle by a given surplus amount, so that the engine 12 is started by the surplus output of the motor/generator 14.

Even when the vehicle is running, the engine 12 can be started in the operation mode 9 by temporarily placing the automatic transmission 18 in the neutral position. Thus, the engine 12 can be started by the motor/generator 14. Accordingly, the hybrid drive system does not require an exclusive starter (e.g., starter motor) for starting the engine 12, whereby the number of the required components and the cost of manufacture of the hybrid drive system are accordingly reduced.

If a negative decision (NO) is obtained in step S1, that is, if no command requiring the starting of the engine 12 is present, the control flow goes to step S3 to determine whether brake application to the vehicle is required. For example, this determination may be effected by determining (a) whether a braking system of the vehicle is activated (whether the brake pedal has been depressed) or not, (b) whether the shift lever is placed in the engine braking position "L" or "2" with the operation amount $\theta_{AC}$ of the acceleration pedal being zero, or (c) whether the operation amount $\theta_{AC}$ of the accelerator pedal is zero. In the engine braking position "L" or "2", an engine brake is generally applied to the vehicle when the operation amount $\theta_{AC}$ of the accelerator pedal is zero.

If an affirmative decision (YES) is obtained in step S3, the control flow goes to step S4 to determine whether the amount of electric energy SOC stored in the electric energy storage device 58 is equal to or larger than a predetermined upper limit B. If an affirmative decision (YES) is obtained in step S4, the control flow goes to step S5 to select an operation mode 8. If a negative decision (NO) is obtained in step S4, the control flow goes to step S6 to select an operation mode 6. The upper limit B is an upper limit of the stored electric energy amount SOC below which the electric energy storage device 58 is permitted to be charged. The upper limit B is determined depending upon the charging and discharging efficiencies of the electric energy storage device 58. For instance, the upper limit B is about 80% of the full capacity (nominal capacity) of the electric energy storage device 58.

In the operation mode 8 selected in step S5, the first and second clutches CE1, CE2 are both engaged (turned ON), as indicated in the table of FIG. 7, and the motor/generator 14 is placed in the NON-LOAD state. Further, the engine 12 is turned OFF, that is, the throttle valve 60 is closed, and the fuel injection amount if zeroed. As a result, an engine brake due to the drag resistance of the engine 12 is applied to the vehicle, whereby the required amount of operation of the brake pedal by the vehicle operator is reduced, facilitating the control of the vehicle running. Since the motor/generator 214 is placed in the NON-LOAD state and permitted to rotate freely in the operation mode 8, the electric energy storage device 58 is protected from excessive charging and resulting deterioration of its charging and discharging efficiencies.

In the operation mode 6 selected in step S6, the first clutch CE1 is released (turned OFF) and the second clutch CE2 is engaged (turned ON), while the engine 212 is turned OFF, and the motor/generator 14 is placed in the CHARGING state, as indicated in the table of FIG. 7, whereby the motor/generator 14 is driven by a kinetic energy of the vehicle, so as to charge the electric energy storage device 58 while applying a regenerative brake to the vehicle. The regenerative braking reduces the required amount of operation of the brake pedal and facilitates the control of the vehicle running.

In the operation mode 6 wherein the engine 12 is disconnected from the planetary gear device 16 with the first clutch CE1 placed in the released state, the energy loss of the vehicle due to the drag resistance of the engine 12 is prevented. Further, since the operation mode 6 is selected when the stored electric energy amount SOC is smaller than the upper limit B, the electric energy storage device 58 is protected from excessive charging and resulting deterioration of its charging and discharging efficiencies.

If a negative decision (NO) is obtained in step S3, that is, if no command requiring brake application to the vehicle is present, the control flow goes to step S7 to determine whether the vehicle is required to be started by operation of the engine 12. This determination may be effected by determining whether the vehicle is in a temporary stop during running of the vehicle with the engine 212 used as the drive power source as in an operation mode 3 (which will be described). For instance, the temporary stopping of the vehicle can be detected by checking if the output speed $N_O$ of the output shaft 19 of the automatic transmission 18 is zero. Namely, the output shaft speed $N_O$ is zero when the vehicle is stationary.

If an affirmative decision (YES) is obtained in step S7, the control flow goes to step S8 to determine whether the accelerator pedal is in a depressed state, more specifically, whether the operation amount $\theta_{AC}$ of the accelerator pedal is larger than a predetermined lower limit which is close to zero but larger than zero. If an affirmative decision (YES) is obtained in step S8, that is, if the accelerator pedal is in a depressed state, the control flow goes to step S9 to select an operation mode 5. If a negative decision (NO) is obtained in step S8, the control flow goes to step S10 to select an operation mode 7.

In the operation mode 5 selected in step S9, the first clutch CE1 is engaged (turned ON) and the second clutch CE2 is released (turned OFF), and the engine 12 is operated, as indicated in the table of FIG. 7, whereby the vehicle is started by the engine 12, with the regenerative braking torque of the motor/generator 14 being suitably controlled.

Described in detail, the ratios of the engine torque $T_E$, output torque of the planetary gear device 16 and motor torque $T_M$ are 1:(1+ρE):ρE, where ρE represents a gear ratio of the planetary gear device 16 (ρ=number of teeth of the sun gear 16s divided by number of teeth of the ring gear 16r). When the gear ratio ρE is about 0.5 (as in a common planetary gear device), for example, the torque of the motor/generator 14 is controlled to be equal to a half of the engine torque $T_E$, so that the torque about 1.5 times the engine torque $T_E$ is produced from the carrier 16c of the planetary gear device 16.

In the above arrangement, the vehicle can be started with a torque as large as (1+ρE)/ρE times the torque of the motor/generator 14. If the motor/generator 14 is held in the NON-LOAD state with no current applied to the motor, the output of the carrier 16c is zeroed with the rotor shaft 14r merely rotating in the reverse direction, whereby the vehicle is held stationary.

In the above case, the planetary gear device 16 functions as a vehicle start clutch and a torque booster. With the motor torque $T_M$ (regenerative braking torque) gradually increased from zero to increase a reaction force of the motor/generator 14, the vehicle can be smoothly started with the output torque which is (1+ρ) times the engine torque $T_E$.

The motor/generator 14 used in the hybrid drive system 10 of the present embodiment has a torque capacity which is about ρE times the maximum torque of the engine 12. Namely, the torque capacity and size of the motor/generator 14 are minimized to minimize the size and cost of manufacture of the hybrid drive system 10, while assuring the required torque.

The present hybrid drive system 10 is further adapted so that the opening angle $\theta_{TH}$ of the throttle valve 60 and the fuel injection amount are increased with an increase in the motor torque $T_M$, for preventing stalling of the engine 12 due to a drop of the engine speed $N_E$ due to an increase in the reaction force of the motor/generator 14.

In the operation mode 7 selected in step S10, the first clutch CE1 is engaged (turned ON) and the second clutch CE2 is released (turned OFF), and the engine 12 is operated while the motor/generator 14 is placed in the NON-LOAD state so that the hybrid drive system 10 is placed in an electrically neutral state, as indicated in the table of FIG. 7. In this operation mode 7, the output of the carrier 16c is zeroed with the rotor shaft 14r of the motor/generator 14 rotating freely in the reverse direction. When this operation mode 7 is established during running of the vehicle with the engine 12 operated as the drive power source as in the operation mode 3, the stopping of the vehicle does not require the engine 12 to be turned OFF, and the vehicle can be started by the engine 10 as in the operation mode 5.

If a negative decision (NO) is obtained in step S7, that is, if the starting of the vehicle by the engine 12 is not required, the control flow goes to step S11 to determine whether a currently required output Pd of the hybrid drive system 10 is equal to or smaller than a predetermined first threshold value P1. The currently required output Pd is an output of the hybrid drive system 210 required to drive the vehicle against a running resistance. This currently required output Pd is calculated according to a predetermined data map or equation, on the basis of the operation amount $\theta_{AC}$ of the accelerator pedal, a rate of change of this value $\theta_{AC}$, running speed of the vehicle (speed $N_O$ of the output shaft 19), or the currently established operating position of the automatic transmission 18.

The predetermined first threshold value P1 is a boundary value of the output above which the vehicle is driven with only the engine 12 used as the drive power source and below which the vehicle is driven with only the motor/generator 14 as the drive power source. In other words, the vehicle is considered to be in a medium-load or high-load running state if the currently required output Pd is larger than the first threshold value P1, and in a low-load running state if the currently required output Pd is equal to or smaller than the first threshold value P1. For example, the first threshold value P1 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is equal to or smaller than the first threshold value P1, the control flow goes to step S12 to determine whether the stored electric energy amount SOC is equal to or larger than a predetermined lower limit A. If an affirmative decision (YES) is obtained in step S12, the control flow goes to step S13 to select an operation mode 1. If a negative decision (NO) is obtained in step S12, the control flow goes to step S14 to select an operation mode 3. The lower limit A is a lower limit of the stored electric energy amount SOC above which the electric energy stored in the storage device 58 can be used to operate the motor/generator 14 as the drive power source. The lower limit A is determined depending upon the charging and discharging efficiencies of the storage device 58. For instance, the lower limit A is about 30% of the full capacity of the storage device 58.

In the operation mode 1 selected in step S13, the first clutch CE1 is released (turned OFF) and the second clutch CE2 is engaged (turned ON), and the engine 12 is turned OFF, while the motor/generator 14 is operated so as to provide the currently required output Pd, as indicated in the table of FIG. 7, so that the vehicle is driven with only the motor/generator 14 used as the drive power source.

In this operation mode 1, too, the engine 12 is disconnected from the planetary gear device 16, so that the energy loss due to the drag resistance of the engine 12 is prevented as in the operation mode 6, and the motor can be suitably operated with high efficiency with the automatic transmission 18 being suitably shifted.

It is also noted that the operation mode 1 is selected, that is, the motor/generator 14 is used as the drive power source, when the currently required output Pd is equal to or smaller than the first threshold value P1 while the electric energy amount SOC stored in the storage device 58 is equal to or larger than the lower limit A. In this condition, the energy efficiency is higher and the fuel consumption and the amount of exhaust emissions can be made smaller when the vehicle is driven by the motor/generator 14 (in the operation mode 1) than when the vehicle is driven by the engine 12 (in the operation mode 2). Further, the electric energy storage device 58 is protected from excessive energy consumption with the stored electric energy amount SOC falling below the lower limit A, which would result in deterioration of the charging and discharging efficiencies of the storage device 58.

In the operation mode 3 selected in step S14, the first and second clutches CE1, CE2 are both engaged (turned ON), and the engine 12 is turned ON, while the motor/generator 14 is placed in the CHARGING state to charge the electric energy storage device 58 with regenerative braking, as indicated in the table of FIG. 7, whereby the vehicle is driven by the output of the engine 12 while the electric energy storage device 58 is charged with the electric energy generated by the motor/generator 14. In this operation mode 3, the engine 12 is operated so as to provide an output larger than the currently required output Pd, and the electric current of the motor/generator 14 is controlled so that a surplus output of the engine 12 is consumed by the motor/generator 14 to charge the storage device 258.

If a negative decision (NO) is obtained in step S11, that is, if the currently required output Pd is larger than the first threshold value P1, the control flow goes to step S15 to determine whether the currently required output Pd is smaller than a predetermined second threshold P2 which is larger than the first threshold P1, that is, whether the currently required output Pd is larger than the first threshold P1 and smaller than the second threshold P2, namely, within a predetermined range between P1 and P2.

This second threshold value P2 is a boundary value of the output below which the vehicle is driven with only the engine 12 used as the drive power source and above which the vehicle is driven with both the engine 12 and the motor/generator 14 as the drive power sources. In other words, the vehicle is considered to be in the medium-load running state if the currently required output Pd is smaller than the second threshold value P2, and in the high-load running state if the currently required output Pd is equal to or larger than the second threshold value P2. For example, the second threshold value P2 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is larger than the first threshold P1 and smaller than the second threshold P2, that is, if an affirmative decision (YES) is obtained in step S15, the control flow goes to step S16 to determine whether the storage electric energy amount SOC is equal to or larger than the above-indicated predetermined lower limit A. If an affirmative decision (YES) is obtained in step S16, the control flow goes to step S17 to select an operation mode 2. If a negative decision (NO) is obtained in step S16, the control flow goes to step S14 to select the operation mode 3 discussed above.

If the currently required output Pd is equal to or larger than the second threshold P2, that is, if a negative decision (NO) is obtained in step S15, the control flow goes to step S18 to determine whether the stored electric energy amount SOC is equal to or larger than the lower limit A. If an affirmative decision (YES) is obtained in step S18, the control flow goes to step S19 to select an operation mode 4. If a negative decision (NO) is obtained in step S18, the control flow goes to step S17 to select the operation mode 2.

In the operation mode 2 selected in step S17, the first and second clutches CE1, CE2 are both engaged (turned ON), and the engine 12 is operated so as to produce the currently required output Pd, while the motor/generator 14 is placed in the NON-LOAD state, as indicated in FIG. 7, whereby the vehicle is driven with only the engine 12 used as the drive power source.

In the operation mode 4 selected in step S19, the first and second clutches CE1, CE2 are both engaged (turned ON), and the engine 12 and the motor/generator 14 are both operated, as indicated in the table of FIG. 7, whereby the vehicle is driven with both the engine 12 and the motor/generator 14 used as the drive power sources.

In the operation mode 4 selected when the currently required output Pd is equal to the second threshold P2 or larger, the engine 12 and the motor/generator 14 are both operated as the drive power sources to drive the vehicle, so that the energy efficiency is less likely to be lowered than in the operation mode 1 or 2 in which either the engine 12 or the motor/generator 14 is used as the drive power source. In this respect, the fuel consumption and the exhaust gas emissions can be made smaller in this operation mode 4 than in the operation mode 1 or 2 when the currently required output Pd is equal to the second threshold P2 or larger. Further, since the operation mode 4 is selected only when the stored electric energy amount SOC is equal to or larger than the lower limit A, the electric energy storage device 58 is protected from excessive energy consumption with the stored energy amount SOC falling below the lower limit A, which would result in deterioration of the charging and discharging efficiencies of the storage device 58.

As described above, the operation modes 1–4 are selected in the following running states of the vehicle. When the electric energy amount SOC stored in the electric energy storage device 58 is not smaller than the lower limit A, the operation mode 1 is selected in step S13 to drive the vehicle with only the motor/generator 14 as the drive power source if the vehicle is in the low-load running state with the currently required output Pd being equal to or smaller than the first threshold P1. Further, the operation mode 2 is selected in step S17 to drive the vehicle with only the engine 12 as the drive power source if the vehicle is in the medium-load running state with the currently required output Pd being larger than the first threshold P1 and smaller than the second threshold P2, and the operation mode 4 is selected in step S19 to drive the vehicle with both of the engine 12 and the motor/generator 14 as the drive power sources if the vehicle is in the high-load running state with the currently required output Pd being equal to or larger than the second threshold P2.

When the stored electric energy amount SOC is smaller than the lower limit A, the operation mode 3 is selected in step S14 to drive the vehicle with only the engine 12 as the drive power source while at the same time charging the electric energy storage device 58 if the vehicle is in the medium-load running state with the currently required output Pd being smaller than the second threshold P2, and the operation mode 2 is selected in step S17 to drive the vehicle with only the engine 12 without charging the storage device 58 if the vehicle is in the high-load running state with the currently required output Pd being equal to or larger than the second threshold P2.

The operation mode 2 is selected in step S17 in the following two cases: 1) when the vehicle is in the medium-load running state wherein the currently required output Pd is larger than the first threshold P1 and smaller than the second threshold P2, while the stored electric energy amount SOC is not smaller than the lower limit A; and 2) when the vehicle is in the high-load running state wherein the currently required output Pd is equal to or larger than the second threshold P2, while the stored electric energy amount SOC is smaller than the lower limit A. In the medium-load running state of the vehicle, the energy efficiency is generally higher when the vehicle is driven by the engine 12 than when the vehicle is driven by the motor/generator 14. Accordingly, the fuel consumption and exhaust gas emission can be made smaller in the operation mode 2 than in the operation mode 1.

In the high-load running state, it is generally desirable to select the operation mode 4 in which the vehicle is driven by both of the engine 12 and the motor/generator 14. When the electric energy amount soc stored in the electric energy storage device 58 is smaller than the lower limit A, however, it is desirable to select the operation mode 2, that is, to drive the vehicle with only the engine 12 used as the drive power source, in order to prevent deterioration of the charging and discharging efficiencies of the storage device 58 due to reduction of the stored electric energy amount SOC below the lower limit A.

To prevent a decrease of the storage capacity of the electric energy storage device 58 before expiration of its nominal service life, the hybrid drive controller 50 is adapted to execute a control routine illustrated in the flow chart of FIG. 9, wherein the first and second storage portions 64, 66 are completely or fully discharged under predetermined conditions, as described below in detail. It will be understood that a portion of the hybrid drive controller 50 assigned to implement steps SA6–SA8 and SA11–SA13 provides fully discharging means, and steps SA3 and SA5 correspond to a predetermined condition that should be satisfied for operation of the fully discharging means, while a portion of the hybrid drive controller 50 assigned to implement step SA1 provides full discharge restricting means for restricting the operation of the fully discharging means when the predetermined condition is not satisfied.

Figure 9:
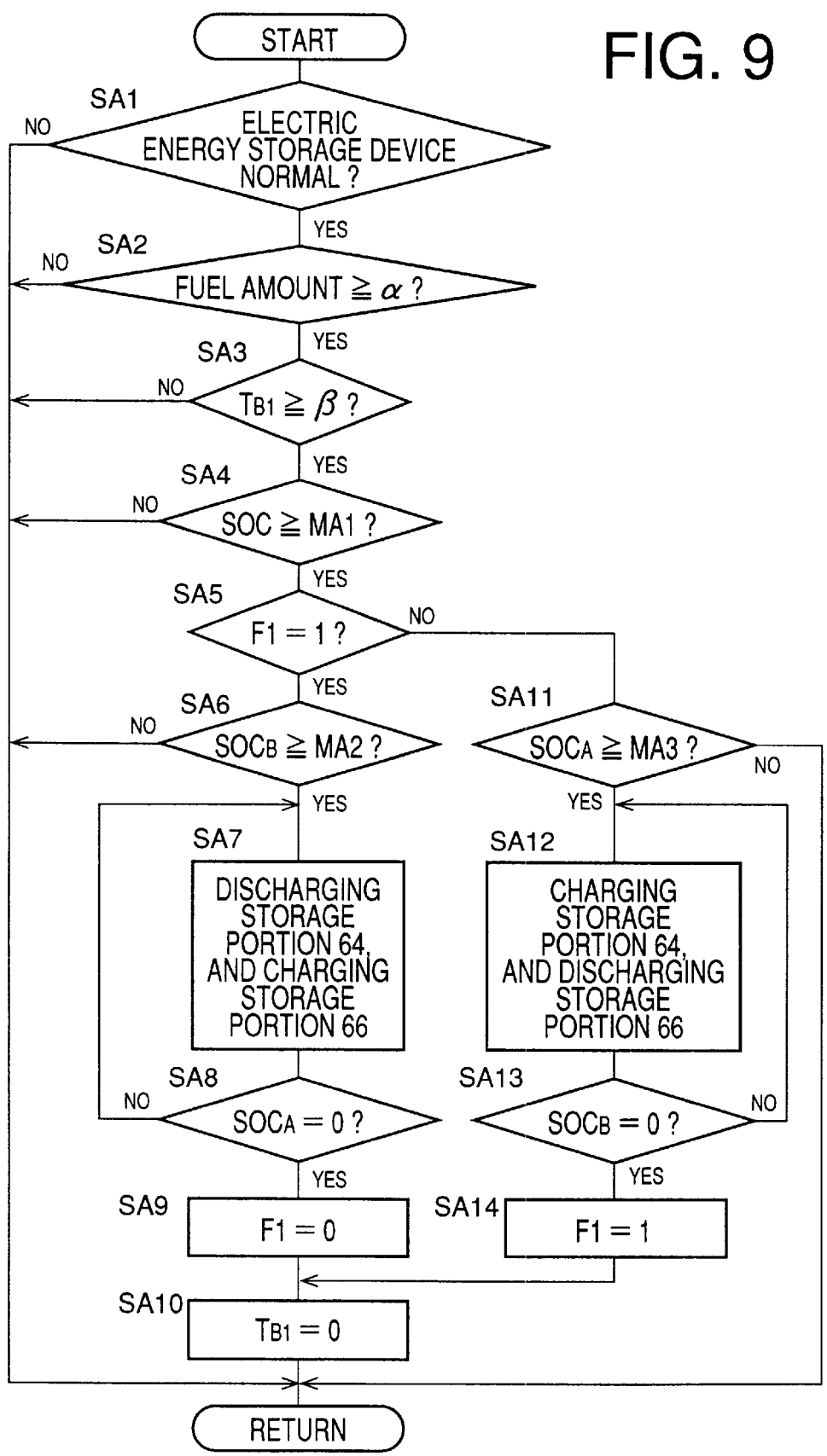
FIG. 9 is a flow chart illustrating a control routine executed by the hybrid drive controller of FIG. 5.

The control routine of FIG. 9 is initiated with step SA1 to determine whether both of the first and second storage portions 64, 66 of the electric energy storage device 58 are normally functioning. For instance, this determination is effected based on the charging and discharging efficiency of the storage device 58. The amounts $SOC_A$, $SOC_B$ of the electric energy stored in each storage portion 64, 66 change during charging and discharging of the storage portion 64, 66. The actual values of increase and decrease of the energy amounts $SOC_A$, $SOC_B$ differ from the theoretical values. The charging and discharging efficiency is represented by ratios or percent values of the actual values of increase and decrease of the energy amounts $SOC_A$, $SOC_B$ to the theoretical values. These ratios or percent values may be calculated during normal operation of the storage device 58. In this case, the calculated ratios or percent values are stored in the RAM of the hybrid drive controller 50, as the charging and discharging efficiency. Alternatively, step SA1 is formulated to charge and discharge the two storage portions 64, 66 for thereby transferring the electric energy between the two storage portions 64, 66, and calculate the charging and discharging efficiency, so that the determination as to whether the storage device 58 is normal or not is effected in step SA1 based on the calculated efficiency. If the calculated efficiency is lower than a predetermined threshold, it means that the storage device 58 (at least one of the first and second storage portions 64, 66) is not normally functioning. Alternatively, the voltage values of the storage portions 66, 64 rather than their charging and discharging efficiencies may be used to effect the determination in step SA1. In this case, abnormal functioning of the storage device 58 is detected if the voltage value of at least one of the two storage portions 64, 66 is lower than a redetermined threshold, for example, 7V. The charging and discharging efficiency of the storage device 58 is lowered with the temperature of the storage device 58. Therefore, when the temperature is lower than a given level, a negative decision (NO) is obtained in step SA1 even while the storage device 58 is normal. In this case, one cycle of execution of the routine of FIG. 9 is terminated. If an affirmative decision (YES) is obtained in step SA1, the control flow goes to step SA2 to determine whether the amount of fuel for the engine 12 is equal to or larger than a predetermined limit α. This limit α is the smallest amount of fuel required to permit the operation of the engine 12 to drive the motor/generator 14 to generate an electric energy. The limit a is obtained by an experiment.

If an affirmative decision (YES) is obtained in step SA2, the control flow goes to step SA3 to determine whether a time $T_{B1}$ which has passed after the last fully discharging operation of one of the two storage portions 64, 66 of the storage device 58 is equal to or longer than a predetermined threshold β. This threshold β is a half of a predetermined fully discharging interval of each storage portion 64, 66. That is, the fully discharging interval is equal to 2β. This interval is determined by an experiment, so as to effect the full or complete discharging of each storage portion 64, 66 at a frequency suitable for avoiding considerable decrease of the storage capacity of the storage device 58, which would occur due to repeated charging of the storage portion 64, 66 in the absence of the full discharging according to the routine of FIG. 9. In the present embodiment wherein the two storage portions 64, 66 have the same storage capacity, the same threshold β is used for both of the two storage portions 64, 66. However, different threshold values may be used for the time TB1 for the two storage portions 64, 66, where these storage portions 64, 66 have different storage capacity values. Further, the time $T_{B1}$ may be replaced by a running distance of the vehicle after the last full discharging of the storage portions 64, 66.

If an affirmative decision (YES) is obtained in step SA3, the control flow goes to step SA4 to determine whether the total energy amount SOC stored in the storage device 58 is equal to or larger than a predetermined lower limit MA1. This lower limit MA1 is larger than the lower limit A described above with respect to steps S12, S16 and S18, and is selected to be about 60% of the full or nominal capacity of the storage device 58. If an affirmative decision (YES) is obtained in step SA4, the control flow goes to step SA5 to determine whether a flag F1 is set at "1". This flag F1 is reset to "0" in step SA9 when the first storage portion 64 has been fully discharged, and set to "1" in step SA14 when the second storage portion 6 has been fully discharged. With the flag F1 thus set and reset alternately, an operation for fully discharging the first storage portion 64 in steps SA7 and SA8 and an operation for fully discharging the second storage portion 66 in steps SA12 and SA13 are alternately performed each time the time $T_{B1}$ has reached the predetermined threshold β, that is, each time the time β has passed.

If an affirmative decision (YES) is obtained in step SA5, the control flow goes to step SA6 to determine whether the energy amount $SOC_B$ stored in the second storage portion 66 is equal to or larger than a predetermined threshold MA2. This threshold MA2 is the smallest energy amount $SOC_B$ required to permit the operation of the motor/generator 14 for running the vehicle, even when the energy amount $SOC_A$ stored in the first storage portion 64 is substantially zeroed by the full discharging of this storage portion 64 in step SA7. For instance, the threshold MA2 is selected to be about 70% of the full or nominal storage capacity of the second storage portion 66. If an affirmative decision (YES) is obtained in step SA6, the control flow goes to step SA7 in which the charging/discharging control portion 62 is controlled such that the first storage portion 64 is discharged when any operation mode that causes the storage device 58 to be discharged is selected according to the operation mode selecting sub-routine of FIG. 6, and such that the second storage portion 66 is charged when any operation mode that causes the storage device 58 to be charged is selected according to the operation mode selecting sub-routine. Normally, the permissible maximum amount of energy stored in the storage device 58 is about 80% of the full or nominal storage capacity. However, step SA7 is preferably formulated to permit the second storage portion 66 to be charged beyond the normally permissible maximum amount of about 80%.

Step SA7 is followed by step SA8 to determine whether the energy amount $SOC_A$ stored in the first storage portion 64 is substantially zeroed, that is, whether the first storage portion 64 has been substantially fully discharged. If a negative decision (NO) is obtained in step SA8, the control flow goes back to step SA7 in which the first and second storage portions 64, 66 are discharged and charged, respectively, when the appropriate operation modes are selected according to the sub-routine of FIG. 6. Steps SA7 and SA8 are repeatedly implemented until an affirmative decision (YES) is obtained in step SA8. When the affirmative decision is obtained in step SA8, the control flow goes to step SA9 to reset the flag F1 to "0", and to step SA10 to reset the time counter for measuring the time $T_{B1}$, to zero.

If a negative decision (NO) is obtained in step SA5, the control flow goes to step SA11 to determine whether the energy amount $SOC_A$ stored in the first storage portion 64 is equal to or larger than a predetermined threshold MA3. Like the threshold MA2, this threshold MA3 is selected to be about 70% of the full or nominal storage capacity of the first storage portion 64. If an affirmative decision (YES) is obtained in step SA11, the control flow goes to step SA12 in which the charging/discharging control portion 62 is controlled such that the second storage portion 66 is discharged when any operation mode that causes the storage device 58 to be discharged is selected according to the operation mode selecting sub-routine of FIG. 6, and such that the first storage portion 64 is charged when any operation mode that causes the storage device 58 to be charged is selected according to the operation mode selecting sub-routine. Step SA12 is preferably formulated to permit the first storage portion 64 to be charged beyond the normally permissible maximum amount of about 80%.

Step SA12 is followed by step SA13 to determine whether the energy amount $SOC_B$ stored in the second storage portion 66 is substantially zeroed, that is, whether the second storage portion 66 has been substantially fully discharged. If a negative decision (NO) is obtained in step SA13, the control flow goes back to step SA12 in which the second and first storage portions 66, 64 are discharged and charged, respectively, when the appropriate operation modes are selected. Steps SA12 and SA13 are repeatedly implemented until an affirmative decision (YES) is obtained in step SA13. When the affirmative decision is obtained in step SA13, the control flow goes to step SA14 to set the flag F1 to "1", and to step SA10 to reset the time counter for measuring the time $T_{B1}$.

It will be understood that the control routine of FIG. 9 is arranged to fully discharge one of the plurality of storage portions 66, 64 of the storage device 58 when the energy amount $SOC_A$, $SOC_B$ stored in the other of the storage portions is larger than a predetermined threshold MA2, MA3.

If a negative decision (NO) is obtained in any one of the steps SA2–SA4, SA6 and SA11, the first or second storage portion 64, 66 is not fully discharged in steps SA7–SA10 or steps SA12–SA14 and SA10. In this case, the charging and discharging of the two storage portions 64, 66 are normally controlled for uniformly charging and discharging the two storage portion s64, 66, or for holding the energy amounts $SOC_A$, $SOC_B$ within the range of 30–80% of the nominal storage capacity in which the charging and discharging efficiency is sufficiently high. It will be understood that a portion of the sub-routine of FIG. 6 which is assigned to charge and discharge the storage device 58 functions as means for uniformly charging and discharging the two storage portions 64. 66.

Figure 10:
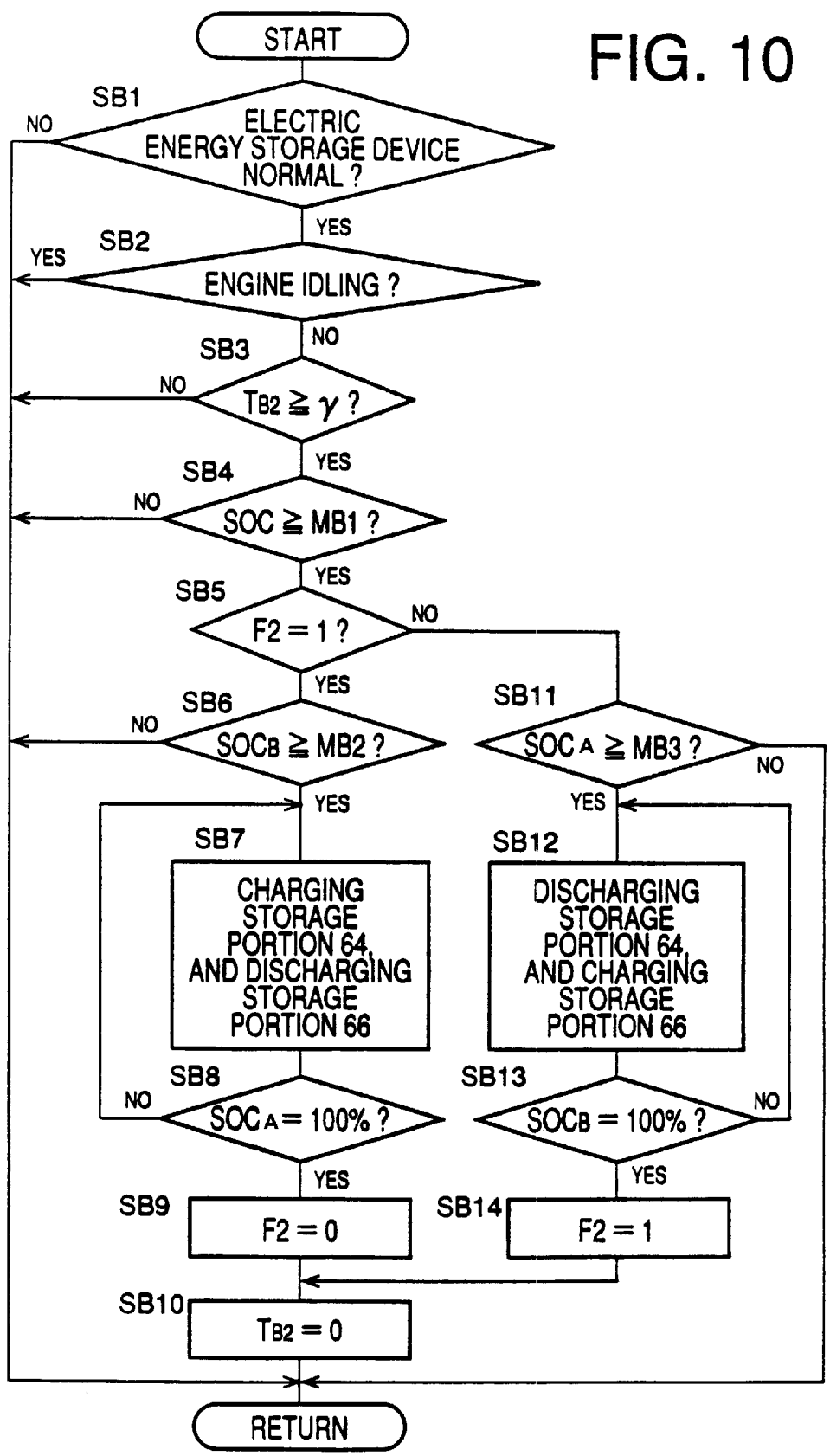
FIG. 10 is a flow chart illustrating a control routine executed in addition to the routine of FIG. 9.

The hybrid drive controller 50 is adapted to execute a control routine illustrated in the flow chart of FIG. 10, as well as the routine of FIG. 9. In this routine, the first and second storage portions 64, 66 are completely or fully charged under predetermined conditions, as described below in detail. The control routine of FIG. 10 is initiated with step SB1 identical with step SA1 of FIG. 9. Then, step SB2 is implemented to determine whether the engine 12 is idling with the vehicle being stopped with the accelerator pedal being placed in its non-operated position. This determination may be effected based on the engine speed $N_E$, vehicle speed V and operating amount $\theta_{AC}$ of the accelerator pedal, for example.

If an affirmative decision (YES) is obtained in step SB2, one cycle of execution of the routine of FIG. 10 is terminated, since charging the storage device 58 during idling of the engine 10 will cause a sudden rise in the engine speed $N_E$, which is unexpected to the vehicle operator. If a negative decision (NO) is obtained in step SB2, the control flow goes to step SB3 to determine whether a time $T_{B2}$ which has passed after the last fully charging operation of one of the two storage portions 64, 66 of the storage device 58 is equal to or longer than a predetermined threshold γ. This threshold γ is a half of a predetermined fully charging interval of each storage portion 64, 66. That is, the fully charging interval is equal to 2γ. This interval is determined by an experiment. In the present embodiment wherein the two storage portions 64, 66 have the same storage capacity, the same threshold γ is used for both of the two storage portions 64, 66. However, different threshold values may be used for the time TB1 for the two storage portions 64, 66, where these storage portions 64, 66 have different storage capacity values. Further, the time $T_{B2}$ may be replaced by a running distance of the vehicle after the last full charging of the storage portions 64, 66.

If an affirmative decision (YES) is obtained in step SB3, the control flow goes to step SB4 to determine whether the total energy amount SOC stored in the storage device 58 is equal to or smaller than a predetermined upper limit MB1. This limit MB1 is smaller than the upper limit B described above with respect to step S4 of FIG. 6, and is selected to be about 70% of the full or nominal capacity of the storage device 58. If an affirmative decision (YES) is obtained in step SB4, the control flow goes to step SB5 to determine whether a flag F2 is set at "1". This flag F2 is reset to "0" in step SB9 when the first storage portion 64 has been completely or fully charged, and set to "1" in step SB14 when the second storage portion 6 has been fully charged. With the flag F2 thus set and reset alternately, an operation for fully charging the first storage portion 64 in steps SB7 and SB8 and an operation for fully charging the second storage portion 66 in steps SB12 and SB13 are alternately performed each time the time $T_{B2}$ has reached the predetermined threshold γ, that is, each time the time γ has passed.

If an affirmative decision (YES) is obtained in step SB5, the control flow goes to step SB6 to determine whether the energy amount $SOC_B$ stored in the second storage portion 66 is equal to or smaller than a predetermined threshold MB2. This threshold MB2 is selected to be about 75% of the full or nominal storage capacity of the second storage portion 66, so that the second storage portion 66 can store an electric energy generated by the motor/generator 14 in the regenerative braking mode, i.e., operation mode 6, even when the energy amount $SOC_A$ stored in the first storage portion 64 is substantially 100% of the full capacity, as a result of fully charging operation of this storage portion 64 in step SB7. If an affirmative decision (YES) is obtained in step SB6, the control flow goes to step SB7 in which the charging/discharging control portion 62 is controlled such that the electric energy generated by the motor/generator 14 is all stored in the the first storage portion 64, and such that the motor/generator 14 is operated as the electric motor by the electric energy stored in the second storage portion 66. Thus, the first storage portion 64 is charged while the second storage portion 64 is discharged. This step SB7 is preferably arranged to select the operation modes 3, 5 and 6, irrespective of the selection of the operation mode according to the operation mode selecting sub-routine of FIG. 6. Further, the step SB7 is preferably arranged so as to permit the discharging of the second storage portion 66 even after the energy amount $SOC_B$ falls below the normally used lower limit of 30%.

Step SB7 is followed by step SB8 to determine whether the first storage portion 64 has been substantially fully charged, that is, whether the energy amount $SOC_A$ stored in the first storage portion 64 is substantially 100% of its full storage capacity. If a negative decision (NO) is obtained in step SB8, the control flow goes back to step SB7 in which the first and second storage portions 64, 66 are charged and discharged, respectively, when appropriate. Steps SB7 and SB8 are repeatedly implemented until an affirmative decision (YES) is obtained in step SB8. When the affirmative decision is obtained in step SB8, the control flow goes to step SB9 to reset the flag F2 to "0", and to step SB10 to reset the time counter for measuring the time $T_{B2}$, to zero.

If a negative decision (NO) is obtained in step SB5, the control flow goes to step SB11 to determine whether the energy amount $SOC_A$ stored in the first storage portion 64 is equal to or smaller than a predetermined threshold MB3. Like the threshold MB2, this threshold MB3 is selected to be about 75% of the full or nominal storage capacity of the first storage portion 64. If an affirmative decision (YES) is obtained in step SB11, the control flow goes to step SB12 in which the charging/discharging control portion 62 is controlled such that the electric energy generated by the motor/generator 14 is stored into the the second storage portion 66, and such that the motor/generator 14 is operated as the electric motor by the electric energy stored in the first storage portion 64. Thus, the first storage portion 64 is discharged while the second storage portion 64 is charged. This step SB12 is preferably arranged to select the operation modes 3, 5 and 6, irrespective of the selection of the operation mode according to the operation mode selecting sub-routine of FIG. 6. Further, the step SB11 is preferably arranged so as to permit the discharging of the first storage portion 64 even after the energy amount $SOC_A$ falls below the normally used lower limit of 30%.

Step SB12 is followed by step SB13 to determine whether the second storage portion 66 has been fully charged, that is, whether the energy amount $SOC_B$ stored in the second storage portion 66 is substantially 100% of its full storage capacity. If a negative decision (NO) is obtained in step SB13, the control flow goes back to step SB12 in which the first and second storage portions 64, 66 are discharged and charged, respectively, when appropriate. Steps SB12 and SB13 are repeatedly implemented until an affirmative decision (YES) is obtained in step SB13. When the affirmative decision is obtained in step SB13, the control flow goes to step SB14 to set the flag F2 to "1", and to step SB10 to reset the time counter for measuring the time $T_{B2}$.

In the present embodiment, the pair of storage portions 64, 66 of the electric energy storage device 58 are alternately fully or completely discharged at the predetermined time interval β while the predetermined conditions are satisfied. This arrangement is effective to prevent a decrease in the storage capacity of the storage device 58 due to repeated charging of the storage device 58. While the predetermined conditions are not satisfied, the energy amount $SOC_A$, $SOC_B$ stored in each storage portion 64, 66 is held within the range of 30–80% of its full capacity in which the charging and discharging efficiency is sufficiently high. The predetermined conditions for fully discharging the first storage portion 64 include a condition that the energy amount $SOC_B$ stored in the second storage portion 66 is equal to or larger than the predetermined lower limit MA2, while the predetermined conditions for fully discharging the second storage portion 66 include a condition that the energy amount $SOC_A$ stored in the first storage portion 64 is equal to or larger than the predetermined lower limit MA3. This arrangement avoids insufficiency of the electric energy stored in the storage device 58, which would occur due to the full discharging of the first or second storage portion 64, 66 and which would cause a failure of the vehicle to run with the electric motor 14.

It is also noted that the decrease in the storage capacity of the storage device 58 due to repeated charging is prevented without its deterioration due to unnecessarily frequent full discharging and charging thereof, since the two storage portions 64, 66 are fully discharged alternately at the predetermined time interval. Further, the full discharging of the storage portions 64, 66 is not effected even when the predetermined time β has passed, if the storage device 58 is found abnormal or defective. This arrangement is also effective to prevent deterioration of the storage device 58 due to the full discharging.

In the present embodiment wherein the energy amounts $SOC_A$, $SOC_B$ are normally held within the range of 30–80% of the full storage capacity of the storage portions 64, 66, the lower limit MA1 is selected to be about 60% of the full storage capacity of the storage device 58, and the lower limits MA2, MA3 are selected to be about 70% of the full storage capacity of the storage portions 64, 66. Where the normal range of the energy amounts $SOC_A$, $SOC_B$ is not provided, the lower limits MA1, MA2, MA3 are suitably determined so as to prevent zeroing of the total energy amount SOC of the storage device 58 due to the alternate full discharging of the storage portions 64, 66. Similarly, the upper limits MB1, MB2, MB3 used in the routine of FIG. 10 are suitably determined so as to prevent the full 100% charging of the storage device 58 due to the alternate full charging of the storage portions 64, 66.

Figure 11:
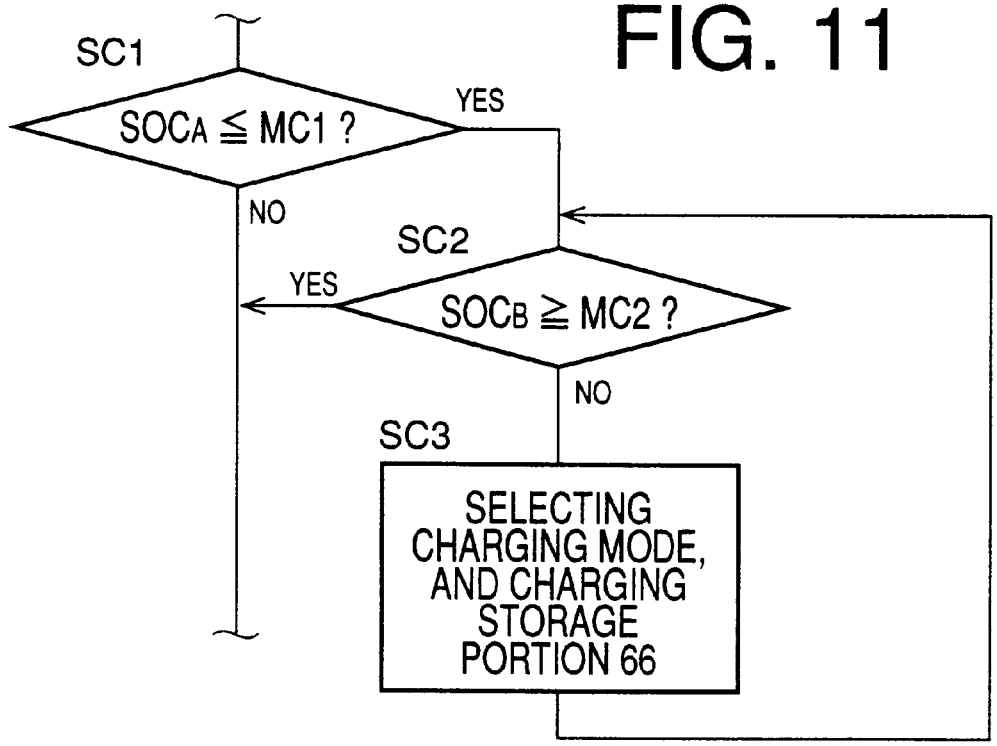
FIG. 11 is a flow chart illustrating steps SC1–SC3 implemented between steps SA7 and SA8 of the routine of FIG. 9, according to another embodiment of this invention.

Referring to the flow charts of FIGS. 11 and 12, a second embodiment of this invention will be described. Steps SC1–SC3 of FIG. 11 are implemented between steps SA7 and SA8 of the routine of FIG. 9, while steps SD1–SD3 are implemented between steps SA12 and SA13 of the routine of FIG. 9. It will be understood that a portion of the hybrid drive controller 50 assigned to implement steps SC1, SC3, SD1 and SD3 provides charging control means for charging the second storage portion 66 when the energy amount $SOC_A$ of the first storage portion 64 has decreased to a predetermined threshold due to the discharging of the first storage portion 64.

Figure 12:
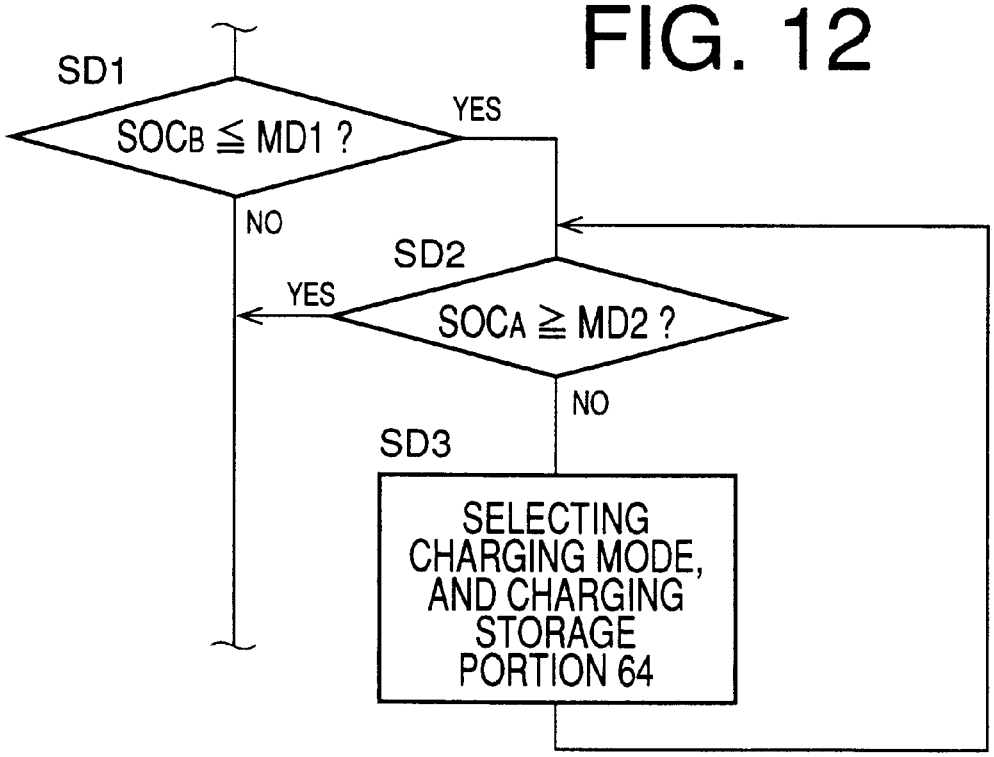
FIG. 12 is a flow chart illustrating steps SD1–SD3 implemented between steps SA12 and SA13 of the routine of FIG. 9, according to the embodiment of FIG. 11.

In the routine of FIGS. 11 and 12, step SC1 is implemented following step SA7 of FIG. 9, to determine whether the energy amount $SOC_A$ stored in the first storage portion 64 is equal to or smaller than a predetermined threshold MC1. This threshold MC1 is selected to be about 10% of the full storage capacity of the storage device 64. If a negative decision (NO) is obtained in step SC1, the control flow goes to step SA8 of FIG. 9. If an affirmative decision (YES) is obtained in step SC1, the control flow goes to step SC2 to determine whether the energy amount $SOC_B$ stored in the second storage portion 66 is equal to or larger than a predetermined threshold MC2. This threshold MC2 is selected to be about 80% of the full storage capacity of the storage portion 66, to permit operation of the motor/generator 14 as the electric motor to run the vehicle even after the first storage portion 64 has been fully discharged. If an affirmative decision (YES) is obtained in step SC2, the control flow goes to step SA8 of FIG. 9.

If a negative decision (NO) is obtained in step SC2, the control flow goes to step SC3 to select the charging mode (operation mode 3 or operation mode 6) to charge the second storage portion 66, irrespective of the operation mode selected according to the operation mode selecting subroutine of FIG. 6. Namely, step S4 is followed by step S6, or steps S12 and S16 are followed by step S14, irrespective of the total energy amount SOC as compared with the thresholds A, B. Consequently, the second storage portion 66 is charged by the motor/generator 14 operated as the electric generator 14. Step SC3 is repeatedly implemented until the affirmative decision (YES) is obtained in step SC2. While step SC3 is repeatedly implemented to charge the second storage portion 66, the discharging of the first storage portion 64 is interrupted since the motor/generator 14 is not operated as the electric motor to run the vehicle.

Steps SD1, SD2 and SD3 of FIG. 12, which are similar to steps SC1, SC2 and SC3 of FIG. 11, respectively, are implemented to charge the first storage portion 64 if the energy amount $SOC_A$ stored in the first storage portion 64 is smaller than a predetermined threshold MD2 after the energy amount $SOC_B$ stored in the second storage portion 66 has decreased to a predetermined threshold MD1.

In the second embodiment of FIGS. 11 and 12, the discharging of the first storage portion 64 is continued even after its energy amount $SOC_A$ has decreased to the predetermined threshold MC1, if the energy amount $SOC_B$ of the second storage portion 66 is not smaller than the threshold MC2. If the energy amount $SOC_B$ is smaller than the threshold MC2 after the energy amount $SOC_A$ has decreased to the threshold MC1, the second storage portion 66 is charged so that the first storage portion 64 is discharged only while the energy amount $SOC_B$ is held equal to or larger than the threshold MC2. Similarly, the discharging of the second storage portion 66 is continued even after its energy amount $SOC_B$ has decreased to the threshold MD1, if the energy amount $SOC_A$ of the first storage portion 64 is not smaller than the threshold MD2. If the energy amount $SOC_A$ is smaller than the threshold MD2 after the energy amount $SOC_B$ has decreased to the threshold MD1, the first storage portion 64 is charged so that the second storage portion 66 is discharged only while the energy amount $SOC_A$ is held equal to or larger than the threshold MD2. This arrangement prevents full discharging of the storage device 58, which would cause the vehicle to fail to run with the motor/generator 14 as the drive power source.

Referring to the flow chart of FIG. 13, there will be described a control routine executed in place of the routine of FIG. 9, by the hybrid drive controller 50 according to a third embodiment of this invention. It will be understood that a portion of the hybrid drive controller 50 assigned to implement step SE7 provides fully discharging means, while a portion of the controller 50 assigned to implement step SE6 provides charging control means. It will also be understood that step SE3 corresponds to a predetermined condition which should be satisfied for operation of the fully discharging means, while a portion of the controller 50 assigned to implement steps SE1 and SE2 provides full discharge restricting means for restricting an operation of the fully discharging means when the predetermined condition is not satisfied.

Figure 13:
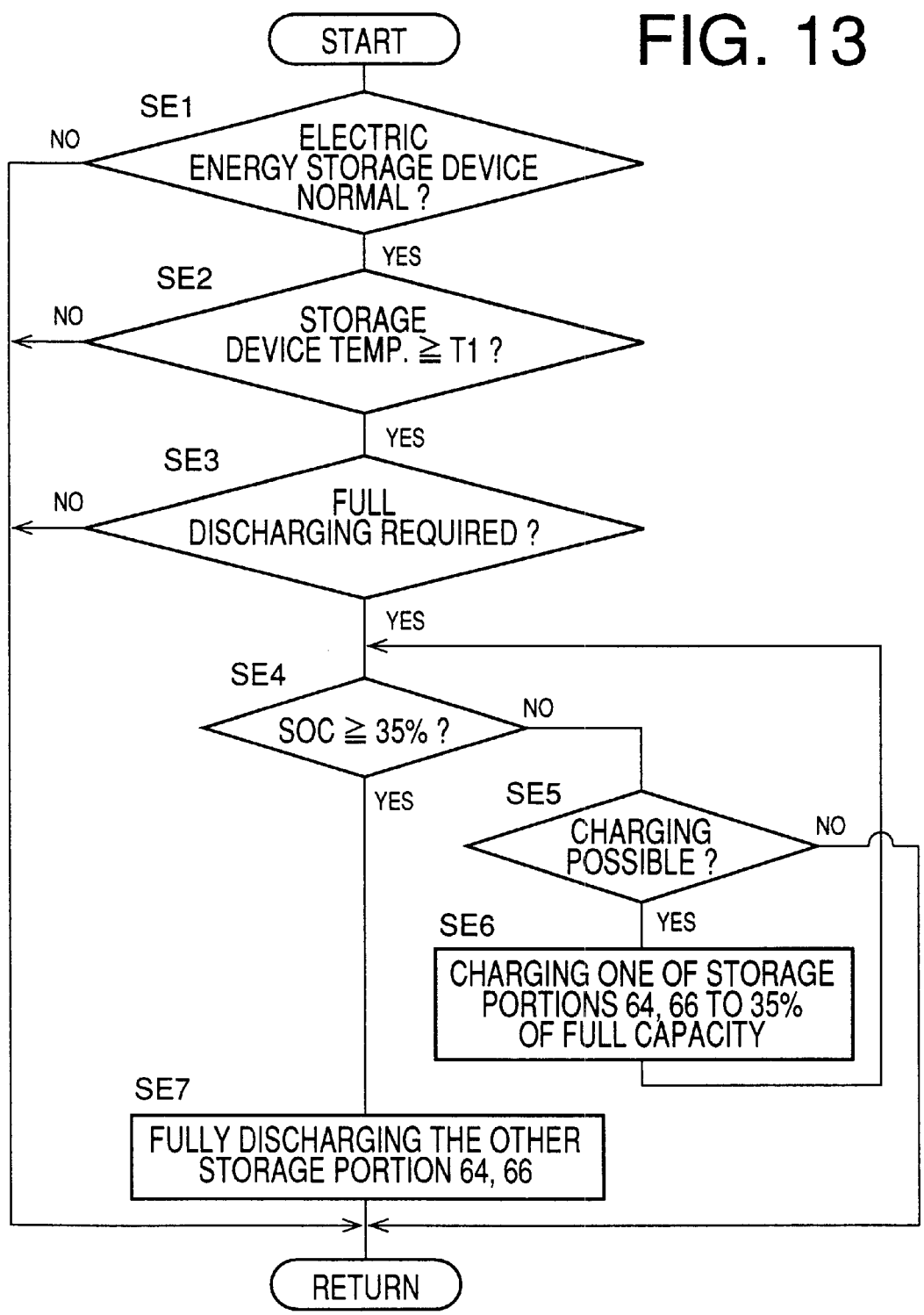
FIG. 13 is a flow chart illustrating a control routine executed according to a further embodiment of this invention.

The routine of FIG. 13 is initiated with step SE1 to determine whether both of the first and second storage portions 64, 66 of the electric energy storage device 58 are normally functioning. This step SE1 is identical with step SA1 of FIG. 9. If the storage device 58 consists of three or more storage portions, step SE1 may be formulated to determine whether at least two of the storage portions are normally functioning.

If an affirmative decision (YES) is obtained in step SE1, the control flow goes to step SE2 to determine whether a temperature of the storage device 58 is equal to or higher than a predetermined threshold T1. This determination is effected on the basis of the output signal of the BATTERY TEMP sensor 46. The threshold T1 is a lower limit of the temperature below which the charging and discharging performance of the storage device 58 is excessively low. If an affirmative decision (YES) is obtained in step SE2, the control flow goes to step SE3 to determine whether the full discharging of the storage device 58 is required, more specifically, whether the full discharging of a selected one of the storage portions 64, 66 is required. This determination is effected by determining whether a predetermined time of running of the vehicle has passed after the last full discharging of the storage device 58, whether the charging and discharging efficiency of the storage device 58 has been lowered below a predetermined threshold, or whether the storage device 58 has been used for more than a predetermined time. The threshold of the charging and discharging efficiency indicated above is higher than the lower limit below which the negative decision (NO) is obtained in step SE1.

If an affirmative decision (YES) is obtained in step SE3, the control flow goes to step SE4 to determine whether the total energy amount SOC of the storage device 58 is equal to or larger than 35% of the full storage capacity. If a negative decision (NO) is obtained in step SE4, the control flow goes to step SE5 to determine whether the charging of the storage device 58 is possible. This determination is effected by determining whether the currently selected operation mode of the hybrid drive controller 50 can be changed to the operation mode 3 or operation mode 6 for charging the storage device 58.

If a negative decision (NO) is obtained in step SE5, one cycle of execution of the routine of FIG. 13 is terminated. If an affirmative decision (YES) is obtained in step SE5, the control flow goes to step SE6 wherein the operation mode 3 is selected during running of the vehicle, or the operation mode 6 is selected during braking of the vehicle, so that one of the two storage portions 64, 66 for which the full discharging is not required is charged until the total energy amount of the storage device 58 is increased to 35% of its full storage capacity.

If an affirmative decision (YES) is obtained in step SE4, the control flow goes to step SE7 in which the other storage portion 64, 66 for which the full discharging is required is fully discharged. This full discharging is effected by transferring the electric energy from the storage portion 64, 66 for which the full discharging is required, to the storage portion 64, 66 for which the full discharging is not required. When the affirmative decision (YES) is again obtained in step SE3, the storage portion 64, 66 which has not been fully discharged is fully discharged. In this manner, the two storage portions 64, 66 are fully discharged alternately. Where the total energy amount SOC is 50% or more of the full storage capacity of the storage device 58, one of the storage portions 64, 66 cannot be fully discharged by transfer of the energy to the other storage portion 64, 66. In this case, the full discharging of the above-indicated on storage portion is effected by operating the motor/generator 14 as the electric motor for running the vehicle. If the charging and discharging efficiency of one of the two storage portions 64, 66 is excessively lowered, this storage portion may be fully discharged more frequently than the other storage portion whose charging and discharging efficiency is comparatively high.

In the present third embodiment, the electric energy is transferred from one of the two storage portions 64, 66 to the other, when the total energy amount SOC of the storage device 58 is larger than a predetermined value. This arrangement is effective to prevent a decrease in the storage capacity of the storage device 58 due to its repeated charging, while avoiding insufficiency of the electric energy for running the vehicle.

Since the total energy amount SOC of the storage device 58 is increased to the predetermined value of 35% of the full storage capacity by charging one of the two storage portions 64, 66 in step SE6 before the other storage portion 64, 66 is fully discharged in step SE7, the insufficiency of the electric energy for running the vehicle can be avoided.

Since the storage portion 64, 66 for which the full discharging is not required is charged in step SE6 until the total energy amount SOC of the storage device 58 is increased to 35% of the full storage capacity, the energy loss upon transfer of the energy from the above-indicated storage portion to the other storage portion is reduced.

Since the two storage portions 64, 66 are fully discharged alternately at the predetermined time interval, the decrease in the storage capacity of the storage device 58 due to repeated charging is prevented without its deterioration due to unnecessarily frequent full discharging and charging thereof. Further, the full discharging of the storage portions 64, 66 is not effected if the temperature of the storage device 58 is lower than the predetermined lower limit T1. This arrangement is also effective to prevent deterioration of the storage device 58 due to the full discharging when the temperature is excessively low.

Referring next to the flow chart of FIG. 14, there will be described a control routine executed in place of the routine of FIG. 9, by the hybrid drive controller 50 according to a fourth embodiment of this invention. It will be understood that a portion of the hybrid drive controller 50 assigned to implement step SF7 provides fully discharging means, while a portion of the controller 50 assigned to implement step SF6 provides charging control means. It will also be understood that step SF3 corresponds to a predetermined condition which should be satisfied for operation of the fully discharging means, while a portion of the controller 50 assigned to implement steps SF1 and SF2 provides full discharge restricting means for restricting an operation of the fully discharging means when the predetermined condition is not satisfied.

Figure 14:
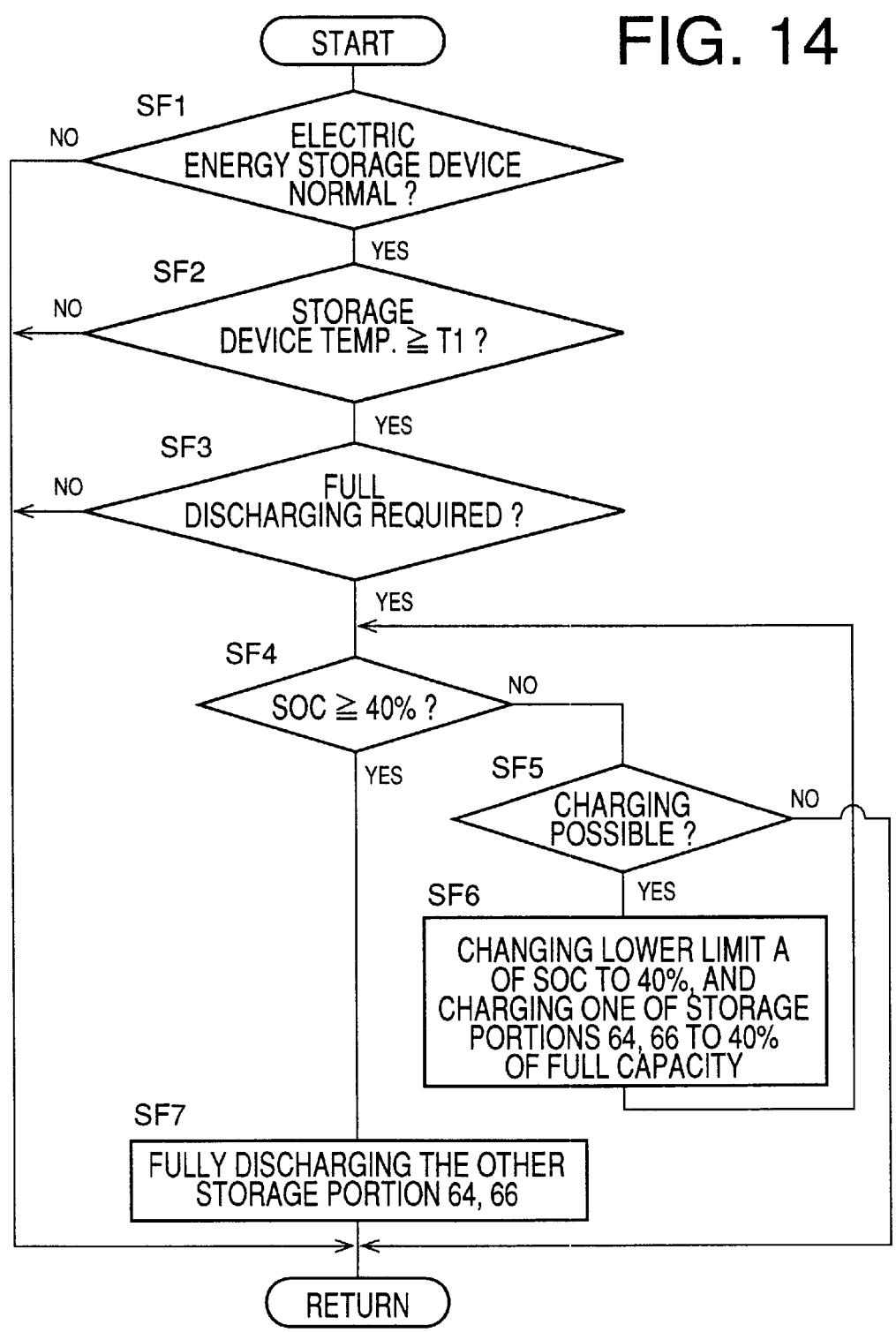
FIG. 14 is a flow chart illustrating a control routine executed according to a yet further embodiment of the invention.

In the routine of FIG. 14, steps SF1–SF3 are identical with steps SE1–SE3 of the routine of FIG. 13. If the affirmative decision (YES) is obtained in all of the steps SF1–SF3, the control flow goes to step SF4 to determine whether the total energy amount SOC of the storage device 58 is equal to or larger than 40% of the full storage capacity. If a negative decision (NO) is obtained in step SE4, the control flow goes to step SF5 identical with step SE5.

If an affirmative decision (YES) is obtained in step SF5, the control flow goes to step SF6 wherein the the lower limit A of the total energy amount SOC of the storage device 58 is changed from the normally used 30% of the full storage capacity to 40%, for example, and the operation mode 3 is selected during running of the vehicle, or the operation mode 6 is selected during braking of the vehicle, so that one of the first and second storage portions 64, 66 is charged until the total energy amount of the storage device 58 is increased to about 40% of its full storage capacity. If an affirmative decision (YES) is obtained in step SF4, the control flow goes to step SF7 identical with step SE7 of FIG. 13.

The present fourth embodiment of FIG. 14 has substantially the same advantages as the third embodiment of FIG. 13.

Referring to the flow chart of FIG. 15, there will be described a control routine executed in place of the routine of FIG. 9, by the hybrid drive controller 50 according to a fifth embodiment of this invention. It will be understood that a portion of the hybrid drive controller 50 assigned to implement step SG6 provides fully discharging means, while a portion of the controller 50 assigned to implement step SG5 provides charging control means. It will also be understood that step SG3 corresponds to a predetermined condition which should be satisfied for operation of the fully discharging means, while a portion of the controller 50 assigned to implement steps SG1 and SG2 provides full discharge restricting means for restricting an operation of the fully discharging means when the predetermined condition is not satisfied.

Figure 15:
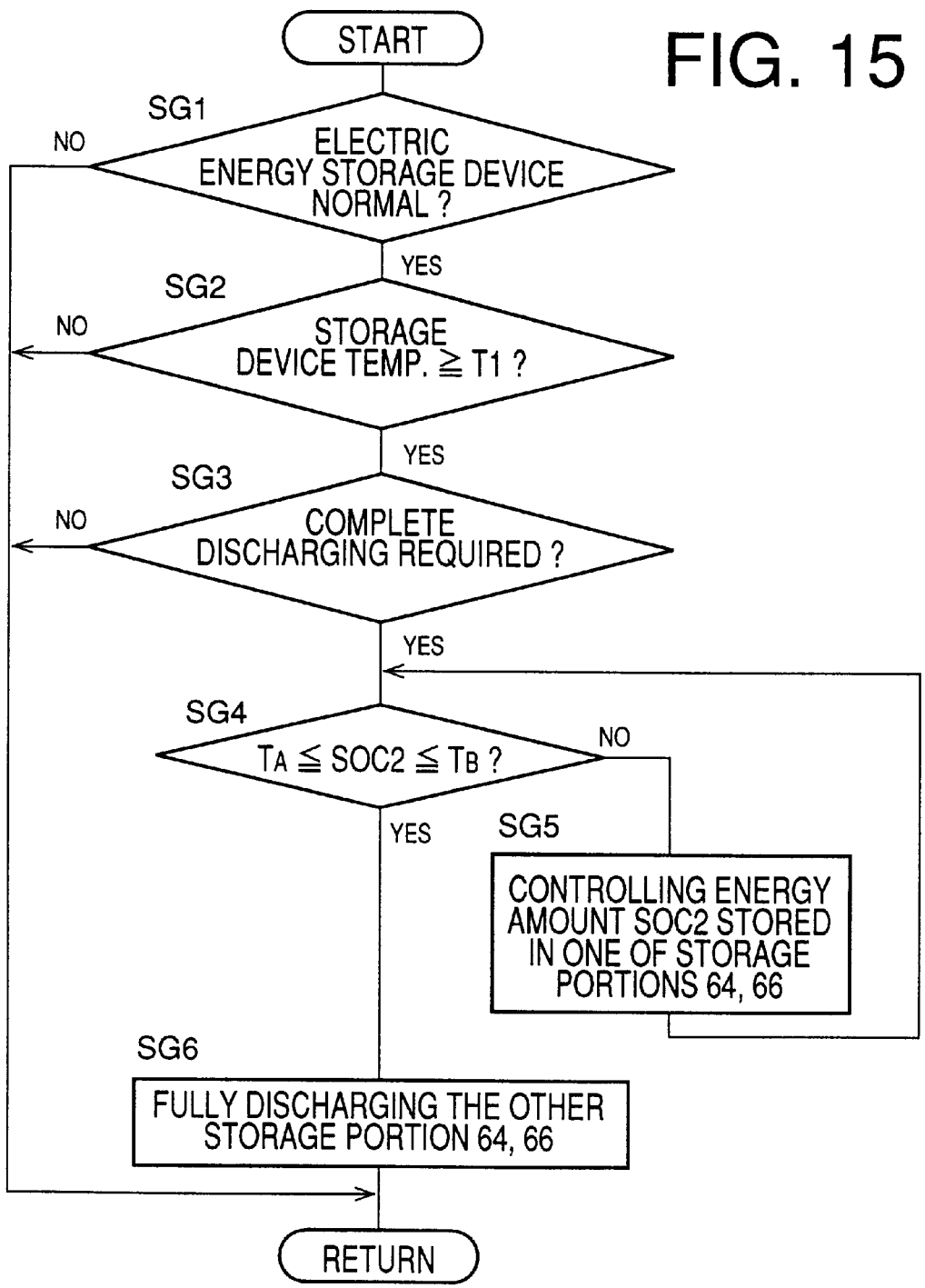
FIG. 15 is a flow chart illustrating a control routine according to a still further embodiment of the invention.

In the routine of FIG. 15, steps SG1–SG3 are identical with steps SE1–SE3 of the routine of FIG. 13. If the affirmative decision (YES) is obtained in all of the steps SG1–SG3, the control flow goes to step SG4 to determine whether the energy amount $SOC_2$ ($SOC_A$ or $SOC_B$) stored in the storage portion 64, 66 which is not to be fully discharged is within a range between predetermined lower and upper limits $T_A$ and $T_B$ (inclusive). The lower limit $T_A$ is determined according to the following equation (1), wherein "A" represents the lower limit of the energy amount SOC above which the electric energy stored in the storage device 58 is permitted to be used by the motor/generator 14 to drive the vehicle, and "$SOC_1$" represents the energy amount stored in the storage portion 64, 66 which is to be fully discharged, while "K" represents a predetermined coefficient (e.g., 0.8) determined based on the energy loss upon transfer of the electric energy between the two storage portions 64, 66.

$$T_A = A - SOC1 \times K \tag{1}$$

The upper limit $T_B$ is determined according to the following equation (2), wherein "B" represents the maximum energy amount $SOC_2$ that can be stored in the storage portion 64, 66 which is not to be fully discharged.

$$T_B = B' - SOC1 \times K \tag{2}$$

The lower limit A is about 30% of the full storage capacity of the storage device 58, which is equivalent to about 60% of the full storage capacity of the storage portion 64, 66 which is not to be fully discharged). The maximum energy amount B' is about 80% of the full storage capacity of the storage portion 64, 66 which is not to be fully discharged, which is equivalent to about 40% of the full storage capacity of the storage device 58. With the maximum energy amount B' being about 80% of the full storage capacity of the storage portion 64, 66, the electric energy can be stored in the storage portion 64, 66 when the electric energy is generated in the operation mode 5 or operation mode 6 while the routine of FIG. 15 is executed. While step SG4 is formulated to determine whether the energy amount $SOC_2$ of the storage portion 64, 66 which is not to be fully discharged is within the range between the lower and upper limits $T_A$, $T_B$, this step SG4 is provided to determine whether the total energy amount $SOC = SOC_2 + SOC_1 \times K$ when the energy loss upon the energy transfer between the two storage portions 64, 66 is taken into account is not smaller than than the lower limit A and is not larger than the maximum energy amount B' (about 80% of the full storage capacity of the storage portion 64, 66). The upper limit $T_B$ may be a fixed value of about 50% of the full storage capacity of the storage portion 64, 66 which is not to be discharged, so that the electric energy can be stored in this storage portion 64, 66 even when the other storage portion 64, 66 which is to be fully discharged is fully charged before the full discharging.

If a negative decision (NO) is obtained in step SG4, the control flow goes to step SG5 to charge or discharge the storage portion 64, 66 which is not to be fully discharged, so that the energy amount $SOC_2$ of that storage portion is held within the range between $T_A$ and $T_B$ (inclusive). If an affirmative decision (YES) is obtained in step SG4, the control flow goes to step SG6 identical with step SE7 of FIG. 13.

In the present fifth embodiment, the electric energy is transferred from one of the two storage portions 64, 66 to the other when the energy amount $SOC_2$ of the other storage portion is within the predetermined range between the lower and upper limits $T_A$ and $T_B$, that is, when the total energy amount SOC ($SOC_2 + SOC_1 \times K$) is not smaller than the lower limit A and is not larger than about 80% of the maximum energy amount of the above-indicated other storage portion. This arrangement permits the above-indicated one storage portion to be fully discharged for preventing a decrease in the storage capacity of the storage device 58 due to its repeated charging, while preventing insufficiency of the electric energy for running the vehicle and excessive charging of the other storage portion. Since the above-indicated other storage portion is protected from excessive charging, the operation to fully discharge the two storage portions 64, 66 alternately can be completed in a relatively short time with high efficiency.

Referring to the flow chart of FIG. 16, there will be described a control routine executed in place of the routine of FIG. 9, by the hybrid drive controller 50 according to a sixth embodiment of this invention. It will be understood that a portion of the hybrid drive controller 50 assigned to implement step SH6 provides fully discharging means, while a portion of the controller 50 assigned to implement step SH4 provides full discharge permitting means. It will also be understood that a portion of the controller 50 assigned to implement step SH5 provides upper limit changing means, and step SH3 corresponds to a predetermined condition which should be satisfied for operation of the fully discharging means, while a portion of the controller 50 assigned to implement steps SH1 and SH2 provides full discharge restricting means for restricting an operation of the fully discharging means when the predetermined condition is not satisfied.

Figure 16:
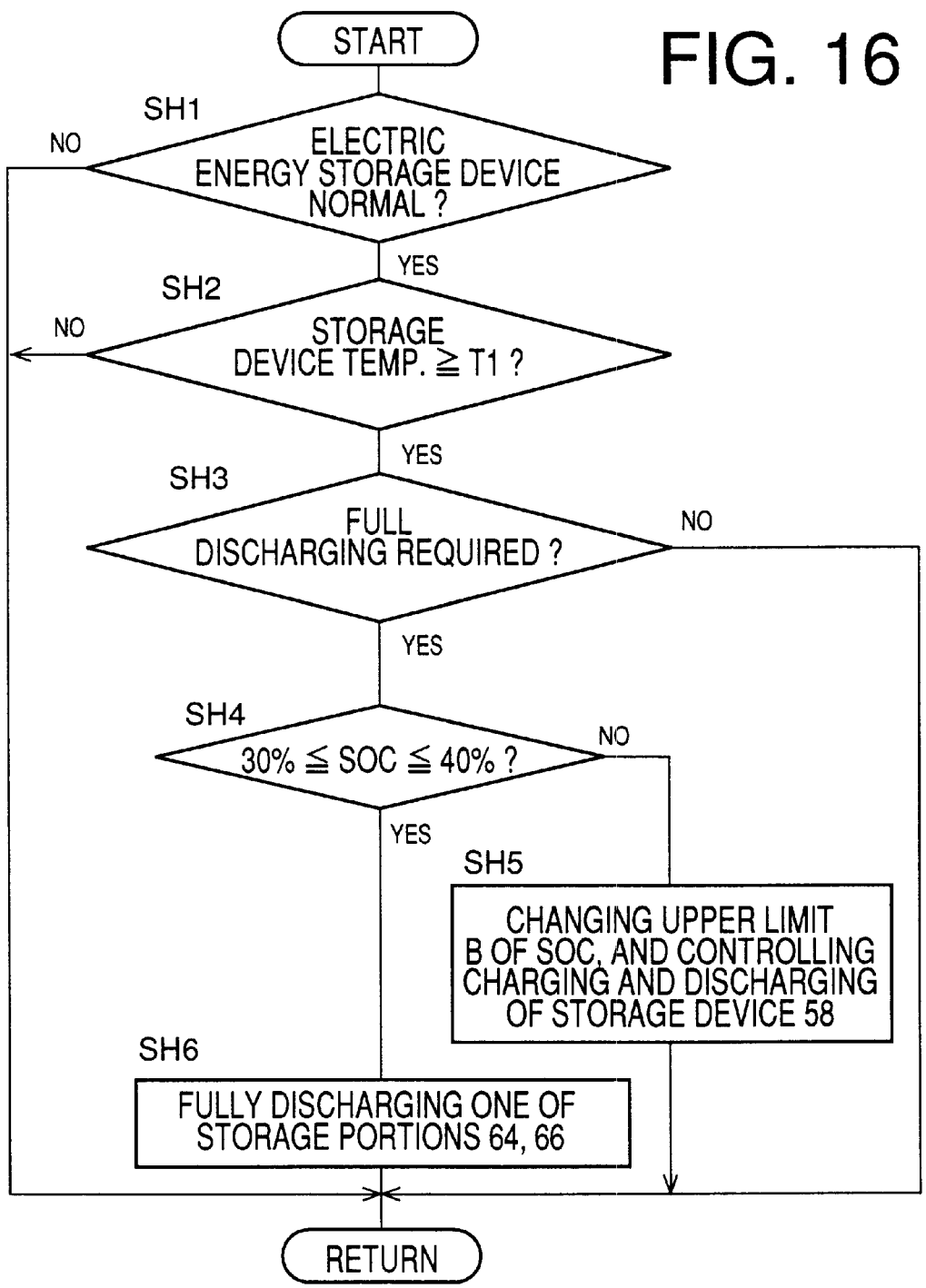
FIG. 16 is a flow chart illustrating a control routine according to another embodiment of the invention.

In the routine of FIG. 16, steps SH1–SH3 are identical with steps SE1–SE3 of the routine of FIG. 13. If the affirmative decision (YES) is obtained in all of the steps SH1–SH3, the control flow goes to step SH4 to determine whether the total energy amount SOC of the storage device 58 (energy amount $SOC_A$ of the storage portion 64 plus energy amount $SOC_B$ of the storage portion 66) is within a range between predetermined lower and upper limits, for instance, about 30% and 40% of the full storage capacity of the storage device 58. This range is determined to transfer the electric energy between the two storage portions 64, 66 while avoiding insufficiency of the electric energy for running the vehicle.

If a negative decision (NO) is obtained in step SH4, the control flow goes to step SH5 wherein the upper limit of the energy amount SOC of the storage device 58 (maximum energy amount B used in the sub-routine of FIG. 6) is changed from the normally used value of 80% to 40% of the full storage capacity, so that the energy amount SOC is held within the range between 30% and 40% of the full capacity, as a result of the operations in the operation modes selected according to the sub-routine of FIG. 6 with the upper limit B reduced to 40%. It will be understood that a portion of the hybrid drive controller 50 assigned to execute the sub-routine of FIG. 6 provides energy amount control means for controlling the energy amount SOC stored in the storage device 58 such that the total energy amount SOC does not exceed a predetermined upper limit. Step SH5 may be modified to change the threshold values P1, P2 used in the sub-routine of FIG. 6, rather than the upper limit B, so that the operation modes 1 and 4 that cause the storage device 58 to be discharged are more likely to be selected when the total energy amount SOC is larger than the upper limit 40%.

If an affirmative decision (YES) is obtained in step SH4, the control flow goes to step SH6 identical with step SE7 of FIG. 13, so that one of the two storage portions 64, 66 is fully discharged. Then, the upper limit B is restored to the original value of 80%.

In the present sixth embodiment, the electric energy is transferred from one of the two storage portions 64, 66 to the other when the total energy amount SOC of the storage device 58 ($SOC_A + SOC_B$) is within the predetermined range (e.g., between 30% and 40%). This arrangement permits one of the two storage portions 64, 66 to be fully discharged for preventing a decrease in the storage capacity of the storage device 58 due to its repeated charging, while preventing insufficiency of the electric energy for running the vehicle and excessive charging of the other storage portion. Since the above-indicated other storage portion is protected from excessive charging, the operation to fully discharge the two storage portions 64, 66 alternately can be completed in a relatively short time with high efficiency.

Referring to the flow chart of FIG. 17, there will be described a control routine executed in place of the routine of FIG. 9, by the hybrid drive controller 50 according to a seventh embodiment of this invention. It will be understood that a portion of the hybrid drive controller 50 assigned to implement step SI8 provides fully discharging means, while a portion of the controller 50 assigned to implement step SI4 provides full discharge permitting means. It will also be understood that a portion of the controller 50 assigned to implement step SI5 provides upper limit changing means, and step SI3 corresponds to a predetermined condition which should be satisfied for operation of the fully discharging means, while a portion of the controller 50 assigned to implement steps SI1 and S12 provides full discharge restricting means for restricting an operation of the fully discharging means when the predetermined condition is not satisfied.

Figure 17:
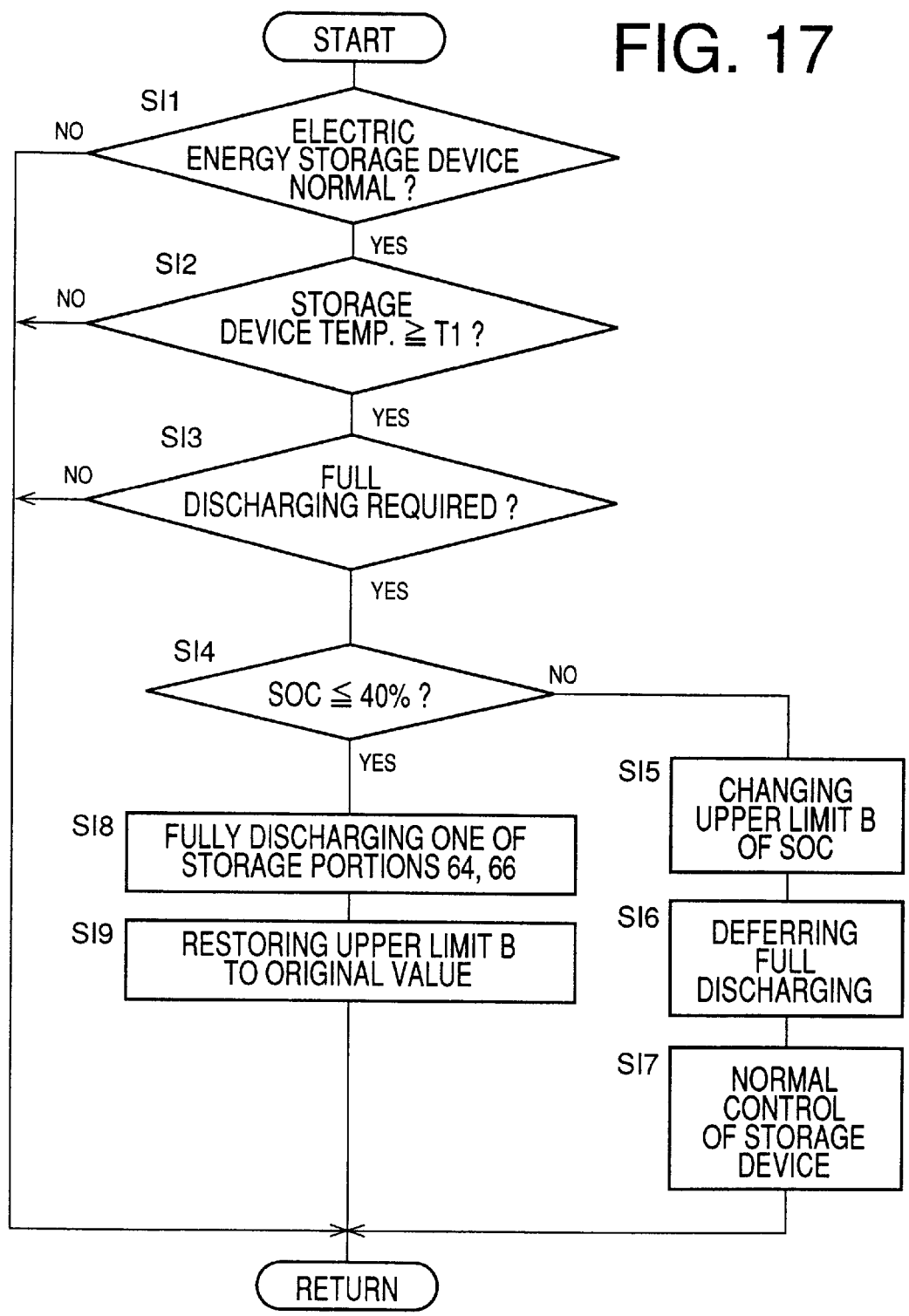
FIG. 17 is a flow chart illustrating a control routine according to still another embodiment of the invention.

In the routine of FIG. 17, steps SI1–SI3 are identical with steps SE1–SE3 of the routine of FIG. 13. If the affirmative decision (YES) is obtained in all of the steps SI1–SI3, the control flow goes to step SI4 to determine whether the total energy amount SOC of the storage device 58 is equal to 40% or smaller of the full storage capacity. If a negative decision (NO) is obtained in step SI4, the control flow goes to step SI5 in which the upper limit of the energy amount SOC of the storage device 58 (maximum energy amount B used in the sub-routine of FIG. 6) is changed from the normally used value of 80% to 40% of the full storage capacity. Step SI5 is followed by step SI6 in which the operation to fully discharge one of the two storage portions 64, 66 is deferred. Then, the control flow goes to step SI7 wherein the hybrid drive system 10 is operated in the operation mode selected according to the sub-routine of FIG. 6, so that the total energy amount SOC is held equal to or smaller than the upper limit of 40%.

If an affirmative decision (YES) is obtained in step SI4, the control flow goes to step SI8 identical with step SE7 of FIG. 13, so that one of the two storage portions 64, 66 is fully discharged. Then, the upper limit B is restored to the original value of 80%.

In the present seventh embodiment, the upper limit B of the total energy amount SOC which is used in the sub-routine of FIG. 6 is changed to 40% in step SI5 before the full discharging operation is effected in step SI8. This arrangement permits one of the two storage portions 64, 66 to be fully discharged with high efficiency for preventing a decrease in the storage capacity of the storage device 58 due to its repeated charging, while preventing insufficiency of the electric energy for running the vehicle and excessive charging of the other storage portion.

Referring to the flow chart of FIG. 18, there will be described a control routine executed in place of the routine of FIG. 9, by the hybrid drive controller 50 according to an eighth embodiment of this invention. It will be understood that a portion of the hybrid drive controller 50 assigned to implement steps SJ4 and SJ7 provides fully discharging means, and steps S33 and SJ6 and a part of step SJ7 correspond to a predetermined condition which should be satisfied for operation of the fully discharging means. It will also be understood that a portion of the controller 50 assigned to implement steps SJ1 and SJ2 provides full discharge restricting means for restricting an operation of the fully discharging means when the predetermined condition is not satisfied. It is desirable that steps SJ4 and SJ7 be implemented when the total energy amount SOC is larger than a predetermined lower limit or within a predetermined range, or when the energy amount of the storage portion 64, 66 which is not to be fully discharged is larger than a predetermined lower limit.

Figure 18:
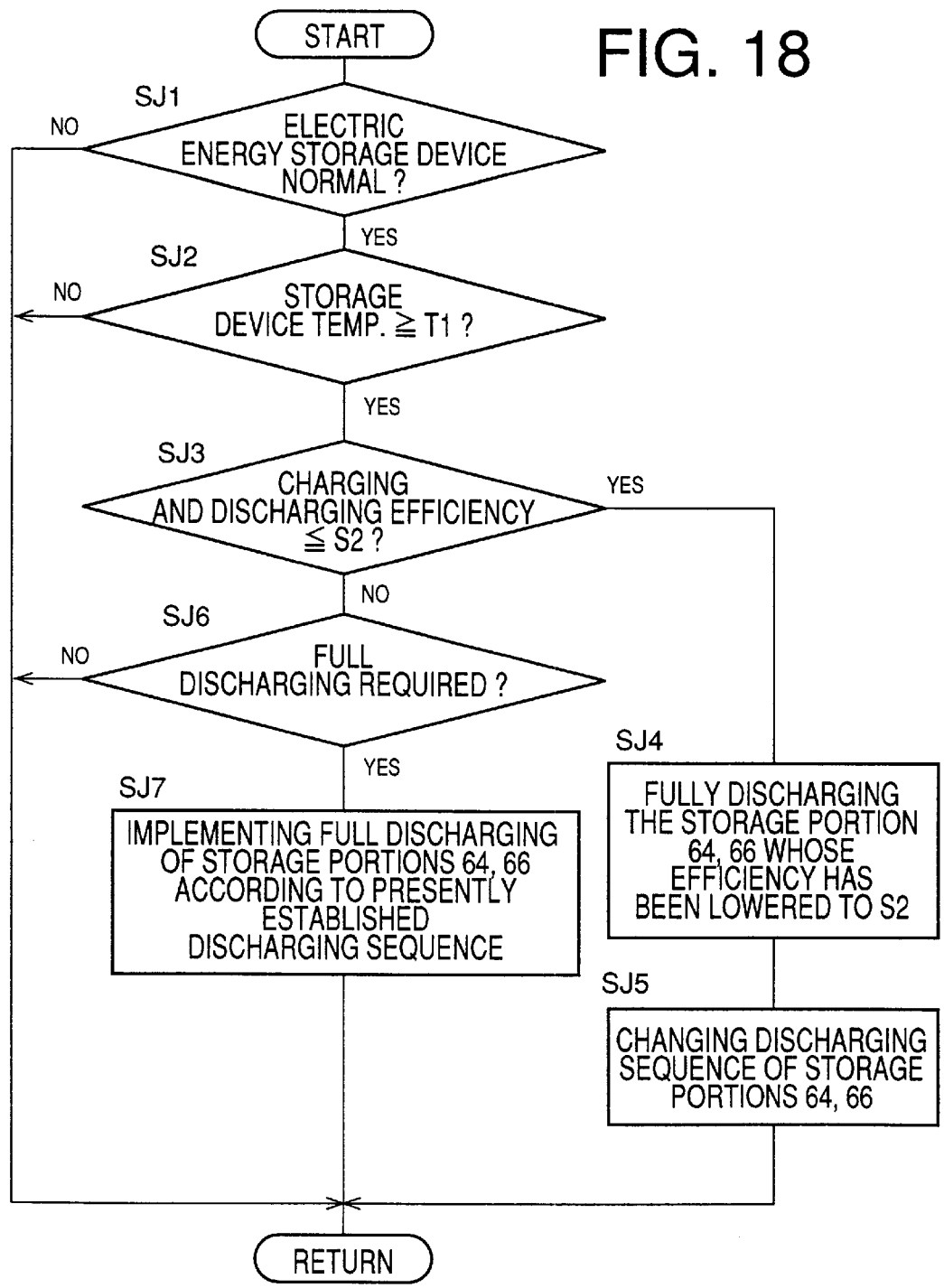
FIG. 18 is a flow chart illustrating a control routine according to yet another embodiment of the invention.

In the routine of FIG. 18, steps SJ1 and SJ2 are identical with steps SE1 and SE2 of the routine of FIG. 13. If the affirmative decision (YES) is obtained in both of the steps SJ1 and SJ2, the control flow goes to step SJ3 to determine whether the charging and discharging efficiency of the storage portion 64 or 66 has been lowered to a predetermined lower limit S2. The charging and discharging efficiency may be obtained as described above with respect to step SA1 of FIG. 9. However, the lower limit S2 used in step SJ3 is higher than that used in step SA1 for determining whether the storage device 58 is normally functioning.

If an affirmative decision (YES) is obtained in step SJ3, the control flow goes to step SJ4 in which the storage portion 64, 66 whose charging and discharging efficiency has been lowered to the lower limit S2 is fully discharged. This storage portion 64, 66 can be fully discharged by transferring the electric energy to the other storage portion 64, 66, or by using this storage portion 64, 66 for operating the motor/generator 14 as the electric motor in the operation modes 1 and 4 selected according to the sub-routine of FIG. 6. The routine of FIG. 18 may be modified so as to determine that the storage portion 64 or 66 is defective, and provides an indication of this determination, if the charging and discharging efficiency is not increased above the lower limit S2 after step SJ4 is repeated more than a predetermined number of times.

Step SJ4 is followed by step SJ5 to change the sequence in which the two storage portions 64, 66 are fully discharged, so that the storage portion 64, 66 whose charging and discharging efficiency has been lowered to the lower limit S2 is discharged more frequently than the other storage portion 64, 66. If the storage portion 64, 66 whose charging and discharging efficiency has been lowered to the lower limit S2 is represented by "X" while the other storage portion is represented by "Y", the sequence may be changed from the normally established alternate discharging sequence X-Y-X-Y-X-Y- . . . to a sequence X-X-Y-X-X-Y- . . . for example, so that the storage portion X is more frequently discharged than the storage portion Y.

If a negative decision (No) is obtained in step SJ3, the control flow goes to step SJ6 identical with step SE3 of FIG. 13. If an affirmative decision (YES) is obtained in step SJ6, the control flow goes to step SJ7 in which the storage portion X is fully discharged as in step SJ4, according to the presently established discharging sequence (sequence established in step SJ5 where step SJ7 is implemented after the affirmative decision is obtained in step SJ3).

In the present eighth embodiment, the two storage portions 64, 66 of the storage device 58 are alternately fully discharged, or the storage portion 64, 66 (X) whose charging and discharging efficiency has been lowered to the lower limit S2 is discharged more frequently than the other storage portion 64, 66 (Y). This arrangement is effective to prevent a decrease in the storage capacity of the storage device 58 due to repeated charging, while avoiding deterioration of the storage device 58 due to unnecessarily frequent full discharging and charging.

Figure 19:
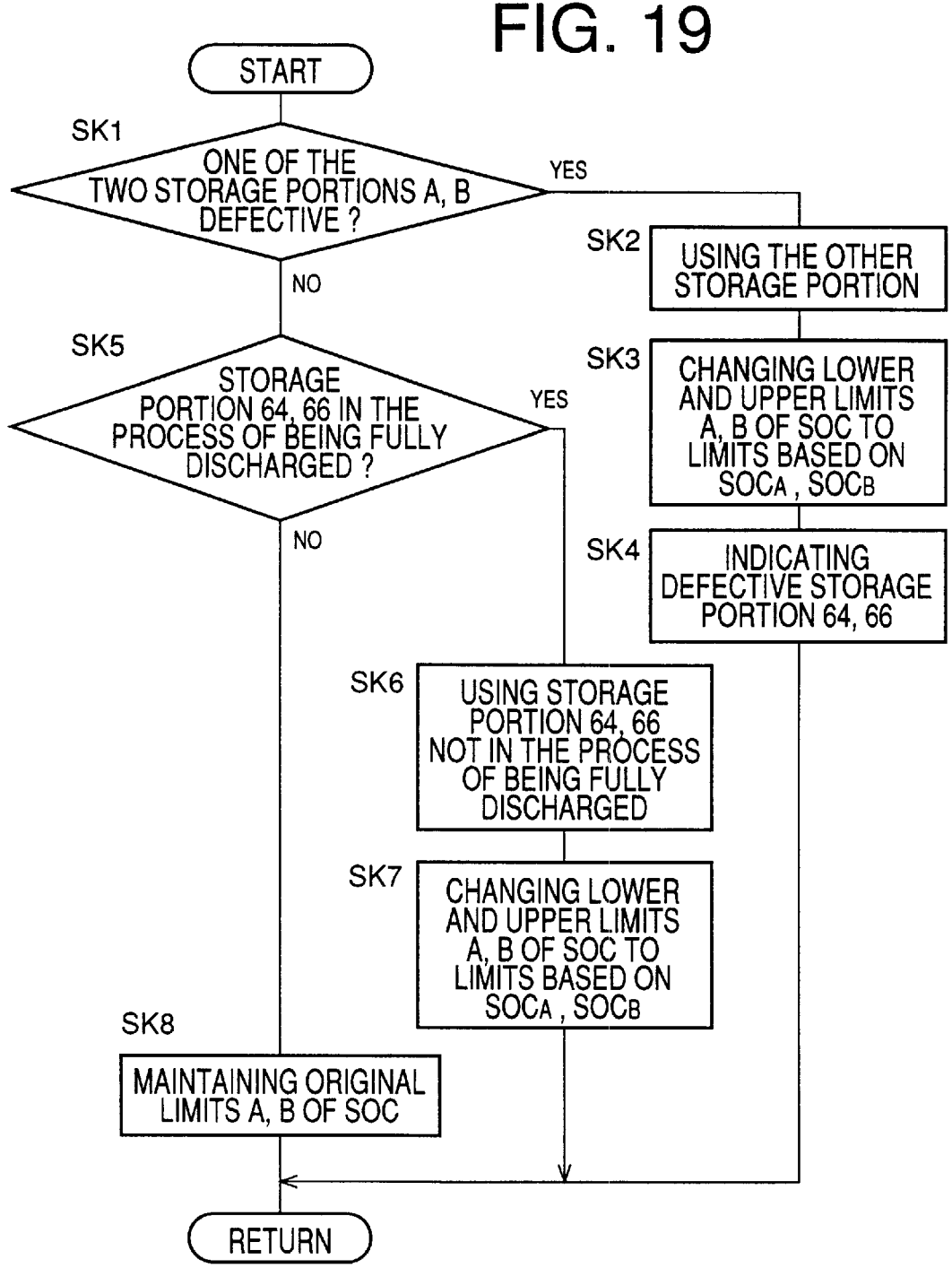
FIG. 19 is a flow chart illustrating a routine according to another embodiment of the invention.

According to a ninth embodiment of this invention, the hybrid drive controller 50 is adapted to execute a routine illustrated in the flow chart of FIG. 19, in addition to the control routine of any of the preceding embodiments. It will be understood that a portion of the controller 50 assigned to implement steps SK3 and SK7 provides threshold changing means for changing the lower and upper limits A and B used in the sub-routine of FIG. 6. It will also be understood that the sub-routine of FIG. 6 corresponds to operation control means for controlling the hybrid drive system 10, in the form of operation mode selecting means for selecting the operation mode of the hybrid drive system 10, on the basis of the total electric energy amount SOC as compared with the lower and upper limits A, B.

The routine of FIG. 19 is initiated with step SK1 to determine whether either one of the two storage portions 64, 66 of the storage device 58 is defective or abnormal. This determination is effected by determining whether the charging and discharging efficiency of each storage portion 64, 66 has been lowered to a predetermined lower limit, or by determining whether the voltage of the storage portion 64, 66 has been lowered to a predetermined lower limit. If an affirmative decision (YES) is obtained in step SK1, the control flow goes to step SK2 in which the other or normal storage portion 64, 66 is used in the appropriate operation modes selected according to the sub-routine of FIG. 6.

Step SK2 is followed by step SK3 in which the lower and upper limits A, B of the total energy amount SOC used in the sub-routine of FIG. 6 are changed to the limits based on the energy amount $SOC_A$, $SOC_B$ of the storage portion 64, 66 which is used. That is, since only the normal one of the storage portions 64, 66 is used as the storage device 58, the storage capacity of the storage device 58 is reduced to a half of the nominal value. In this respect, it is noted that the two storage portions 64, 66 have the same nominal storage capacity. Accordingly, the lower and upper limits A, B are reduced to half values of the normally used values in step SK3. However, it is possible to maintain the original lower and upper limits A, B, double the energy amount SOC of the storage device 58 and compare the doubled value (SOC×2) with the original lower and upper limits A, B. Step SK3 is followed by step SK4 in which an indication of the defect or abnormality of one of the two storage portions 64, 66 is provided on a suitable device such as an instrument panel in the driver's compartment of the vehicle.

If a negative decision (NO) is obtained in step SK1, the control flow goes to step SK5 to determine whether one of the two storage portions 64, 66 is in the process of being fully discharged. This determination is effected on the basis of the present state of a flag indicative of whether the storage portion 64, 66 is being fully discharged or not. Alternatively, the determination is effected by checking if the electric energy is being transferred from one of the two storage portions 64, 66 to the other. If an affirmative decision (YES) is obtained in step SK5, the control flow goes to step SK6 in which only the other storage portion 64, 66 which is not in the process of being fully discharged is used in the appropriate operation modes selected according to the sub-routine of FIG. 6.

Step SK6 is followed by step SK7 in which the lower and upper limits A, B of the total energy amount SOC are changed, as in step SK3, since one of the two storage portions 66, 64 is in the process of being fully discharged and cannot be used. The manner of changing the limits A, B in step SK7 may be different from that in step SK3.

If a negative decision (NO) is obtained in step SK5, the control flow goes to step SK8 in which the original lower and upper limits A, B of the total energy amount SOC are not changed and are maintained.

In the present ninth embodiment of the invention, the lower and upper limits A, B of the total energy amount SOC of the storage device 58 which limits are used in the sub-routine of FIG. 6 are changed if one of the two storage portions 64, 66 cannot be used because it is defective or in the process of being fully discharged. This arrangement permits adequate charging and discharging operations of the storage device 58 according to the control routine in any one of the preceding embodiments of FIGS. 9-18.

Described in detail, the original lower and upper limits A, B (e.g., 30% and 80% of the full storage capacity of the storage device 58) are normally used in the sub-routine of FIG. 6. If these original lower and upper limits A, B were used where only one of the two storage portions 64, 66 can be used, the charging and discharging of this storage portion 64, 66 would be controlled such that its energy amount $SOC_A$, $SOC_B$ is held within a range between 60% and 160% of its full storage capacity. In this case, the used storage portion 64, 66 may be fully charged and cannot be used in the regenerative braking mode (operation mode 6), or may be deteriorated due to excessive charging. The manner of changing the lower and upper limits A, B may be suitably determined. For instance, only the upper limit B may be changed.

Figure 20:
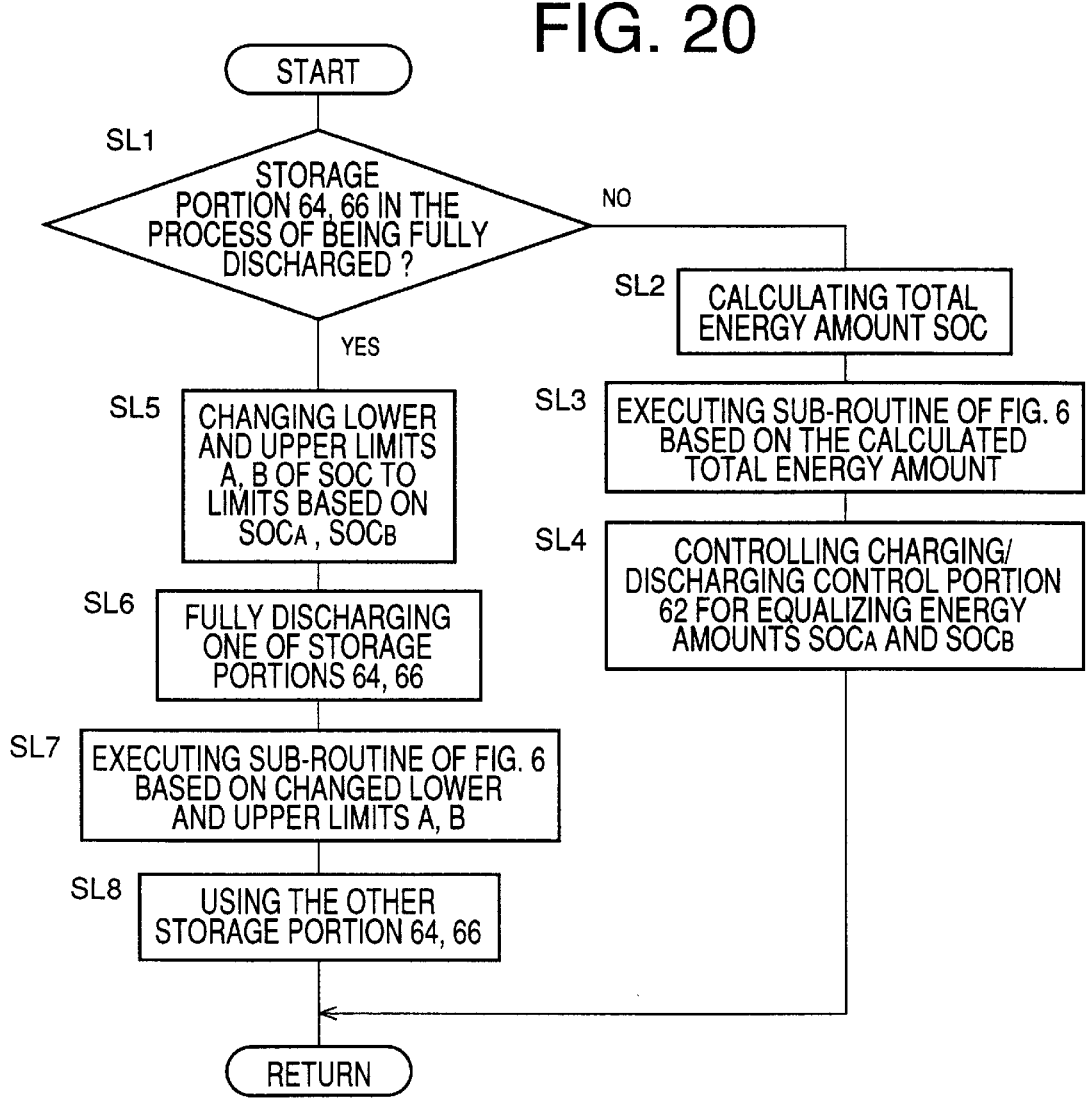
FIG. 20 is a flow chart illustrating a routine according to a further embodiment of the invention.

According to a tenth embodiment of this invention, the hybrid drive controller 50 is adapted to execute a routine illustrated in the flow chart of FIG. 20, in addition to the control routine of any of the preceding embodiments. It will be understood that a portion of the controller 50 assigned to implement step SL5 provides threshold changing means for changing the lower and upper limits A, B used in the sub-routine of FIG. 6. It will also be understood that a portion of the controller 50 assigned to implement steps SL3 and SL7 provides operation control means for controlling the hybrid drive system 10 on the basis of the electric energy amount stored in the storage device 50 as compared with the lower and upper limits A, B. More specifically, a portion of the controller 50 assigned to implement step SL3 provides first mode selecting means while a portion of the controller 50 assigned to implement step SL7 provides second mode selecting means. The first mode selecting means is operated to select the operation modes on the basis of the total electric energy amount SOC as compared with the original upper limits A, B, while the second mode selecting means is operated to select the operation modes on the basis of the electric energy amount $SOC_A$, $SOC_B$ as compared with the lower and upper limits A, B changed by the threshold changing means.

The routine of FIG. 20 is initiated with step SL1 to determine whether one of the two storage portions 64, 66 of the storage device 58 is in the process of being fully discharged. This determination is effected in the same manner as in step SK5 of FIG. 19. If a negative decision (NO) is obtained in step SL1, the control flow goes to step SL2 in which the total energy amount SOC of the storage device 58 is calculated based on the energy amounts $SOC_A$ and $SOC_B$ of the storage portions 64, 66. Step SL2 is followed by step SL3 in which the operation mode selecting sub-routine of FIG. 6 is executed based on the calculated total energy amount SOC.

Then, the control flow goes to step SL4 in which the charging/discharging control portion 62 is controlled in the operation modes selected according to the sub-routine of FIG. 6, so that the energy amounts $SOC_A$ and $SOC_B$ are made equal to each other. That is, one of the storage portions 64, 66 whose energy amount $SOC_A$, $SOC_B$ is smaller is more frequently used so as to be charged, than the other storage portion 64, 66. In other words, the other storage portion 64, 66 whose energy amount is larger is more frequently used so as to be discharged, than the above-indicated one storage portion 64, 66. Alternatively, the energy may be transferred from the storage portion 64, 66 whose energy amount is smaller, to the other storage portion 64, 66. It will be understood that a portion of the controller 50 assigned to implement step sL4 provides means for controlling the storage portions 64, 66 so as to equalize the energy amounts $SOC_A$, $SOC_B$ stored therein.

If an affirmative decision (YES) is obtained in step SL1, the control flow goes to step SL5 in which the lower and upper limits A, B of the total energy amount SOC of the storage device 58 are changed to the limits based on the energy amount $SOC_A$, $SOC_B$ of the storage portion 64, 66 which is not in the process of being fully discharged and can be used. For instance, the original lower and upper limits A, B are changed respectively to 30% and 80% of the full capacity of the storage portion 64, 66 which can be used. However, the original lower limit A may be kept unchanged.

Step SL5 is followed by step SL6 in which the storage portion 64, 66 in the process of being fully discharged is discharged until its energy amount $SOC_A$, $SOC_B$ is zeroed. This fully discharging of the storage portion 64, 66 in question is effected by transferring its energy to the other storage portion, or by connecting the storage portion in question to suitable energy consuming means such as an electric heater or resistor. Then, the control flow goes to step SL7 in which the sub-routine of FIG. 6 is executed based on the lower and upper limits A, B which have been changed in step SL5 based on the energy amount $SOC_A$, $SOC_B$ of the storage portion 64, 66 which has not been fully discharged. Step SL7 is followed by step SL8 in which only the storage portion 64, 66 which has not been fully discharged is used in the operation modes selected according to the sub-routine of FIG. 6.

In the present tenth embodiment, the operation mode selecting sub-routine of FIG. 6 is executed in step SL3 based on the total energy amount SOC of the storage device 58 where the two storage portions 64, 66 can be used for operation of the hybrid drive system 10, but is executed in step SL7 based on the energy amount $SOC_A$, $SOC_B$ of the storage portion 64, 66 which can be used, where the other storage portion 64, 66 is in the process of being fully discharged and cannot be used. This arrangement permits adequate selection of the operation modes according to the sub-routine of FIG. 6 and adequate control of the storage device 58, even while one of the two storage portions 64, 66 is subjected to the fully discharging process.

Referring to the flow chart of FIG. 21, there will be described a control routine executed in place of the routine of FIG. 9, by the hybrid drive controller 50 according to an eleventh embodiment of this invention. It will be understood that a portion of the hybrid drive controller 50 assigned to implement step SM8 provides fully discharging means, while a portion of the controller 50 assigned to implement steps SM1 and SM2 provides full discharge restricting means for restricting an operation of the fully discharging means. Steps SJ4 and SJ7 are implemented when the total energy amount SOC is larger than a predetermined lower limit or within a predetermined range, or when the energy amount of the storage portion 64, 66 which is not to be fully discharged is larger than a predetermined lower limit.

Figure 21:
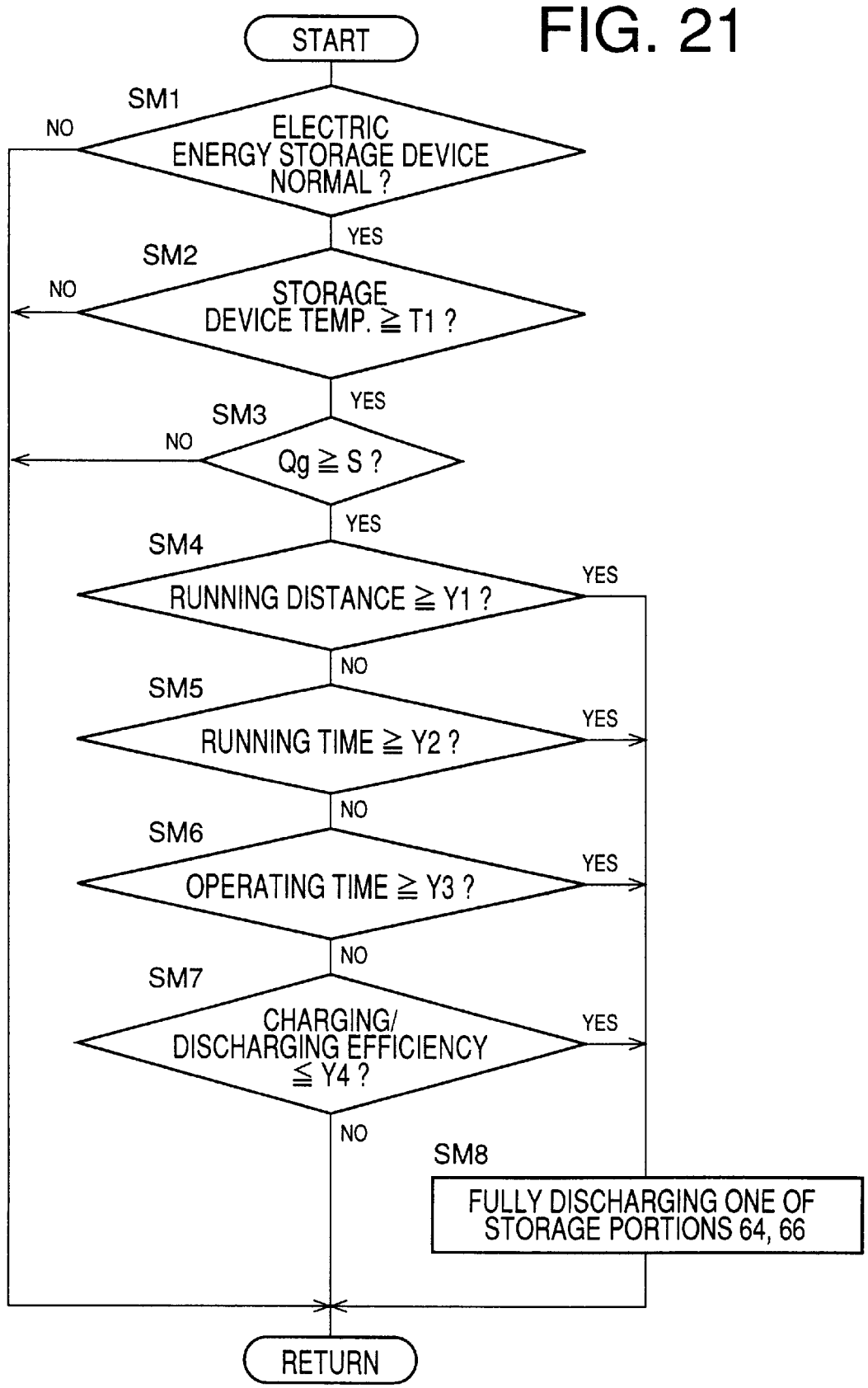
FIG. 21 is a flow chart illustrating a control routine according to a still further embodiment of the invention.

In the routine of FIG. 21, steps SM1 and SM2 are identical with steps SE1 and SE2 of the routine of FIG. 13. If the affirmative decision (YES) is obtained in both of the steps SM1 and SM2, the control flow goes to step SM3 to determine whether a fuel amount Qg available for use for the engine 12 is equal to or larger than a predetermined threshold S. This threshold S is a lower limit above which the engine 12 can be operated to operate the motor/generator 14 as the electric generator to charge the storage device 58 until the total energy amount SOC is increased to a predetermined value.

If a negative decision (NO) is obtained in step SM3, one cycle of execution of the routine of FIG. 21 is terminated. If an affirmative decision (YES) is obtained in step SM3, the control flow goes to step SM4 to determine whether a cumulative running distance of the vehicle after the last full discharging of one of the two storage portions 64, 66 has reached a predetermined value Y1. If a negative decision (NO) is obtained in step SM4, the control flow goes to step SM5 to determine whether a cumulative running time of the vehicle after the last full discharging has reached a predetermined value Y2. If a negative decision (NO) is obtained in step SM5, the control flow goes to step SM6 to determine whether a cumulative time of use of the storage device 58 has reached a predetermined value Y3. The predetermined values Y1–Y3 may be calculated according to stored data maps or equations based on suitable parameter or parameters relating to the cumulative period of use of the vehicle. The data maps or equations are formulated such that the values Y1–Y3 decrease with an increase in the cumulative period of use.

If a negative decision (NO) is obtained in step SM6, the control flow goes to step SM7 to determine whether the charging and discharging efficiency of each storage portion 64, 66 has been lowered to a predetermined threshold Y4. This efficiency is obtained in the same manner as described with respect to step SA1 of FIG. 9. The threshold Y4 is larger than the threshold used in step SM1 to determine whether the storage device 58 is normally functioning.

If an affirmative decision (YES) is obtained in any one of the steps SM4–SM7, the control flow goes to step SM8 in which one of the storage portions 64, 66 is fully discharged as in step SE7 of FIG. 13. In principle, the two storage portions 64, 66 are alternately fully discharged in step SM8. Where the charging and discharging efficiency of one of the storage portions 64, 66 has been lowered to the predetermined threshold Y4 and the affirmative decision is obtained in step SM7, this storage portion is more frequently fully discharged than the other storage portion.

In the eleventh embodiment, a selected one of the storage portions 64, 66 is fully discharged each time a predetermined fully discharging condition is satisfied, namely, when the affirmative decision (YES) is obtained in any one of the steps SM4–SM7, more specifically, if the cumulative running distance of the vehicle has reached the predetermined value Y1, if the cumulative running time of the vehicle has reached the predetermined value Y2, if the cumulative time of use of the storage device 58 has reached the predetermined value Y3, or if the charging and discharging efficiency of either one of the storage portions 64, 66 has reached the predetermined threshold Y4. This arrangement is effective to prevent a decrease in the storage capacity of the storage device 58 due to repeated charging thereof, while avoiding deterioration of the storage device 58 due to unnecessarily frequent full discharging and charging thereof.

Figure 22:
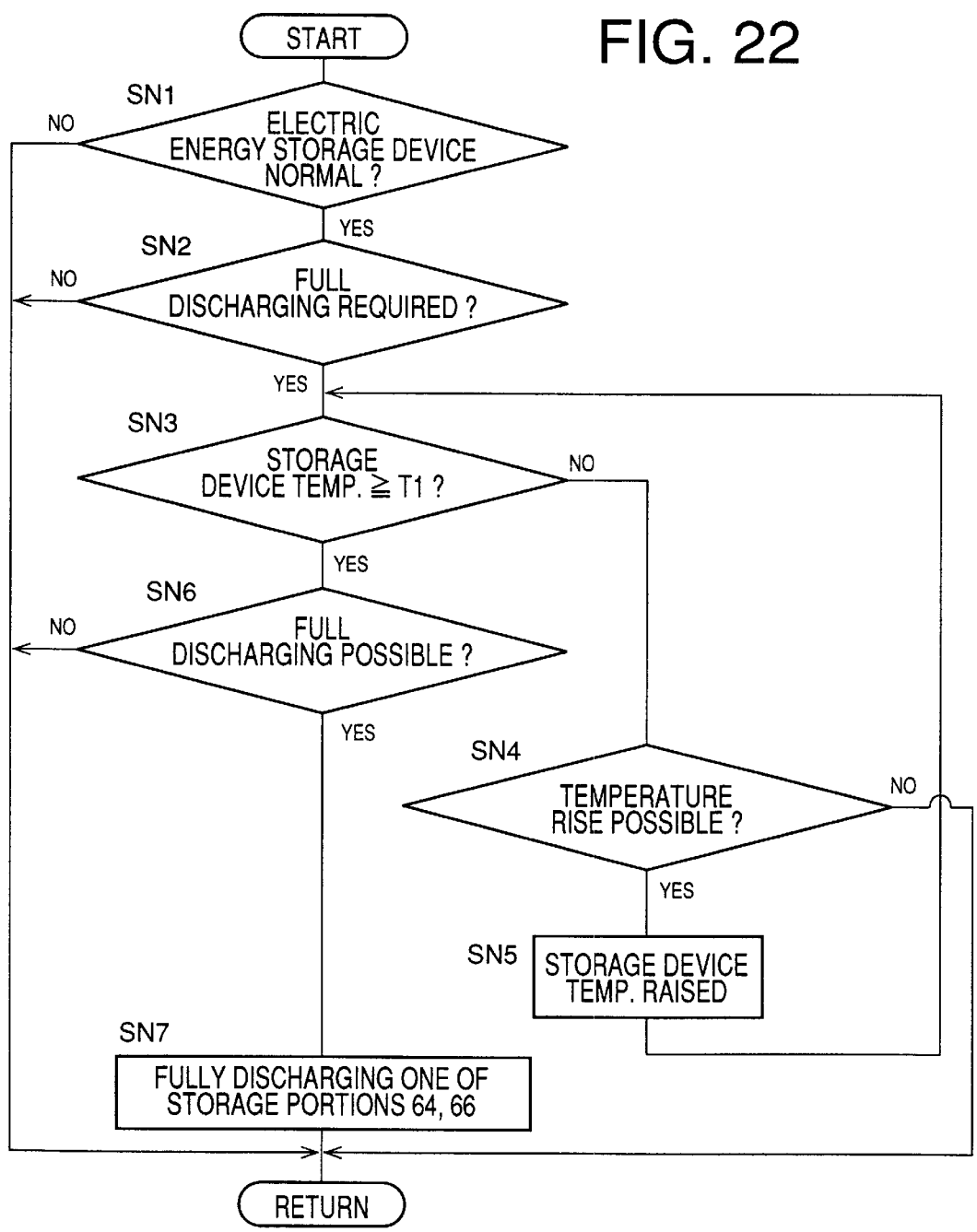
FIG. 22 is a flow chart illustrating a control routine according to a yet further embodiment of the invention.

Referring to the flow chart of FIG. 22, there will be described a control routine executed in place of the routine of FIG. 9, by the hybrid drive controller 50 according to a twelfth embodiment of this invention. It will be understood that a portion of the hybrid drive controller 50 assigned to implement step SN7 provides fully discharging means, while step SN2 corresponds to a predetermined condition that should be satisfied for operation of the fully discharging means. It will also be understood that a portion of the controller 50 assigned to implement steps SN1 and SN3 provides full discharge restricting means for restricting an operation of the fully discharging means In the routine of FIG. 22, steps SN1, SN2 and SN3 are identical with steps SE1, SE3 and SE2 of FIG. 13, respectively. If a negative decision (NO) is obtained step SN3, the control flow goes to step SN4 to determine whether the temperature of the storage device 58 can be raised. If a negative decision (NO) is obtained in step SN4, one cycle of execution of the routine of FIG. 22 is terminated. If an affirmative decision (YES) is obtained in step SN4, the control flow goes to step SN5 in which the temperature of the storage device 58 is raised to a predetermined level T1. The temperature can be raised by circulating a high-temperature oil or exhaust gas through a piping disposed around the storage device 58, or by energizing an electrical heater disposed around the storage device 58. It will be understood that a portion of the controller 50 assigned to implement step SN6 provides temperature raising means for raising the temperature of the storage device 58.

If an affirmative decision (YES) is obtained in step SN3, the control flow goes to step SN6 to determine whether one of the storage portions 64, 66 can be fully discharged. Where one of the storage portions 64, 66 is fully discharged by transferring the electric energy from that one storage portion to the other storage portion, the determination in step SN6 is effected by determining whether the total energy amount SOC of the storage device 58 is larger than a predetermined lower limit or within a predetermined range. Where one of the storage portions 64, 66 is fully discharged by using only that storage portion for operation of the hybrid drive system 10 or by connecting that storage portion to suitable energy consuming means such as electric heater or resistor, the determination in step SN6 is effected by determining whether the energy amount $SOC_A$, $SOC_B$ of the other storage portion 64, 66 is larger than a predetermined lower limit or within a predetermined range. If a negative decision (NO) is obtained in step SN6, one cycle of execution of the routine of FIG. 22 is terminated. If an affirmative decision (YES) is obtained in step SN6, the control flow goes to step SN7 wherein one of the storage portions 64, 66 is fully discharged.

In the twelfth embodiment, the full discharging of the storage device 58 is not effected when the predetermined condition is not satisfied, that is, if the temperature of the storage device 58 is lower than the threshold T1, or if both of the two storage portions 64, 66 of the storage device 58 are not normally functioning. This arrangement prevents deterioration of the storage device 58 due to full discharging under an improper condition.

Figure 23:
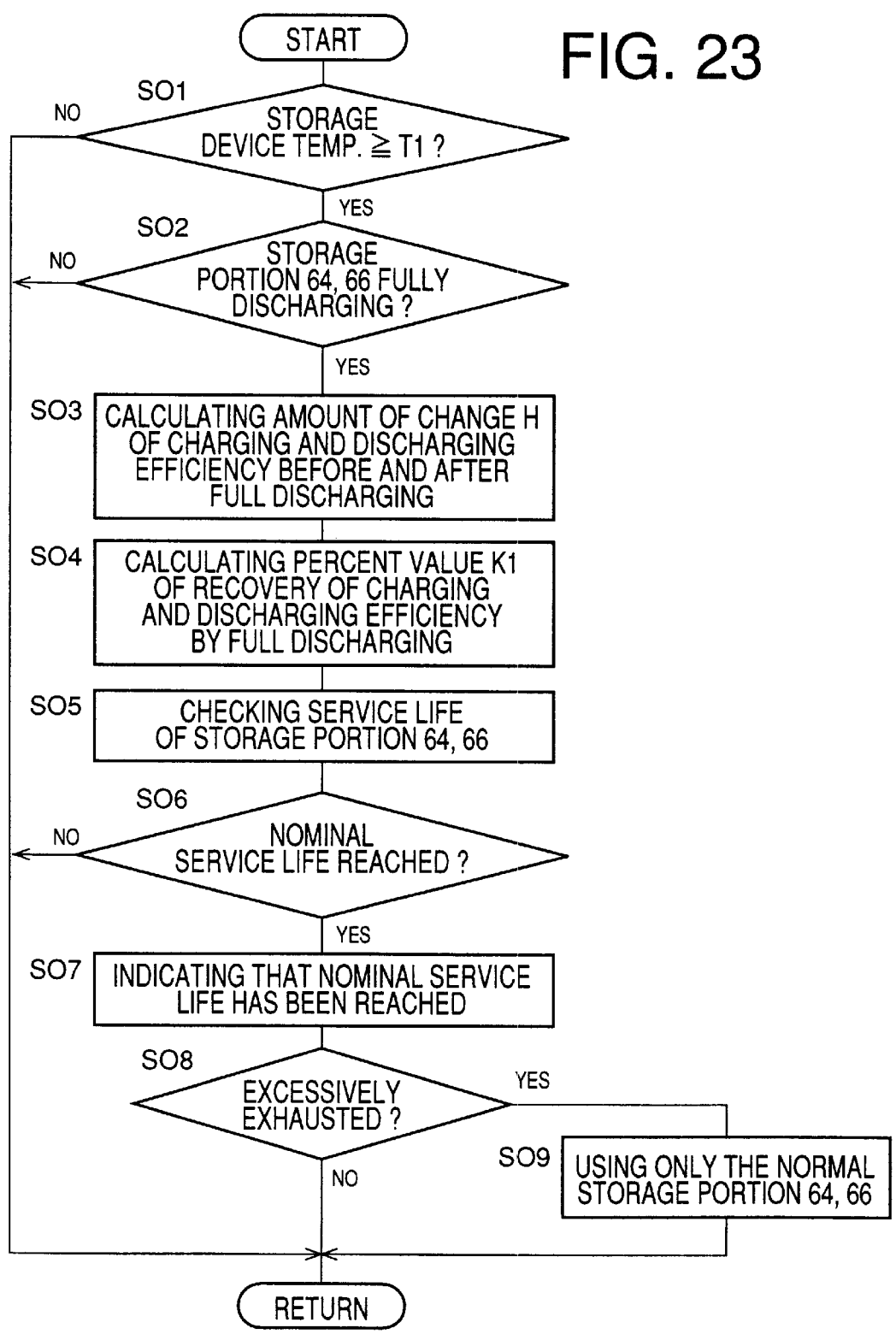
FIG. 23 is a flow chart illustrating a routine according to another embodiment of the invention.

According to a thirteen embodiment of this invention, the hybrid drive controller 50 is adapted to execute a routine illustrated in the flow chart of FIG. 23, in addition to the control routine of any of the preceding embodiments of FIGS. 9–18, 22 and 22. It will be understood that a portion of the controller 50 assigned to implement steps SO3–SO5 provides service life determining means for determining whether the nominal or expected service life of each of the storage portions 64, 66 has been reached, and that a portion of the controller 50 assigned to implement step SO7 provides indicating means for indicating that the nominal life of the storage portion 64, 66 has been reached.

The routine of FIG. 23 is initiated with step SO1 identical with step SE2 of FIG. 13. Step SO1 is followed by step SO2 to determine whether either one of the storage portions 64, 66 has been fully discharged. This determination is effected based on the present state of a flag indicative of whether the storage portion 64 or 66 has been fully discharged, or by monitoring a change in the energy amount $SOC_A$, $SOC_B$ of the storage portion 64, 66.

If an affirmative decision (YES) is obtained in step SO2, the control flow goes to step SO3 in which an amount of change H of the charging and discharging efficiency of the fully discharged storage portion 64, 66 at the moments before and after the full discharging is calculated.

Then, the control flow goes to step SO4 in which a percent value K1 of recovery of the charging and discharging efficiency by the full discharging of the fully discharged storage portion 64, 66 is calculated, and a percent value K2 of recovery of the charging and discharging efficiency of the other storage portion 64, 66 which was fully discharged is read out from the appropriate memory. The recovery percent values K1, K2 (%) are represented by (Ja/Jb)×100, wherein "Ja" represents the charging and discharging efficiency after the full discharging, while "Jb" represents the nominal or initial charging and discharging efficiency of the storage portion 64, 66.

Step SO4 is followed by step SO5 to check the fully discharged storage portion 64, 66 for its service life. Described more particularly, a determination that the nominal service life of the fully discharged storage portion 64, 66 has been reached is made if the amount of change H of the charging and discharging efficiency calculated in step SO3 has been reduced to a predetermined threshold, or if the recovery percent value K1 calculated in step SO4 has become smaller than the recovery percent value K2 by more than a predetermined value.

Then, the control flow goes to step SO6 to determine whether the above-indicated determination has been made in step SO5. If a negative decision (NO) is obtained in step SO6, one cycle of execution of the routine of FIG. 23 is terminated. If an affirmative decision (YES) is obtained in step SO6, the control flow goes to step SO7 to provide an indication that the nominal service life of the storage portion 64, 66 has been reached. This indication may be provided on the instrument panel within the driver's compartment of the vehicle.

Step SO7 is followed by step SO8 to determine whether the storage portion 64, 66 whose nominal service life has been reached is excessively exhausted and cannot be used again. For example, this determination is effected by determining whether the charging and discharging efficiency of the storage portion 64, 66 in question is smaller than a predetermined lower limit. If an affirmative decision (YES) is obtained in step SOB, the control flow goes to step SO9 in which only the normal storage portion 64, 66 is used in the operation modes selected according to the sub-routine of FIG. 13. If a negative decision (NO) is obtained in step SO8, one cycle of execution of the routine of FIG. 23 is terminated. In this case, the two storage portions 64, 66 will be continuously used.

In the thirteenth embodiment, the determination that the nominal or expected service life of the storage portion 64, 66 has been reached is made where the amount of change H of the charging and discharging efficiency before and after the full discharging has been reduced to a predetermined threshold, or if the recovery percent value K1 of the last fully discharged storage portion 64, 66 has become smaller than the recovery percent value K2 of the previously fully discharged other storage portion 64, 66, by more than a predetermined value. The vehicle driver is informed of this determination. Further, the determination in step SO6 is effected only when the temperature of the storage portion 64, 66 is not lower than the predetermined lower limit, the determination is highly reliable.

Referring to the flow chart of FIG. 24, there will be described a control routine executed in place of the routine of FIG. 9, by the hybrid drive controller 50 according to a fourteenth embodiment of this invention. It will be understood that a portion of the hybrid drive controller 50 assigned to implement step SP4 provides fully discharging means, while step SP1 corresponds to a predetermined condition that should be satisfied for operation of the fully discharging means. It will also be understood that a portion of the controller 50 assigned to implement step SP3 provides means for detecting passenger or passengers within the vehicle. Steps SP4 is implemented when the total energy amount SOC is larger than a predetermined lower limit or within a predetermined range, or when the energy amount of the storage portion 64, 66 which is not to be fully discharged is larger than a predetermined lower limit.

Figure 24:
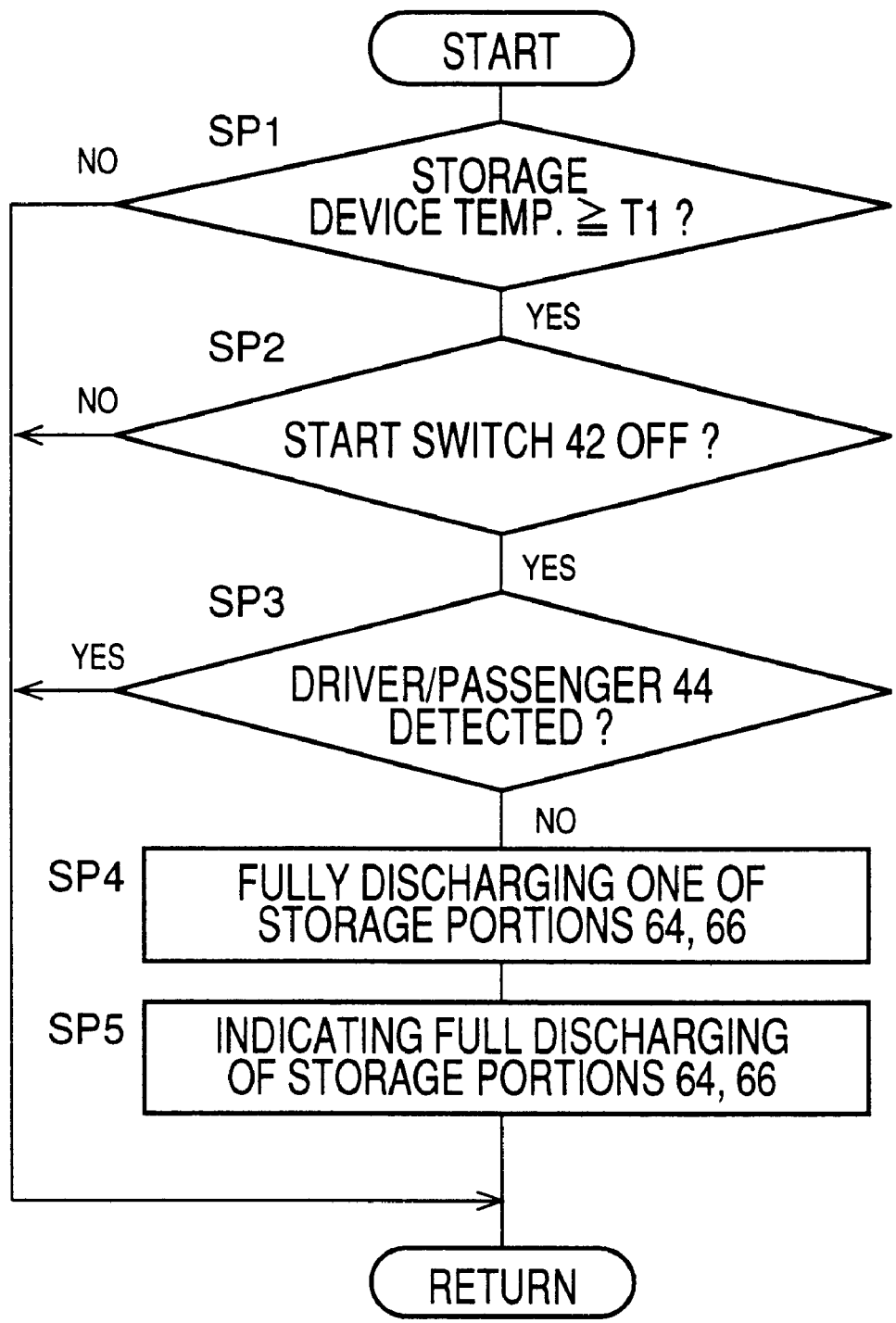
FIG. 24 is a flow chart illustrating a control routine according to another embodiment of the invention.

In the routine of FIG. 24, step SP1 is identical with step SE2 of FIG. 13. If an affirmative decision (YES) is obtained in step SP1, the control flow goes to step SP2 to determine whether the vehicle is stationary or at rest with the START switch 42 being off. If an affirmative decision (YES) is obtained in step SP2, the control flow goes to step SP3 to determine whether the vehicle driver or any passenger is present within the vehicle. This determination is effected based on the output signal of the DRIVER/PASSENGER sensor 44.

If a negative decision (NO) is obtained in step SP3, the control flow goes to step SP4 in which a selected one of the storage portions 64, 66 is fully discharged, by transferring the electric energy from the above-indicated one storage portion to the other, or by connecting the above-indicated one storage portion to suitable energy consuming means such as an electric heater or resistor. Then, step SP5 is implemented to indicate the full charging of the storage portion 64, 66, on the instrument panel of the vehicle, for example.

In the fourteenth embodiment, the full charging of the storage portions 64, 66 is effected only when the vehicle is stopped with the START switch 42 being off. This arrangement of control to fully discharge the storage device 58 is simpler than the arrangement in which the storage portions 64, 66 are selectively fully discharged during running of the vehicle.

Figure 25:
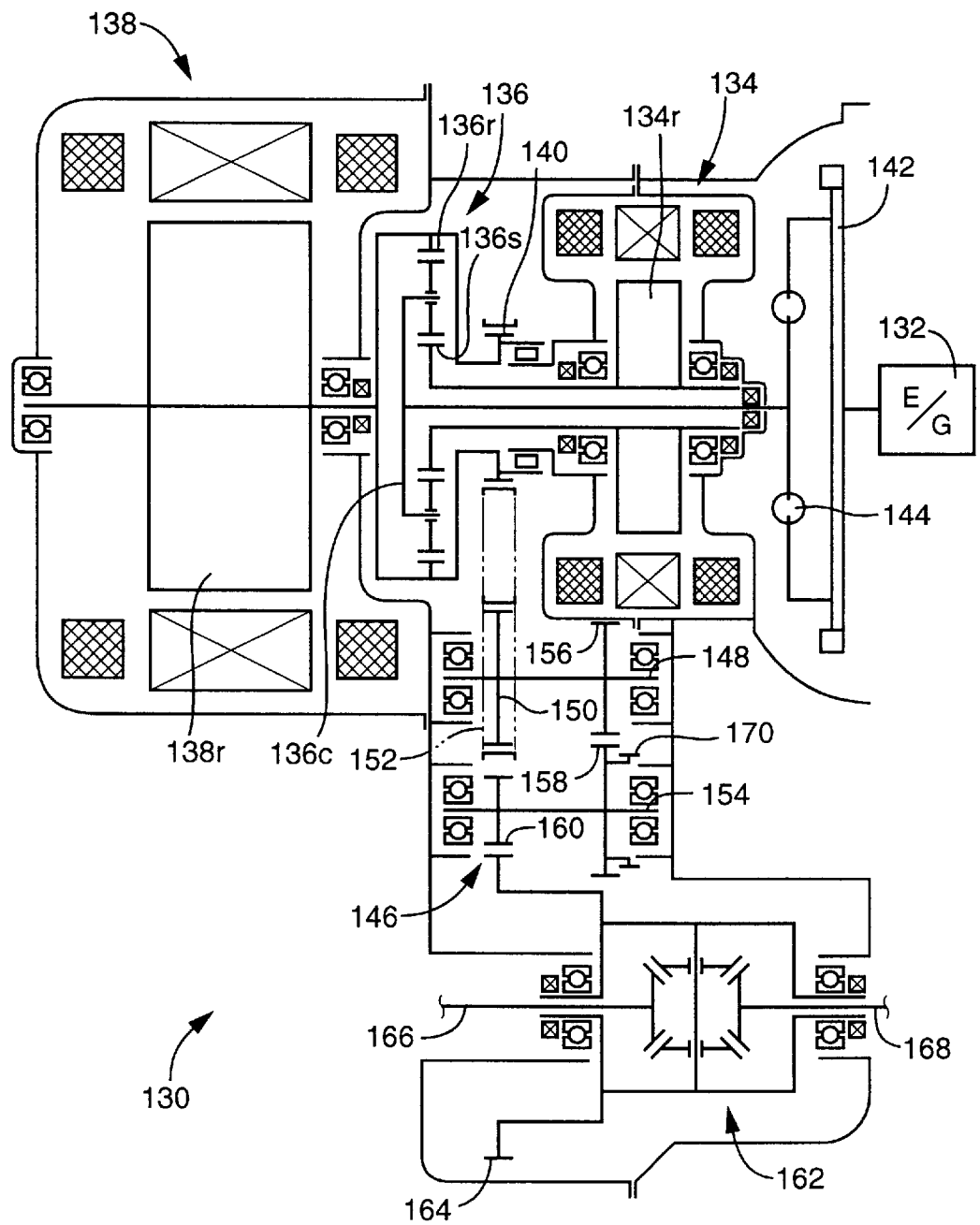
FIG. 25 is a schematic view showing a general arrangement of a hybrid drive system according to another embodiment of the invention.
Figure 26:
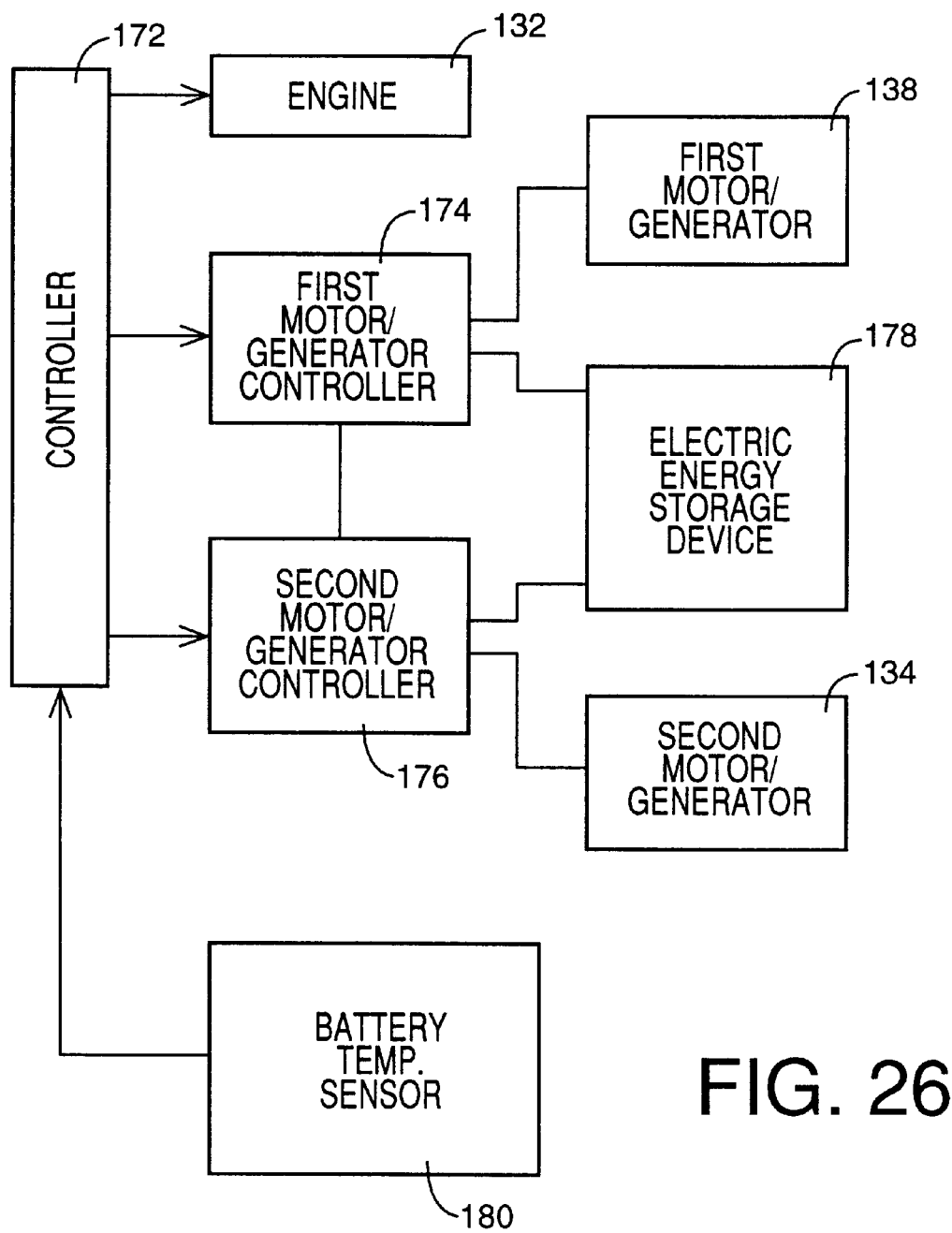
FIG. 26 is a block diagram showing a control arrangement of the hybrid drive system of FIG. 25.

Referring next to FIGS. 25 and 26, there will be described a hybrid drive system 130 for a front-engine front-drive (FF) hybrid vehicle, constructed according to a fifteenth embodiment of this invention. The hybrid drive system 130 includes an internal combustion engine 132 of transverse type operated by combustion of a fuel, a second motor/generator 134, a single pinion type planetary gear mechanism 136, and a first motor/generator 138. The planetary gear mechanism 136, which is constructed to mechanically synthesize forces or distribute a force, includes a carrier 136c connected to the engine 132, a sun gear 136s connected to a rotor 134r of the second motor/generator 134, and a ring gear 136r which is connected to a rotor 138r of the first motor/generator 138 and to a sprocket 140 that functions as an output member. The planetary gear mechanism 136 is adapted to distribute power from the engine 132 to the second motor/generator 134 and the sprocket 140. The second motor/generator 134 is used primarily as the electric generator or dynamo, and is driven by the engine 132 through the planetary gear mechanism 136. Electric energy generated by the motor/generator 134 is supplied to the first motor/generator 138 or stored in an electric energy storage device 178 such as a battery (FIG. 26). The first motor/generator 138 is used primarily as the electric motor, that is, as a drive power source, alone or together with the engine 132, for running the vehicle. The first motor/generator 138 which is required to produce a comparatively large torque is designed to have a larger diameter than the second motor/generator 134, so as to reduce the axial dimension of the hybrid drive system 130. The engine 132 and the second motor/generator 134 function as means for generating an electric energy, while the first motor/generator 138 functions as the electric drive motor. The output of the engine 132 is transmitted to the planetary gear mechanism 136 through a flywheel 142, and a damper device 144 including a spring, a rubber member or other elastic member or utilizing a viscous fluid. The flywheel 142 and damper device 144 function to reduce speed and torque variations of the engine output.

The sprocket 140 is connected by a chain 152 to a driven sprocket 150 provided on a first intermediate shaft 148 of a speed reducing mechanism 146. The mechanism 146 further includes a second intermediate shaft 154 parallel to the first intermediate shaft 148, and a pair of mutually meshing speed reduction gears 156, 158. The output of the speed reducing mechanism 146 is transmitted from an output gear 160 provided on the second intermediate shaft 154, to a differential gear device 162 of bevel gear type. The output gear 160 meshes with a large-diameter ring gear 164 which is an input member of the differential gear device 162. The ring gear 164 whose speed is reduced as compared with that of the output gear 160 is connected to a pair of output shafts 160, 168, which are connected to respective left and right drive wheels of the vehicle. A parking gear 170 of a mechanical parking brake device is formed integrally with the speed reduction gear 148.

The hybrid drive system 130 uses a control system including a hybrid drive controller 172, as shown in FIG. 26. The controller 172 controls the throttle valve opening, fuel injection amount and ignition timing of the engine 132. The first motor/generator 138 and the second motor/generator 134 are connected through respective first and second motor/generator controllers 174, 176 to the electric energy storage device 178. The hybrid drive controller 172 is adapted to place each of the first motor/generator 134 and the second motor/generator 138, selectively in one of a DRIVE state, a CHARGING state and a NON-LOAD or FREE state. In the DRIVE state, the motor/generator 138 is operated as the electric motor to provide a predetermined torque, with an electric energy being supplied thereto from the storage device 178 or the second motor/generator 134. In the CHARGING state, the first motor/generator 138 is operated as the electric generator or dynamo, by regenerative braking (i.e., electric braking torque of the motor/generator 138 per se), so as to charge the electric energy storage device 178 with the generated electric energy. In the NON-LOAD or FREE state, the motor/generator 138 is placed in a non-load condition permitting free rotation of the rotors 134r, 138r. The storage device 178 is provided with a BATTERY TEMP sensor 180 for detecting the temperature of the ambient atmosphere around the storage device 178, or the temperature of the housing of the storage device 178. Unlike the storage device 58, the storage device 178 does not have a plurality of mutually independent storage portions.

The hybrid drive controller 172 is constituted principally by a microcomputer incorporating a central processing unit (CPU), a random-access memory (RAM) and a read-only memory (ROM). The controller 172 places the hybrid drive system 130 selectively in one of a plurality of operation modes including: a motor drive mode; an engine drive and charging mode; engine and motor drive mode; a regenerative braking mode; and a charging mode. In the engine drive mode, the second motor/generator 134 in the NON-LOAD state, and the first motor/generator 138 is operated as the drive power source for running the vehicle. In the engine drive and charging mode, the second motor/generator 134 is operated as the electric generator and a reaction member, while the first motor/generator 138 is placed in the NON-LOAD state, and the engine 132 is operated as the drive power source for running the vehicle, while operating the second motor/generator 134 to generate an electric energy for charging the storage device 178. In the engine and motor drive mode, the second motor/generator 134 is operated as the electric generator, and the first motor/generator 178 is operated as the electric motor with the electric energy generated by the second motor/generator 134 or supplied from the storage device 178, while at the same time the engine 132 is operated, so that the vehicle is driven by both the first motor/generator 138 and the engine 132. In the regenerative braking mode, the first motor/generator 138 is operated as the electric generator by a kinetic energy of the vehicle during deceleration of the vehicle, so as to achieve regenerative braking. In the charging mode, the second motor/generator 134 is operated as the electric generator by the engine 132 to generate an electric energy for charging the storage device 178, while the vehicle is not running. The controller 172 is adapted to receive various signals necessary to control the hybrid drive system 130, such as output signals of various sensors and detectors, which include a sensor for detecting the operating amount of the accelerator pedal, a sensor for detecting the running speed of the vehicle, a detector for detecting the amount of electric energy stored in the storage device 178, a sensor for detecting an operation of a brake pedal, and a sensor for detecting the currently selected position of a shift lever.

Figure 27:
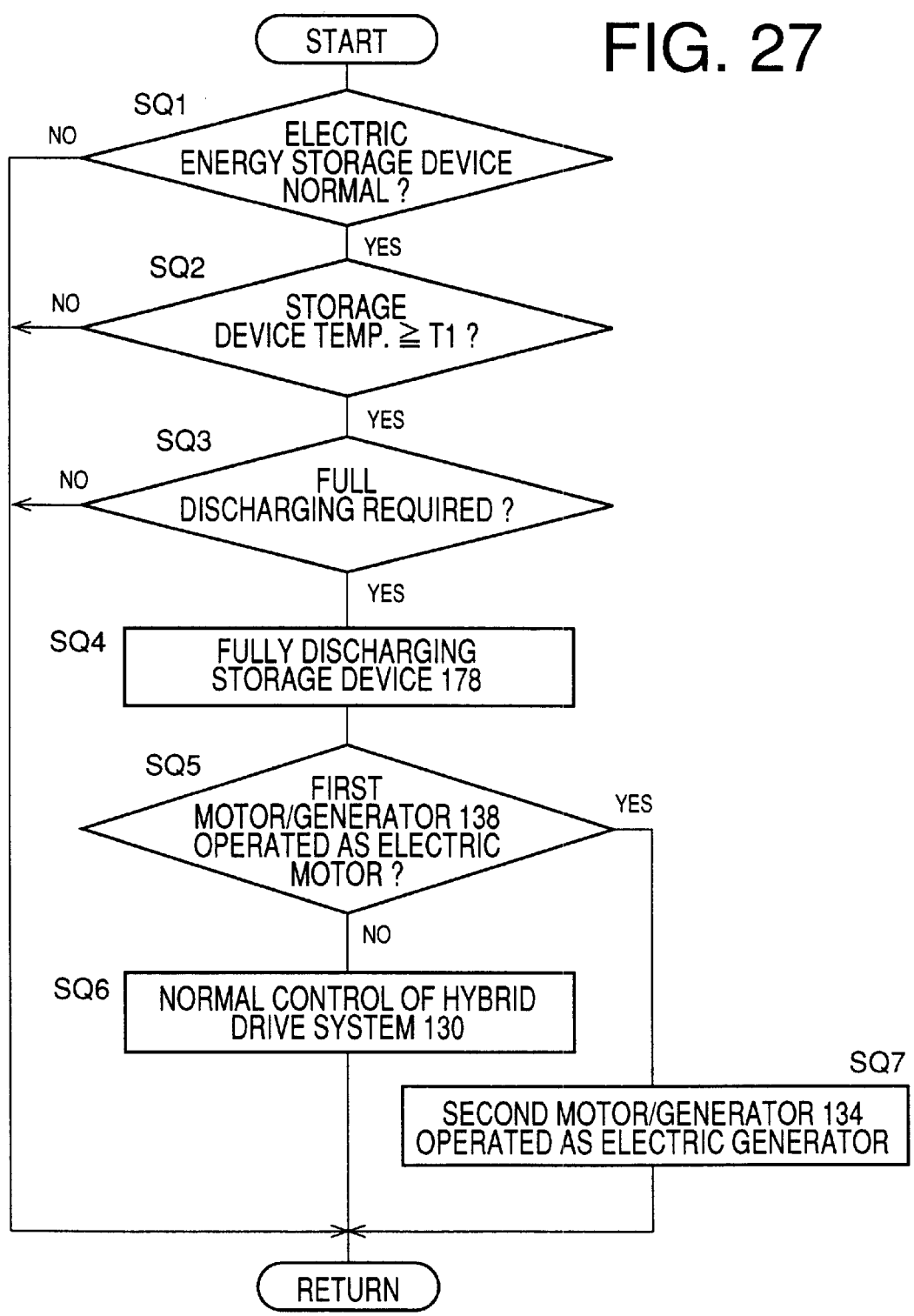
FIG. 27 is a flow chart illustrating an operation of the hybrid drive system of FIG. 25.

To prevent a decrease in the storage capacity of the storage device 178 before its nominal service life has been reached, the hybrid drive controller 172 is adapted to execute a control routine illustrated in the flow chart of FIG. 27. It will be understood that a portion of the controller 172 assigned to implement step SQ4 of the routine provides fully discharging means, while a portion of the controller 172 assigned to implement steps SQ5 and SQ6 provides motor operating means for operating the second motor/generator 134 as the electric generator to generate the electric energy for operating the first motor/generator 138 as the electric motor for running the vehicle. It will also be understood that a portion of the controller assigned to implement steps SQ1 and SQ2 provides full discharge restricting means for restricting an operation of the fully discharging means.

In the routine of FIG. 27, steps SQ1–SQ3 are identical with steps SE1–SE3 of FIG. 13. If an affirmative decision (YES) is obtained in all of the steps SQ1–SQ3, the control flow goes to step SQ4 in which the storage device 178 is fully discharged, by inhibiting the charging of the storage device 178 or by connecting the storage device 178 to suitable energy consuming means such as an electric heater or resistor. Step SQ4 is followed by step SQ5 to determine whether the first motor/generator 138 is operated as the electric motor for running the vehicle in the motor drive mode or the engine and motor drive mode. If an affirmative decision (YES) is obtained in step SQ5, the control flow goes to step SQ7 in which the second motor/generator 134 is operated as the electric generator by the engine 132, to generate an electric energy for operating the first motor/generator 138 as the electric motor. If a negative decision (NO) is obtained in step SQ5, the control flow goes to step SQ6 in which the hybrid drive system 130 is controlled by the controller 172 in the normal manner based on the output signals of the various sensors and detectors, which indicate the running condition of the vehicle.

In the present fifteenth embodiment, the second motor/generator 134 is operated as the electric generator by the engine, to generate an electric energy to operate the first motor/generator 138 as the electric motor for running the vehicle, in the motor drive mode or the engine and motor drive mode, while the storage device 178 is in the process of being fully discharged. This arrangement prevents a decrease in the storage capacity of the storage device 178, while avoiding a running failure of the vehicle during full discharging of the storage device 178.

While the presently preferred embodiments of this invention have been described above in detail, it is to be understood that the present invention may be otherwise embodied.

Figure 28:
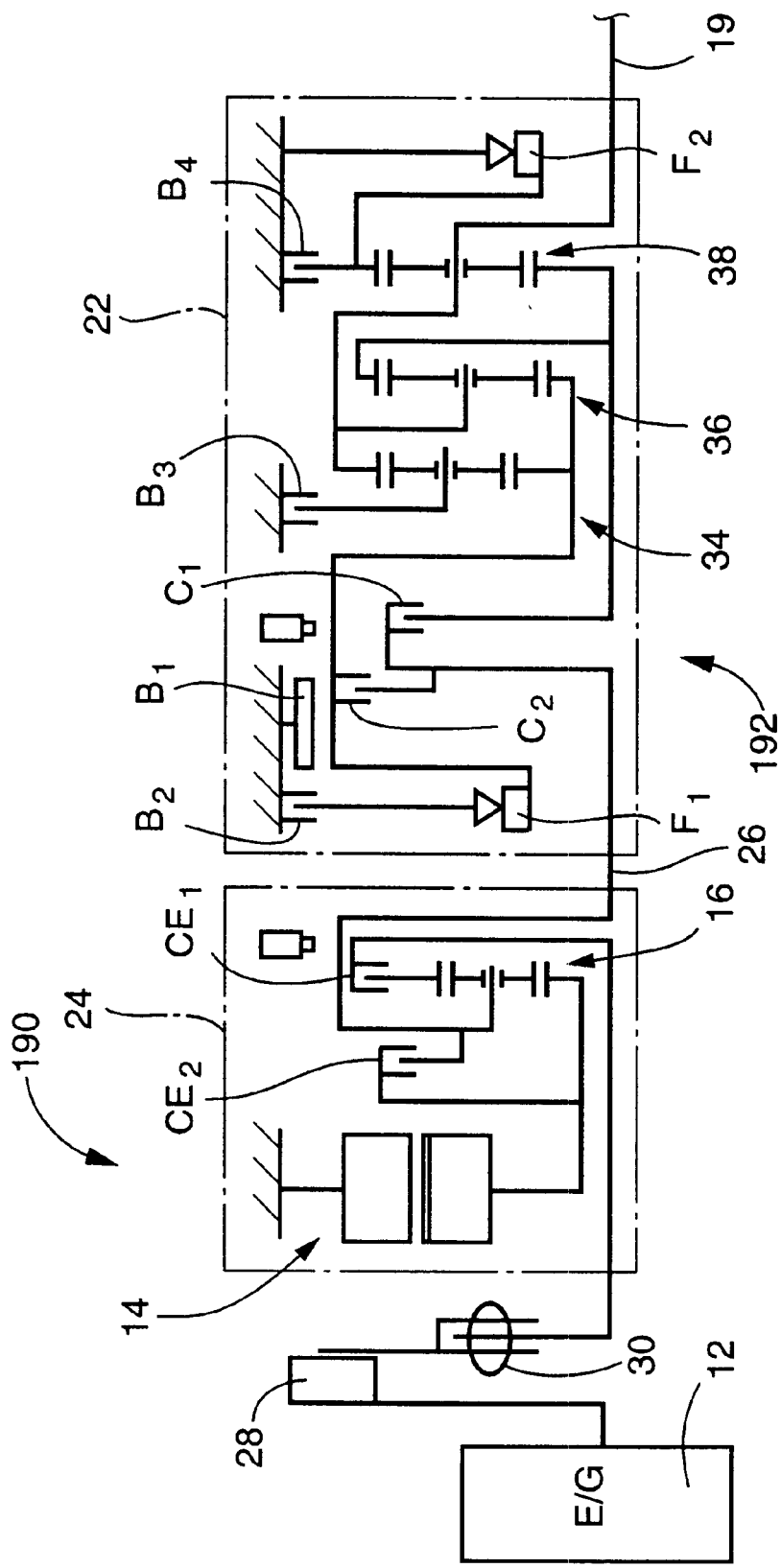
FIG. 28 is a schematic view showing a hybrid drive system different in construction from that of FIG. 1.

While the hybrid drive system 10 in the first embodiment of FIG. 1 uses the automatic transmission 18 which includes the auxiliary transmission 20 as well as the primary transmission 22 and which has one rear drive position and five forward drive positions, the principle of the present invention is equally applicable to a hybrid drive system 190 constructed as shown in FIG. 28. The hybrid drive system 190 uses an automatic transmission 192 which does not have the auxiliary transmission 20 and consists solely of the primary transmission 22. The automatic transmission 192 has four forward-drive positions and one rear-drive position, as indicated in FIG. 29.

It is to be understood that the present invention may be embodied with various other changes, modifications and improvements, which may occur to those skilled in the art, without departing from the spirit and scope of the invention defined in the following claims:

What is claimed is:

1. An electrically driven automotive vehicle comprising:
    an electric energy storage device for storing an electric energy, said electric energy storage device including a plurality of storage portions which can be charged and discharged independently of each other;
    an electric motor operated by the electric energy supplied from said electric energy storage device, for running the vehicle; and
    fully discharging means for fully discharging a first part of said electric energy storage device which consists of at least one of said plurality of storage portions, when an amount of electric energy stored in a second part of said electric energy storage device which consists of at least one of the other of said plurality of storage portions is larger than a predetermined threshold, whereby a decrease in a storage capacity of said first part of said electric energy storage device due to repeated charging of said first part is prevented.

2. An electrically driven automotive vehicle according to claim 1, wherein said fully discharging means sequentially fully discharges at least two of said plurality of storage portions.

3. An electrically driven automotive vehicle comprising:
    electricity generating means for generating an electric energy;
    an electric energy storage device for storing the electric energy generated by said electricity generating means, said electric energy storage device including a plurality of storage portions which can be charged and discharged independently of each other;

an electric motor operated by the electric energy supplied from said electric energy storage device, for running the vehicle; and fully discharging means for fully discharging a first part of said electric energy storage device which consists of at least one of said plurality of storage portions, when an amount of energy stored in a second part of said electric energy storage device which consists of at least one of the other of said plurality of storage portions is larger than a predetermined threshold, whereby a decrease in a storage capacity of said first part of said electric energy storage device due to repeated charring of said first part is prevented.

4. An electrically driven automotive vehicle according to claim 3, further comprising charging control means for operating said electricity generating means to charge said second part of said electric energy storage device when the amount of electric energy stored in said first part of said storage device has been reduced to a predetermined threshold by said fully discharging means.

5. An electrically driven automotive vehicle according to claim 3, wherein said fully discharging means sequentially fully discharges at least two of said plurality of storage portions.

6. An electrically driven automotive vehicle according to claim 4, wherein said charging control means operates said electricity generating means to charge said second part of said electric energy storage device until the amount of electric energy stored in said second part has been increased to a value larger than said predetermined threshold.

7. An electrically driven automotive vehicle comprising:

an electric energy storage device for storing an electric energy, said electric energy storage device including a plurality of storage portions which can be charged and discharged independently of each other;

an electric motor operated by the electric energy supplied from said electric energy storage device, for running the vehicle; and fully discharging means for transferring the electric energy from a first part of said electric energy storage device which consists of at least one of said plurality of storage portions, to a second part of said electric energy storage device which consists of at least one of the other of said plurality of storage portions, to thereby fully discharge said first part, when a total amount of electric energy stored in said electric energy storage device is larger than a predetermined threshold.

8. An electrically driven automotive vehicle according to claim 7, further comprising:

electricity generating means for generating the electric energy; and charging control means for operating said electricity generating means to generate the electric energy for charging said electric energy storage device until said total amount of electric energy stored in said electric energy storage device is increased to said predetermined threshold, before said fully discharging means is operated to fully discharge said first part of said electric energy storage device.

9. An electrically driven automotive vehicle according to claim 7, wherein said fully discharging means transfers the electric energy from said first part of said electric energy storage device to said second part to fully discharge said first part, when said total amount of electric energy stored in said electric energy storage device is held within a predetermined range.

10. An electrically driven automotive vehicle according to claim 7, wherein said fully discharging means transfers the electric energy from said first part of said electric energy storage device to said second part to fully discharge said first part, when a sum of amounts of electric energy stored in said first and second parts of said electric energy storage device is held within a predetermined range.

11. An electrically driven automotive vehicle according to claim 8, wherein said charging control means is operated to charge said second part of said electric energy storage device.

12. An electrically driven automotive vehicle comprising:

electricity generating means for generating an electric energy;

an electric energy storage device for storing the electric energy generated by said electricity generating means, said electric energy storage device including a plurality of storage portions which can be charged and discharged independently of each other;

an electric motor operated by the electric energy supplied from said electric energy storage device, for running the vehicle;

fully discharging means for transferring the electric energy from a first part of said electric energy storage device which consists of at least one of said plurality of storage portions, to a second part of said electric energy storage device which consists of at least one of the other of said plurality of storage portions, to thereby fully discharge said first part;

electric amount control means for controlling the amount of electric energy stored in said electric energy storage device such that a sum of amounts of electric energy stored in said first and second parts does not exceed a predetermined upper limit;

upper limit changing means for reducing said upper limit before said fully discharging means is operated to fully discharge said first part; and full discharge permitting means for permitting said fully discharging means to be operated after said sum of said amounts of electric energy stored in said first and second parts has been reduced to the upper limit reduced by said upper limit changing means.

13. An electrically driven automotive vehicle comprising:

an electric energy storage device for storing an electric energy, the electric energy storage device including a plurality of storage portions which can be charged and discharged independently of each other;

an electric motor operated by the electric energy supplied from the electric energy storage device, for running the vehicle; and fully discharging means for fully discharging all of the plurality of storage portions of the electric energy storage device, according to a predetermined condition, such that a first part of the electric energy storage device which consists of at least one of the plurality of storage portions is fully discharged while a second part of the electric energy storage device which consists of the other of the plurality of storage portions is not fully charged, and such that the first part and the second part are charged according to a predetermined rule, whereby a decrease in a storage capacity of said first part of said electric energy storage device due to repeated charging of said first part is prevented.

14. An electrically driven automotive vehicle according to claim 13, wherein said plurality of storage portions consist of two storage portions, and said predetermined rule is a rule that said fully discharging means alternately fully discharges said two storage portions such that one of said first and second parts is fully discharged after a predetermined time has passed after full discharging of the other of said first and second parts.

15. An electrically driven automotive vehicle comprising:
   an electric energy storage device for storing an electric energy, said electric energy storage device including a plurality of storage portions which can be charged and discharged independently of each other;
   an electric motor operated by the electric energy supplied from said electric energy storage device, for running the vehicle;
   fully discharging means for fully discharging a first part of said electric energy storage device which consists of at least one of said plurality of storage portions when an amount of electric energy stored in a second part of said electric energy storage device which consists of at least one of the other of said plurality of storage portions is larger than a predetermined threshold;
   operation control means for controlling the vehicle, on the basis of a total amount of electric energy stored in said electric energy storage device, as compared with at least one threshold value; and
   threshold changing means for changing said at least one threshold value used by said operation control means, when at least one of said plurality of storage portions cannot be used.

16. An electrically driven automotive vehicle according to claim 15, wherein said operation control means includes:
   first operation control means for controlling the vehicle on the basis of said total amount of electric energy of said electric energy storage device as compared with said at least one threshold value which has not been changed by said threshold changing means; and
   second operation control means for controlling the vehicle on the basis of an amount of electric energy stored in each of said plurality of storage portions of said electric energy storage device as compared with said at least one threshold value which has been changed by said threshold changing means.

17. An electrically driven automotive vehicle comprising:
   electricity generating means for generating an electric energy;
   an electric energy storage device for storing the electric energy generated by said electricity generating means, said electric energy storage device including a plurality of storage portions which can be charged and discharged independently of each other;
   an electric motor operated by the electric energy supplied from said electric energy storage device, for running the vehicle;
   fully discharging means for fully discharging a first part of said electric energy storage device which consists of at least one of said plurality of storage portions when an amount of electric energy stored in a second part of said electric energy storage device which consists of at least one of the other of said plurality of storage portions is larger than a predetermined threshold; and
   motor operating means for operating said electricity generating means to generate an electric energy for operating said electric motor while said electric energy storage device is being fully discharged by said fully discharging means.

18. An electrically driven automotive vehicle comprising:
   an electric energy storage device for storing an electric energy, said electric energy storage device including a plurality of storage portions which can be charged and discharged independently of each other;
   an electric motor operated by the electric energy supplied from said electric energy storage device; and
   fully discharging means for fully discharging a first part of said electric energy storage device which consists of at least one of said plurality of storage portions, each time an amount of electric energy stored in a second part of said electric energy storage device which consists of at least one of the other of said plurality of storage portions is larger than a predetermined threshold, whereby a decrease in a storage capacity of said first part of said electric energy storage device due to repeated charging of said first part is prevented.

19. An electrically driven automotive vehicle according to claim 18, further comprising full discharge restricting means for restriction an operation of said fully discharging means when said at least one predetermined condition is not satisfied.

20. An electrically driven automotive vehicle according to claim 18, further comprising service life determining means for determining that a nominal service life of said electric energy storage device has been reached, if a charging and discharging efficiency of said electric energy storage device is lower than a predetermined lower limit immediately after said at least one of said plurality of storage portions is fully discharged by said fully discharging means.

21. An electrically driven automotive vehicle according claim 18, wherein said plurality of storage portions consist of two storage portions, and said fully discharging means alternately fully discharges said two storage portions such that one of said two storage portions is fully discharged when an amount of electric energy stored in the other of said storage portions is larger than a predetermined threshold.

22. An electrically driven automotive vehicle comprising:
   an electric energy storage device for storing an electric energy, said electric energy storage device including a plurality of storage portions which can be charged and discharged independently of each other;
   an electric motor operated by the electric energy supplied from said electric energy storage device; and
   fully discharging means for fully discharging a first part of said electric energy storage device which consists of at least one of said plurality of storage portions when an amount of electric energy stored in a second part of said electric energy storage device which consists of at least one of the other of said plurality of storage portions is larger than a predetermined threshold while said automotive vehicle is stationary with a start switch being off.

23. An electrically driven automotive vehicle according to claim 2, wherein said plurality of storage portions consist of two storage portions, and said fully discharging means alternately fully discharges said two storage portions.

24. An electrically driven automotive vehicle according to claim 23, wherein said fully discharging means fully discharges one of said two storage portions after a predetermined time has passed after fully charging of the other of said two storage portions.

25. An electrically driven automotive vehicle according to claim 5, wherein said plurality of storage portions consist of two storage portions, and said fully discharging means alternately fully discharges said two storage portions.

26. An electrically driven automotive vehicle according to claim 25, wherein said fully discharging means fully discharges one of said two storage portions after a predetermined time has passed after full discharging of the other of said two storage portions.

* * * * *